(12) United States Patent
Brazier

(10) Patent No.: US 10,358,177 B2
(45) Date of Patent: Jul. 23, 2019

(54) TRANSFORMABLE TRACK ASSEMBLY

(71) Applicant: Glen Brazier, Karlstad, MN (US)

(72) Inventor: Glen Brazier, Karlstad, MN (US)

( * ) Notice: Subject to any disclaimer, the term of this patent is extended or adjusted under 35 U.S.C. 154(b) by 142 days.

(21) Appl. No.: 15/330,130

(22) Filed: Aug. 11, 2016

(65) Prior Publication Data

US 2018/0043947 A1    Feb. 15, 2018

(51) Int. Cl.
| | | |
|---|---|---|
| *B62D 55/04* | (2006.01) | |
| *B62D 55/30* | (2006.01) | |
| *B62D 55/084* | (2006.01) | |
| *B62D 55/12* | (2006.01) | |
| *B62D 55/24* | (2006.01) | |

(52) U.S. Cl.
CPC ........... *B62D 55/04* (2013.01); *B62D 55/084* (2013.01); *B62D 55/12* (2013.01); *B62D 55/305* (2013.01); *B62D 55/244* (2013.01)

(58) Field of Classification Search
CPC ..... B62D 55/04; B62D 55/084; B62D 55/305
USPC ........................................ 180/9.8, 9.28, 9.26
See application file for complete search history.

(56) References Cited

U.S. PATENT DOCUMENTS

| | | | | |
|---|---|---|---|---|
| 5,273,126 A | * | 12/1993 | Reed .................. | B62D 49/0635 180/9.21 |
| 7,478,688 B2 | * | 1/2009 | Ki ....................... | B62D 55/1125 180/9.1 |
| 2012/0299371 A1 | * | 11/2012 | Simula .................. | B62D 55/02 305/124 |

* cited by examiner

*Primary Examiner* — Kevin Hurley
*Assistant Examiner* — Felicia L. Brittman
(74) *Attorney, Agent, or Firm* — D. L. Tschida

(57) ABSTRACT

An endless track assembly that mounts to a vehicle drive linkage and is operative to vary the track geometry or profile and terrain contact surface to differing terrains. The track assembly includes controlled idler wheel rocker arm suspensions for pivoting associated idler wheels at an assembly framework. In one assembly, a wheel and tire are supported to a track drive sprocket. The shape of the track assembly can be transformed to alternately engage and disengage the track or wheel with the terrain. In other constructions, the geometry of the track can be varied between triangular and circular shapes. The assemblies include pivotally controlled idler wheel suspensions that cooperate with a drive sprocket supported bladder, offset pie-shaped telescoping plates, and a collapsible membrane or tire to transform the track profile.

18 Claims, 51 Drawing Sheets

TRANSFORMABLE TRACK ASSEMBLY

BACKGROUND OF THE INVENTION

The present invention relates to tracked vehicles and, in particular, to a shape changing track assembly for supporting a vehicle and morphing between a non-circular and a circular track shape to accommodate differing types of terrain.

A wide variety of personal and commercial all terrain vehicles have been developed for travel over terrains including wooded, rocky and sand terrain, streams, muddy fields etc. Track assemblies have also been developed for converting wheeled vehicles to track vehicles with the replacement of the wheels with track assemblies. The latter vehicles typically support at least one pair of track assemblies from a chassis mounted suspension at power driven and/or passive axles.

The present invention was developed to provide an improved track assembly wherein the geometry of the track assembly can be selectively transformed between a flat-sided configuration (e.g. non-circular or generally triangular) and a circular shape. The track assembly can thus be transformed or morphed to accommodate travel over either off-road terrain or hard packed terrain (i.e. paved or dirt roads). The assembly finds particular application and adaptation in vehicles designed for personnel and/or equipment hauling, trucks and other multi-axle vehicles and specific application equipment (e.g. irrigation, farm field etc.).

SUMMARY OF THE INVENTION

It is a primary object of the invention to provide an all terrain vehicle with a track assembly capable of morphing or transforming in real time between different geometric shapes or profiles (e.g. a non-circular, triangular or flat-sided shape to a circular shape) to accommodate differing terrains (e.g. off-road terrain or roadways).

It is further object of the invention to provide a track assembly that supports a driven, endless track supported from a framework assembly that can be controllably manipulated without removing the track assembly from the vehicle to vary the profile shape of the track to conform the terrain contacting surface of the track to optimize travel over the terrain.

It is further object of the invention to provide a track assembly that can be mounted to a variety of vehicles and wherein the geometry of the track can be varied in real time to accommodate the terrain, particularly without removing the track assembly from the vehicle.

It is further object of the invention to provide a track assembly having idler wheels mounted to support the track in cooperation with a drive sprocket/drum and which track suspension is capable of re-shaping the geometry of the terrain contacting surface of the track between a non-circular shape and a circular shape.

It is further object of the invention to provide a track assembly having hydraulic, pneumatic or electric cylinders coupled between a track support frame and pivoting idler wheel suspensions to manipulate the track supporting idler wheels to expand and contract adjoining track surfaces to vary the track geometry between, for example, triangular/flat-sided and circular profiles relative to the terrain.

It is further object of the invention to provide a shape changing track assembly wherein an annular bladder circumscribes a passive or active drive sprocket and inflates and deflates in concert with rotation of the idler wheel suspension to vary the track geometry between non-circular/triangular/flat-sided and circular shapes.

It is further object of the invention to provide a shape changing track assembly wherein an annular bladder is concentrically supported to a sprocket rim from which a plurality of sprocket teeth project to engage drive lugs that project from the interior surface of the track and wherein pneumatic controls direct the inflation and deflation of the bladder and movement of air cylinders that support a plurality of idler wheels to vary the track geometry between non-circular and circular shapes.

It is further object of the invention to provide a shape changing track assembly wherein a drive sprocket assembly supports multiple leaflets or segments that radially extend and retract to engage interior surfaces of the track in concert with rotation of the idler wheel track suspension to vary the track geometry between non-circular and circular shapes.

It is further object of the invention to provide a shape changing track assembly wherein a membrane is bound to circumscribe a track drive sprocket and directionally inflate and deflate in concert with rotation of an idler wheel track suspension to vary the track geometry between non-circular and circular shapes.

It is further object of the invention to provide a shape changing drive track assembly wherein a collapsible bladder is concentrically mounted to a track drive sprocket and contained between a plurality of projecting sprocket teeth and pneumatically controlled inner and outer idler wheel suspension frames to inflate and deflate in concert with the pivoting of the idler wheels to vary the track geometry between non-circular and circular shapes The foregoing objects, advantages and distinctions of the invention are obtained in several alternative track assemblies shown at several attached figures and which assemblies are discussed below. Still other objects, advantages, distinctions, constructions and combinations of individual features of the invention will become more apparent from the following description with respect to the appended drawings. Similar components and assemblies are referred to in the various drawings with similar alphanumeric reference characters. The components, subassemblies and assemblies can be combined in the disclosed and other combinations to provide a variety of different mechanisms for changing the geometric shape of a drive track. The description to each combination should not be literally construed in limitation of the invention. Rather, the invention should be interpreted within the broad scope of the further appended claims.

BRIEF DESCRIPTION OF THE PREFERRED EMBODIMENT

Figure 1:
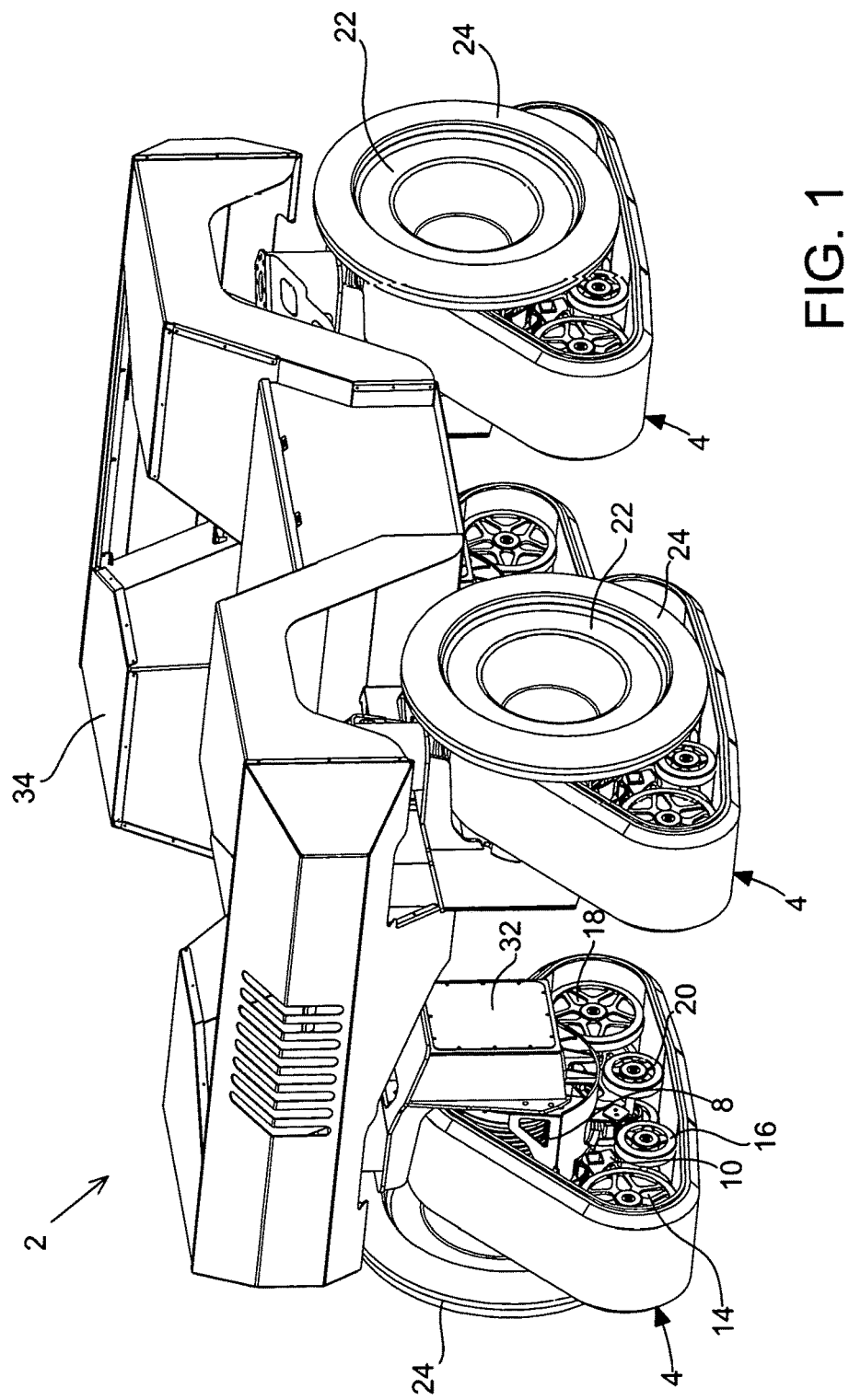
FIG. 1 is a perspective drawing of a generalized vehicle showing front, right side and top views of a track assembly (i.e. track and attached wheel) of the invention mounted to the ends of the vehicle's two axles and with the drive track positioned to engage an active or passive track drive sprocket and with the drive track lowered to engage the terrain.
Figure 2:
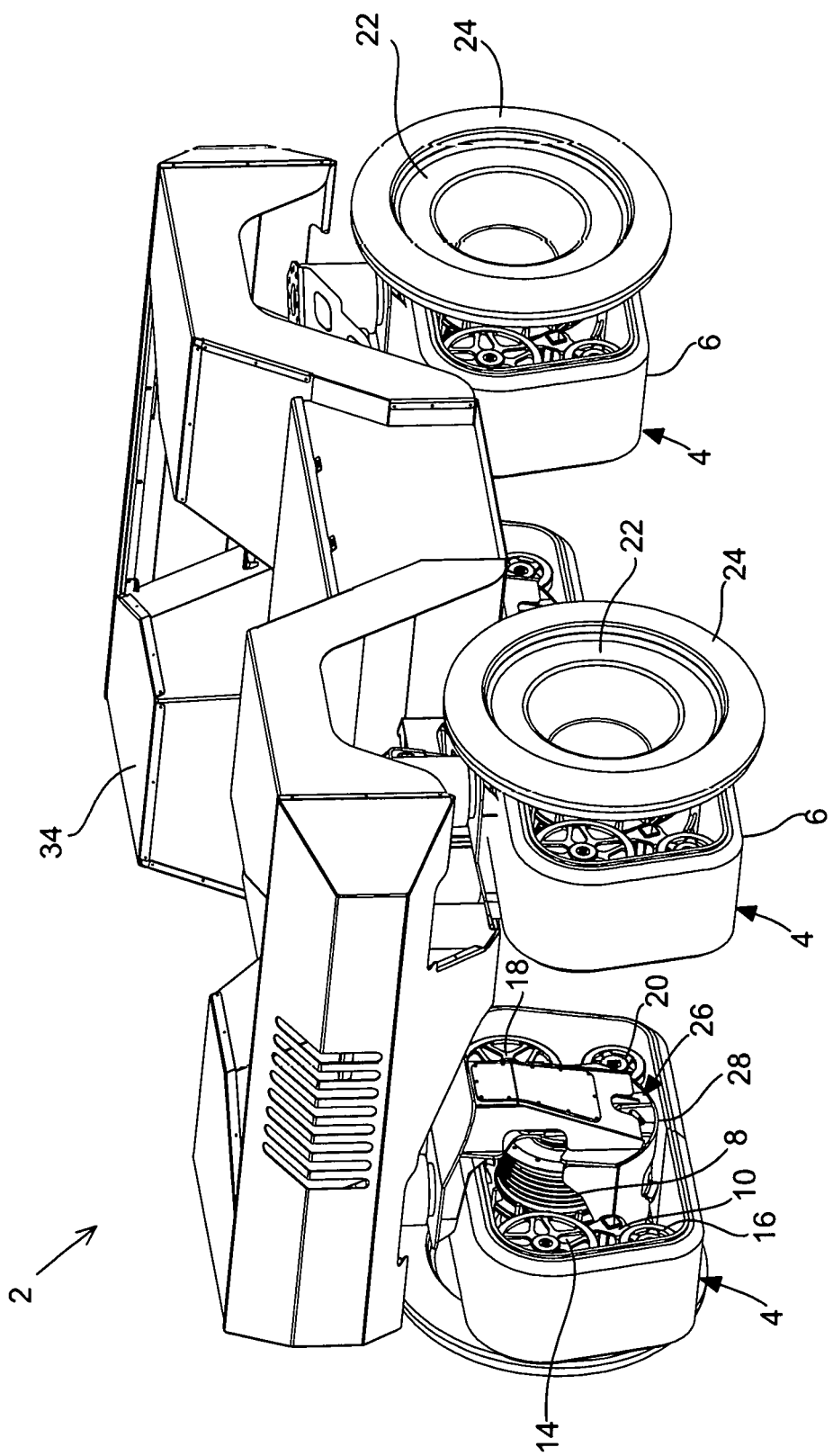
FIG. 2 is a perspective drawing of showing front, right side and top views of the vehicle of FIG. 1 with the drive track elevated and the wheels lowered to engage the terrain.

With attention to FIGS. 1 and 2, a generalized vehicle 2 is shown that is supported from a number of passive or active drive track/wheel assemblies 4. The chassis and/or drive suspension and attached sheet metal or fiberglass skin configuration of the vehicle 2 can take any of a variety of forms from shapes compatible to hauling personnel, to trucks for hauling freight, or to drive carriages supporting specific types of equipment.

Figure 46:
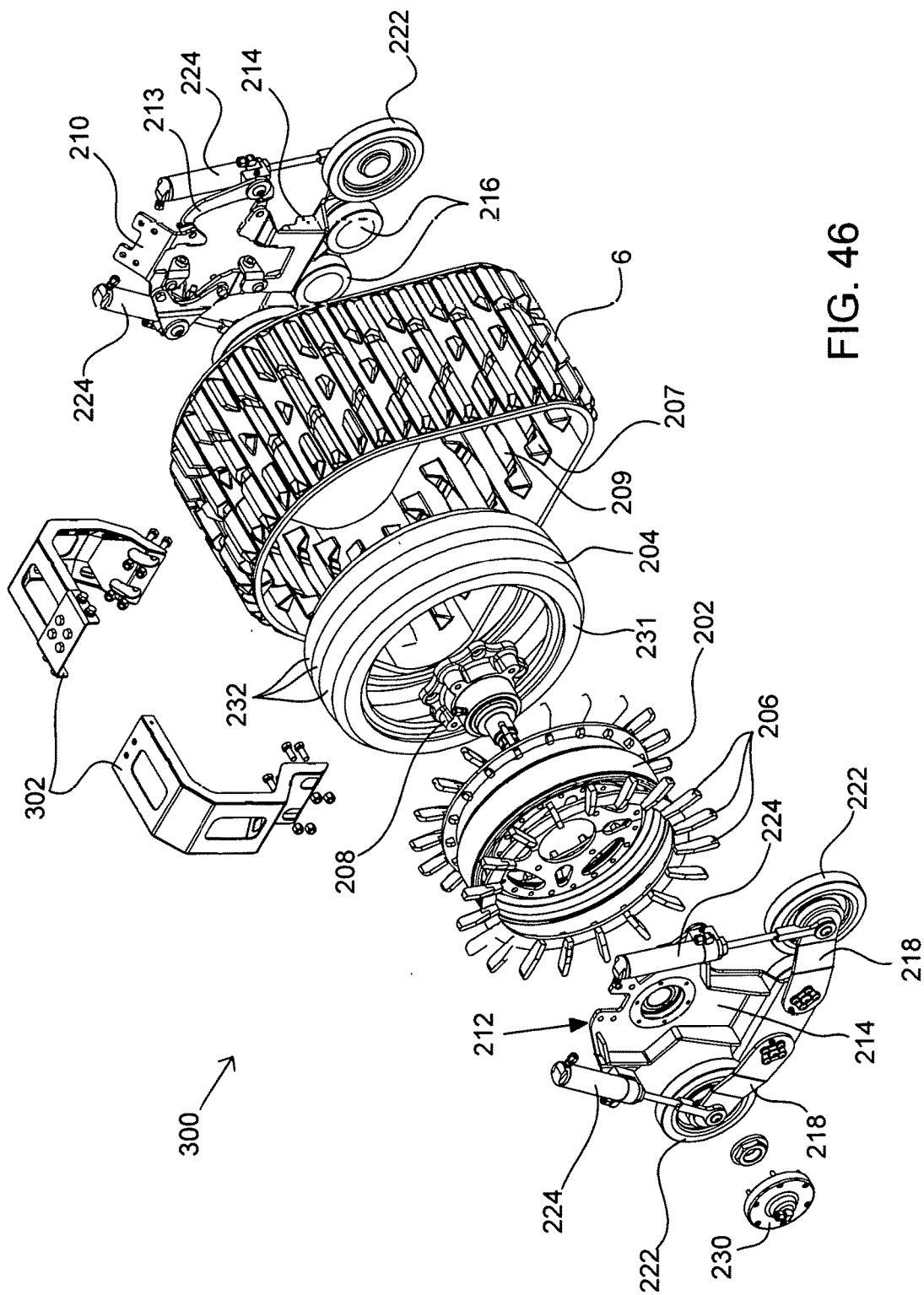
FIG. 46 is a perspective drawing shown in exploded assembly to a shape changing track assembly useable with the vehicle of FIG. 1, wherein a pneumatically controlled idler wheel frame suspension supports the track, wherein the idler wheels are mounted to pivot between to a lowered non-circular "track" condition and an elevated circular "wheel" condition, wherein an inflatable bladder is concentrically mounted to a bladder support rim having drive sprocket teeth that engage drive lugs that project from the track to drive the track, and wherein an onboard compressor and vehicle controller varies the track' profile with the terrain.

The chassis of the vehicle 2 as depicted is designed to convey personnel and includes two axles that support four track/wheel assemblies 4. Each track/wheel assembly 4 includes a drive track 6 that is supported from a framework 7 that attaches to the vehicle drive train and provides a track drive sprocket 8 and fore and aft rocker arm suspensions 10 and 12 that respectively support tore and aft inner and outer sets of idler wheels 14, 16 and 18, 20. The drive track 6 is shown without the drive lugs and terrain contacting lugs for convenience, although FIG. 46 shows a track 6 with such lugs included.

The end-most idler wheels 14 and 18 are presently selected to exhibit the same diameter although the diameter can be varied as desired, but each of which presently exhibit a diameter in the range of 10 to 12 inches. The intermediate idler wheels 16 and 20 presently exhibit the same diameter and are presently sized in a diameter in the range of 5 to 8 inches.

A wheel 22 and tire 24 of suitable diameter and construction laterally extend from each track assembly 4 and align with the drive sprocket 8. The tire 24 can be pneumatic or solid. The wheels 22 and tires 24 are shown in an elevated condition FIG. 1 when the track assemblies 4 are configured to engage the tracks 6 to the terrain.

The track/wheel assemblies 4 include a track support frame 26 having an arcuate slide bearing plate 28. The bearing plate 28 is supported from a mating bearing plate 30 at a framework 32 that depends from a vehicle chassis 34. The track/wheel assemblies 4 are mounted to rotate relative to the chassis 34 over the mating bearing plates 28 and 30. Appropriate resilient suspension(s) can be fitted between the track/wheel assemblies 4 and/or frameworks 32 and chassis 34 to limit lateral and longitudinal movement of the track assemblies 4. The track/wheel assemblies 4 might alternatively be coupled to the vehicle 2 with resilient torsion suspensions.

The chassis 34 of the vehicle 2 can be configured to any desired form and shape. Passenger and equipment compartments can be included and/or configured as desired to accommodate any desired load, whether for personnel or as a truck for cartage or equipment transport or for transporting special purpose attachments (e.g. cranes, pumps, welders etc.). An associated drive suspension (not shown) can be configured as desired with an appropriately sized engine and drive linkage(s) coupled to the track/wheel assemblies 4.

The track/wheel assemblies 4 can be powered or passive and can be independently or collectively steered or mounted to passively follow. The track/wheel assemblies 4 mount to couplers and linkage arms that depend from the frame. Drive power is supplied to each track/wheel assembly 4 via an appropriate engine, transmission, drive linkage (not shown) coupled to the track frame and particularly the drive sprocket 8. Drive power can be provided from a gas or diesel engine, suitable DC electric motors or combinations thereof and/or might be independently applied to each track assembly 4.

Whether powered or not, the drive sprocket 8 rotates to drive the track 6 as drive lugs or other suitable appendages or holes at the track 6 are contacted by suitable drive teeth at the drive sprocket 8. The drive sprocket 8 is also coupled to rotate the wheels 22 and tires 24. Although the wheels are presently coupled to rotate with the drive sprocket 8, an appropriate linkage can separately extend from the vehicle 2 to drive the wheels 22. Preferably, the wheels 22 rotate only when in contact with the ground.

Figure 4:
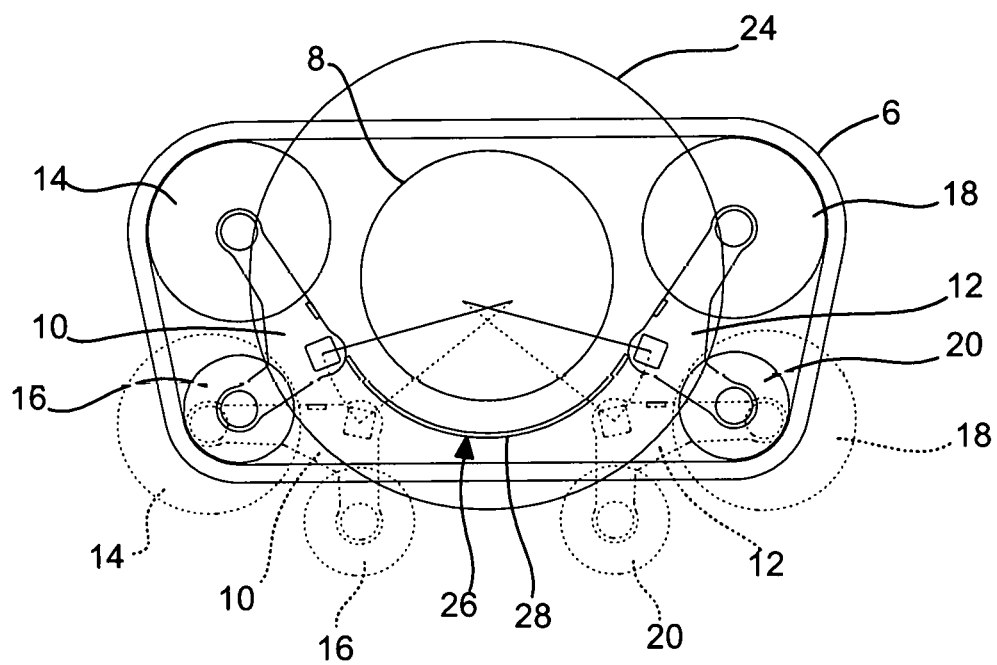
FIG. 4 is a generalized plan drawing showing a front view to the track/wheel assembly of FIG. 1 wherein the rocker arm suspensions of the track assembly are pivoted to the re-configure the track to a trapezoidal geometry to elevate the track above the terrain and cause the wheel/tire to engage the terrain and wherein the dashed line matter shows the position of the rocker arm suspensions when the track is shaped to engage the terrain as in FIG. 3.
Figure 3:
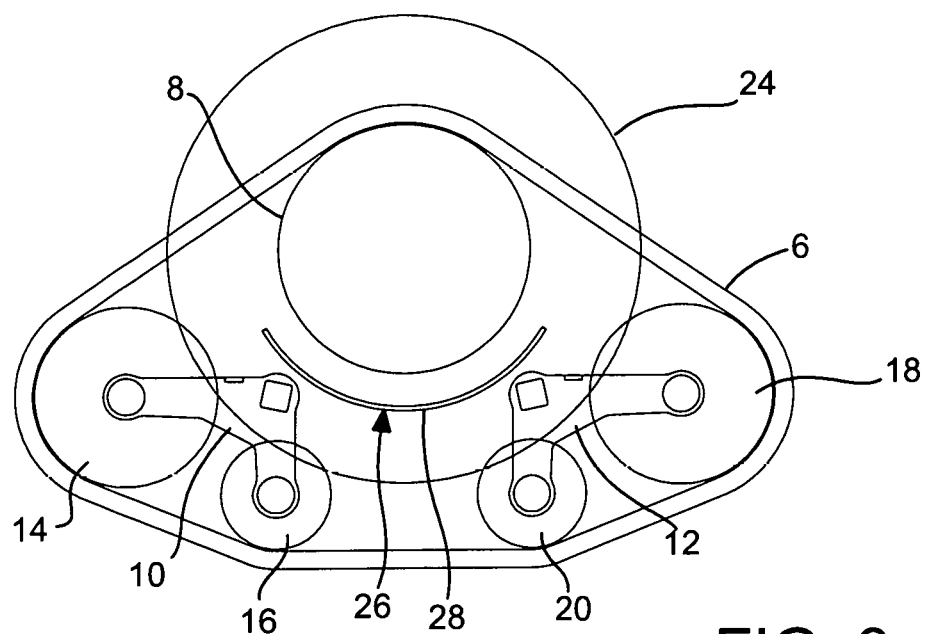
FIG. 3 is a generalized plan drawing showing a front view to one of the track/wheel assemblies of FIG. 1 wherein the track drive sprocket and track rocker arm suspensions are rotated to engage the sprocket with the track, shape the track to engage the terrain and elevate the wheel/tire.
Figure 5:
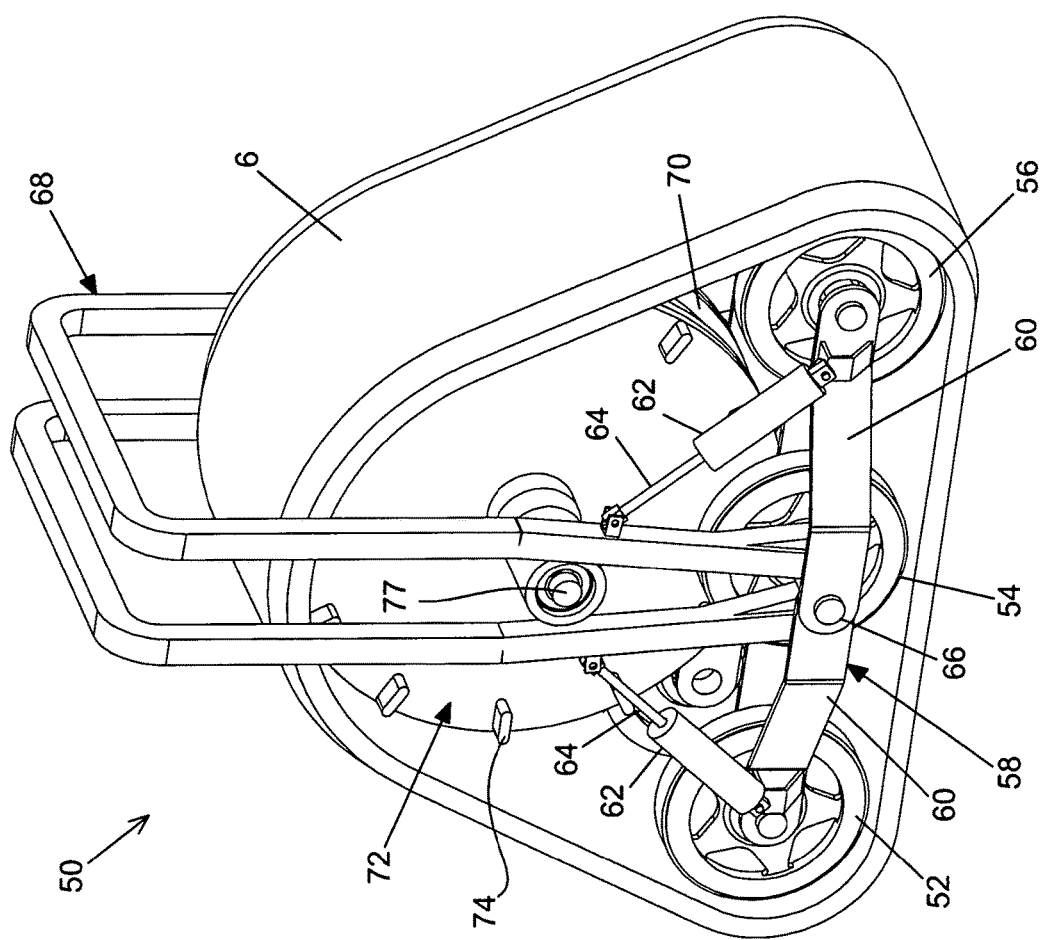
FIG. 5 is a perspective drawing of a shape changing track assembly useable with the generalized vehicle of FIG. 1 wherein an adjustable idler wheel suspension and bladder are circumscribed by the track and supported to an associated framework that cooperate to vary the track's contact surface profile relative to the terrain and wherein the idler wheels are rotated to a horizontal track condition.

FIGS. 3 and 4 depict the vehicle 2 and the track/wheel assemblies 4 wherein the geometries of the tracks 6 have been re-shaped from a flat-sided generally triangular shape to a generally trapezoidal shape. The elevation of the forward and aft most idler wheels 18 and 14 re-shapes the track geometry and selectively causes the track 6 to engage/disengage from the terrain and the tires 24 to simultaneously disengage/engage the terrain.

The tracks 6 are essentially elevated via the rotation of the idler wheel rocker arm suspensions 10 and 12. Respective clockwise and counterclockwise rotation of the fore and aft rocker arm suspensions 10 and 12 particularly induces the idler wheels 14 and 18 to rotate and align substantially above the idler wheels 16 and 20. The elevating of the idler wheels 14 and 18 correspondingly disengages the tracks 6 from the terrain. The relative separation of the tracks 6 to the terrain can be varied as desired by judiciously designing, arranging and/or selecting the relative diameters of the idler wheels 14-20, rocker arm suspensions 10 and 12 and/or placement of the pivot points of the rocker arm suspensions 10 and 12.

FIGS. 3 and 4 depict plan views to the alternative mounting positions of the track/wheel assemblies 4 with the tracks 6 and the wheels and tires 22 and 24 alternately engaged and disengaged from the terrain. As the track 6 is elevated, the track drive lugs disengage from the drive sprocket 8 and the drive sprocket 8 only rotates the wheels 22 and tires 24.

FIGS. 5 through 16, 17 through 29, 30 through 44 and 45 through 51 respectively depict alternative transformable track assemblies 50, 100, 150 and 300 that do not require extraneous wheels 22 and tires 24. The track assemblies 50, 100, 150 and 300 each include opposed sets of inner and outer idler wheel 52, 54 and 56 (e.g. three idler wheels to a side). The idler wheels 52, 54 and 56 are arranged along the lateral peripheral edges of the track 6 of each assembly 50, 100, 150 and 300. The inner and outer idler wheels 52, 54 and 56 are supported from a framework suspension 58 and can be manipulated to stretch the track 6 to exhibit a generally horizontal terrain contacting surface in an off-road condition.

Separate alternative, inflatable bladder and membrane and expanding/contracting mechanical assemblies are discussed below that are concentrically mounted to the track drive sprocket 8. The expanding/contracting assemblies are controlled to cooperate with idler wheel movement to appropriately expand and contract to vary the effective diameter of the drive sprocket 8. Collectively the controlled idler wheel and drive sprocket assemblies of each of the transformable track assemblies 50, 100, 150 and 300 can be controlled to geometrically vary and re-shape the profile or contour of the drive tracks 6 between non-circular and circular shapes. The tracks 6 are thus able to be selectively re-configured in real time to optimize vehicle travel relative to the condition of the terrain.

The track assemblies 50, 100, 150 and 300 are variously shown at FIGS. 5 through 51 in their flat-sided, off-road configuration, their circular on-road configuration and in an exemplary intermediate partially expanded/contracted state. The opposed sets of inner and outer idler wheels 52, 54 and 56 are supported to their associated idler wheel framework suspensions 58 with expanding/contracting linkages. The linkages can include pneumatic, hydraulic or electric (i.e. DC powered) cylinders, solenoids and associated linkage members to support and manipulate each of the idler wheels 52, 54 and 56.

The idler wheels 52, 54 and 56 of the present assemblies 50, 100, 150 and 300 are each supported from rocker arms 60. Pneumatic cylinders 62 and pistons 64 are coupled to the rocker arms 60 and cross frame members 68 that can take a variety of forms span between the inner and outer sets of idler wheels 52, 54 and 56. Movement of the pistons 64 pivots the end most idler wheels 52 and 56 about center idler wheel axles 66 that support the center idler wheels 54 and mating ends of the rocker arms 60 at each side of the idler wheel framework 58. The track 6 in response to the extension and retraction of the idler wheel suspensions 58 morphs between the non-circular and circular shapes depicted at the figures in the mentioned various states of the assemblies 50, 100, 150 and 300.

The track 6 is stretched to a non-circular or flat-bottomed, generally triangular configuration via the extension of the pistons 64 which rotates the rocker arms 60 about the pivot axles 66 at the cross frame members 68 and lowers the idler wheels 52 and 56. An associated track support assembly mounted to the drive sprocket 8 is collapsed and the track 6 is shaped for off road travel.

The track 6 is re-shaped to a circular configuration for travel over relatively smooth hard packed surfaces (e.g. fields, gravel or paved highways) via the retraction of pistons 64 which elevates the idler wheels 52 and 56. As the pistons 64 are retracted the associated track support assembly mounted to the drive sprocket 8 is expanded to create a circular track configuration defined by the tangential surfaces of contact between the idler wheels 52, 54 and 56 and the expanded member at the drive sprocket 8.

The re-shapeable tracks 6 of the track assemblies 50, 100, 150 and 300 thus essentially replace the wheels and tires 22 and 24 of the track assembly of FIGS. 1-4. It is to be appreciated any of the assemblies 50, 100, 150 and 300 can be operated with the track configured at any intermediate non-circular shape to improve travel over any particular terrain.

With particular attention to the track assembly 50 shown at FIGS. 5 through 16 and in combination with the idler wheel suspensions 58, an annular, toroidal bladder 70 is concentrically fitted to a track drive sprocket 72. The drive sprocket 72 is designed much like the rim of a wheel to support the bladder 70 in a cavity space between a cross rim piece 73 and the inner surface of the track 6. Drive lugs 74 that engage mating holes or lugs that project from the interior surface of the drive track 6 (see FIG. 48) laterally extend from the side walls of the sprocket 72. A hub coupler 75 couples the drive sprocket 72 to the vehicle 2 at an appropriate driven or passive axle or other vehicle support. A cross axle 77 mounted to the coupler 75 extends from the coupler 75 through the sprocket 72. Bearings at the sprocket 72 and outer cross frame members 68 support the axle 77 and the track assembly 50.

Figure 6:
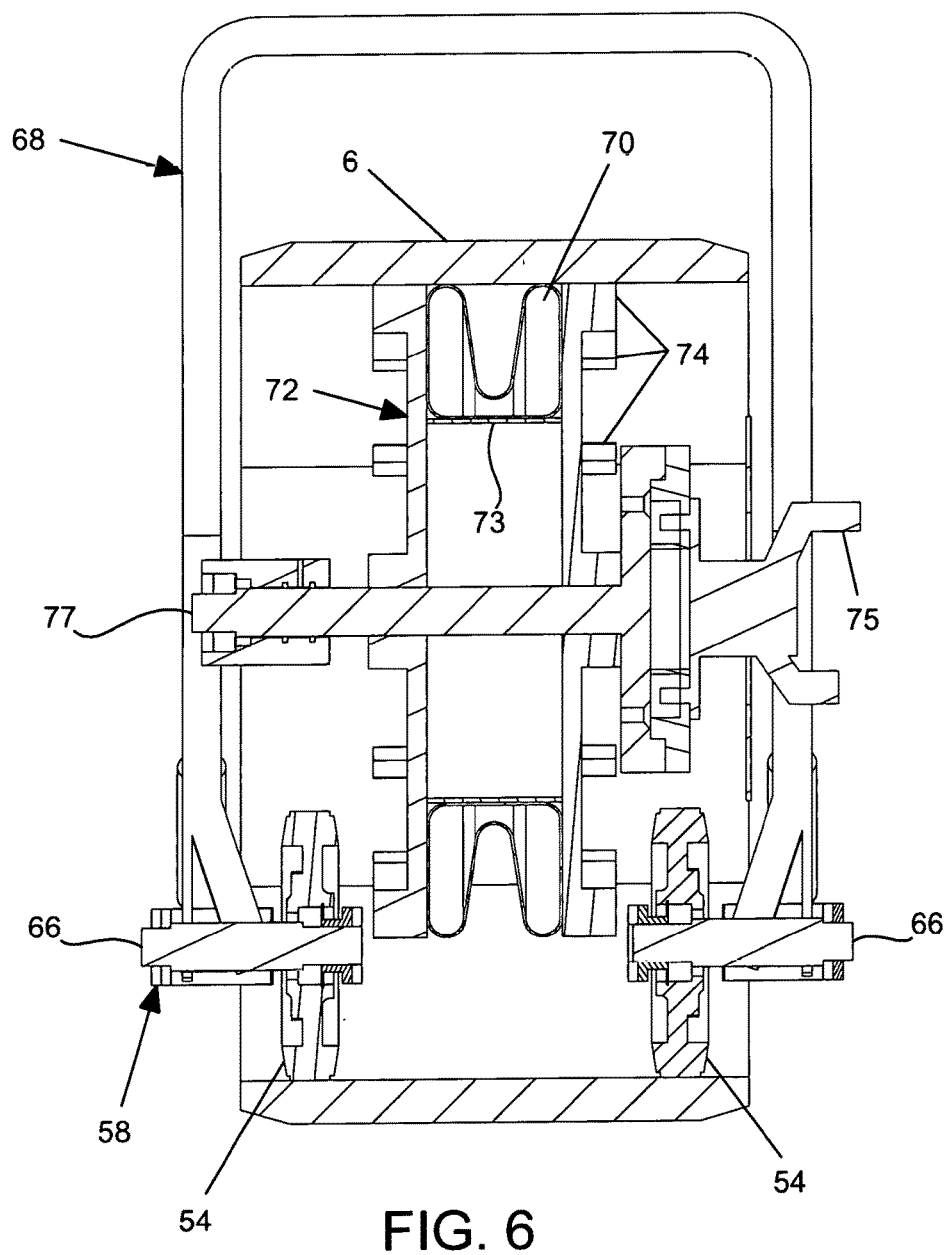
FIG. 6 is a cross section drawing of the track assembly of FIG. 5 showing the bladder deflated and the idler wheels rotated to a track ground engaging condition.
Figure 7:
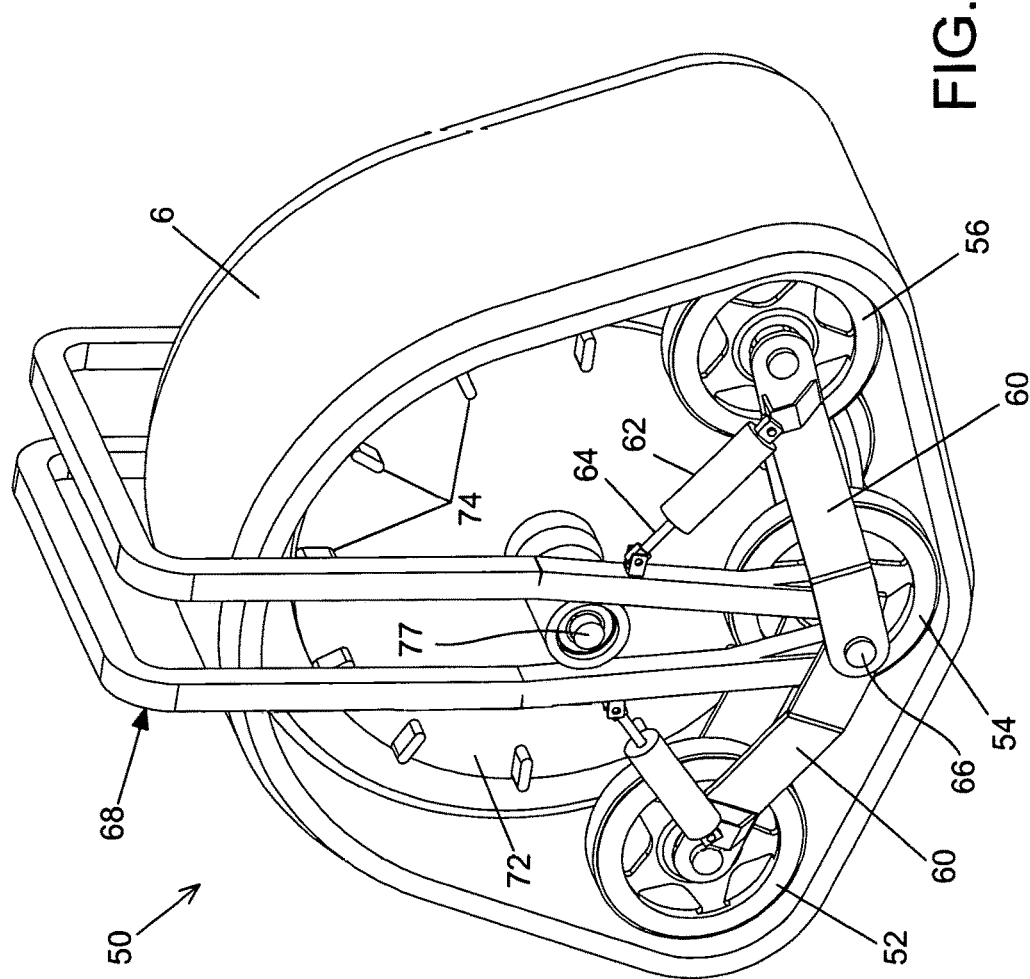
FIG. 7 is a perspective drawing of the track assembly of FIG. 5 showing the bladder partially inflated and the idler wheels partially rotated to a wheel ground engaging condition.
Figure 8:
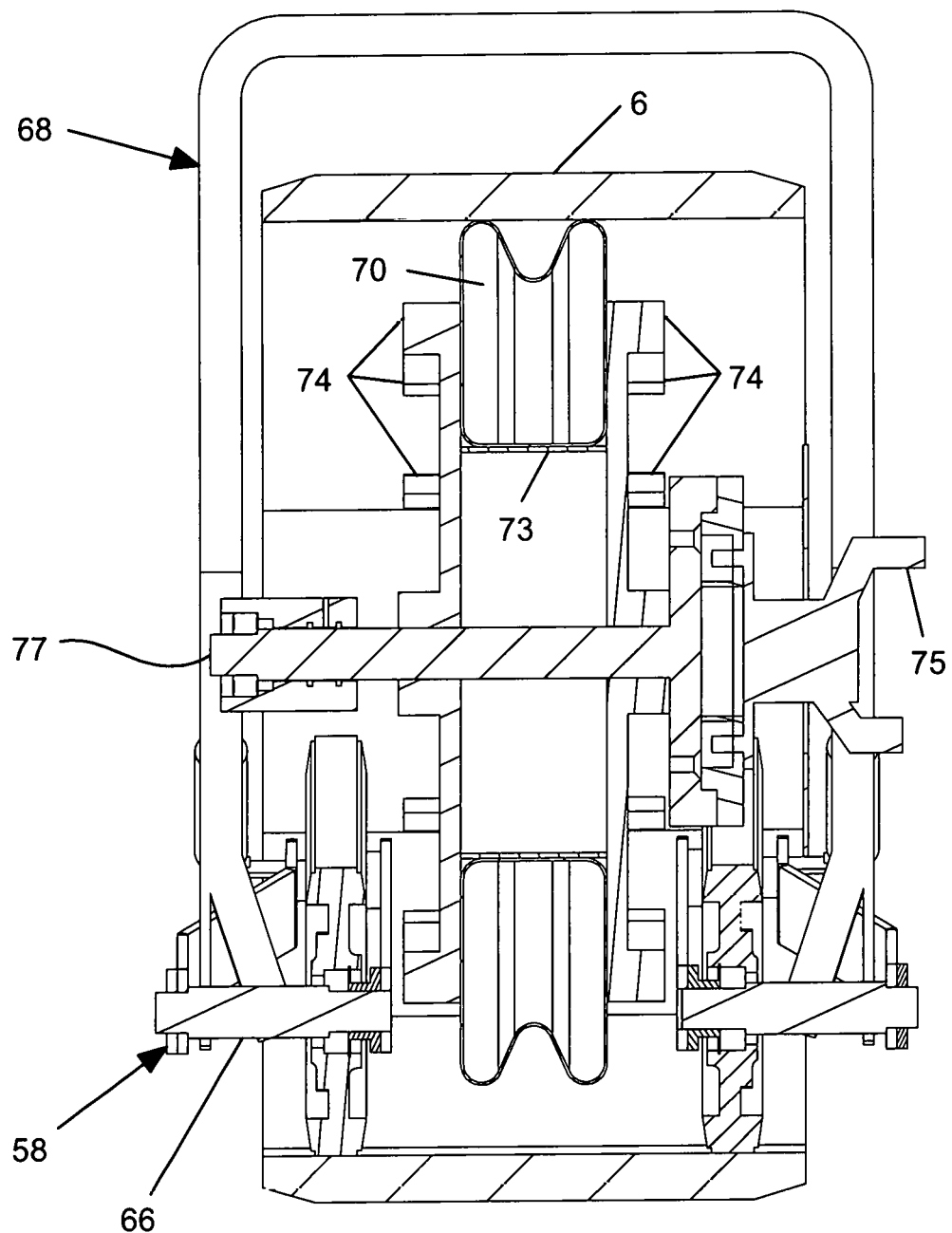
FIG. 8 is a cross section drawing of the track assembly of FIG. 7 showing the bladder partially inflated and the idler wheels rotated and partially retracted.
Figure 9:
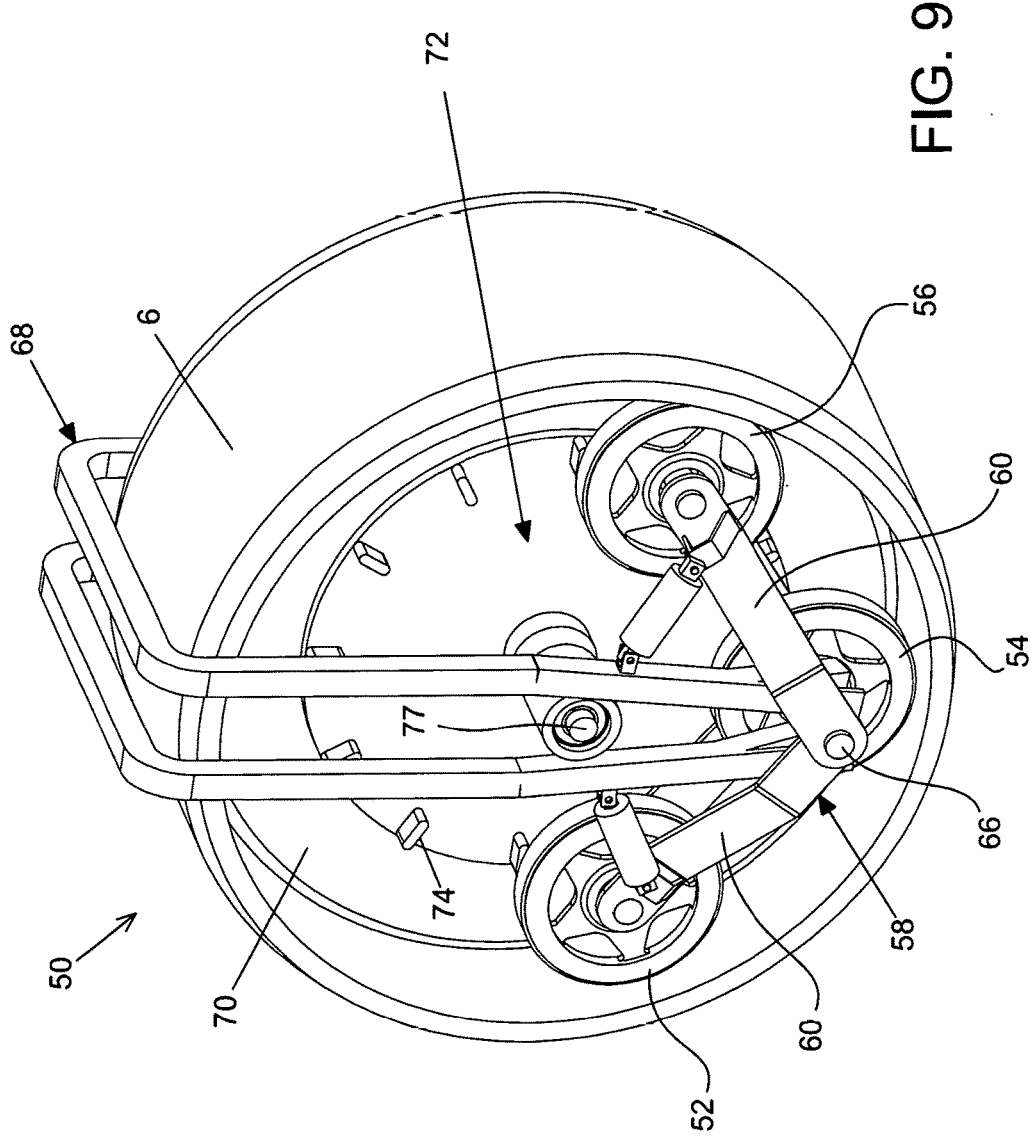
FIG. 9 is a perspective drawing of the track assembly of FIG. 5 showing the bladder fully inflated and the idler wheels fully retracted and rotated to configure the track in a circular or wheel condition.
Figure 10:
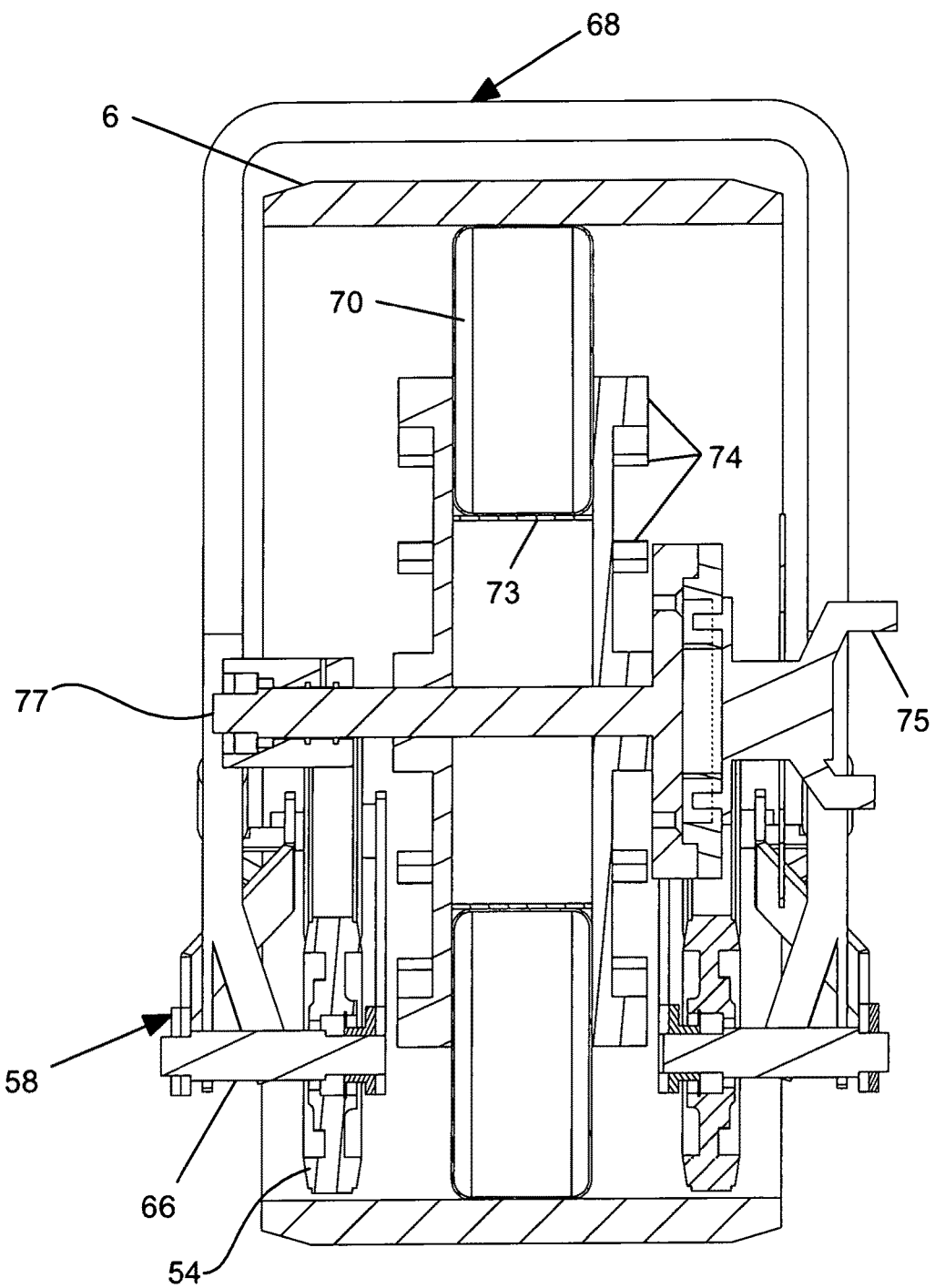
FIG. 10 is a cross section drawing of the track assembly of FIG. 9 showing the bladder fully inflated and the idler wheels fully rotated to configure the track in a circular wheel condition.
Figure 11:
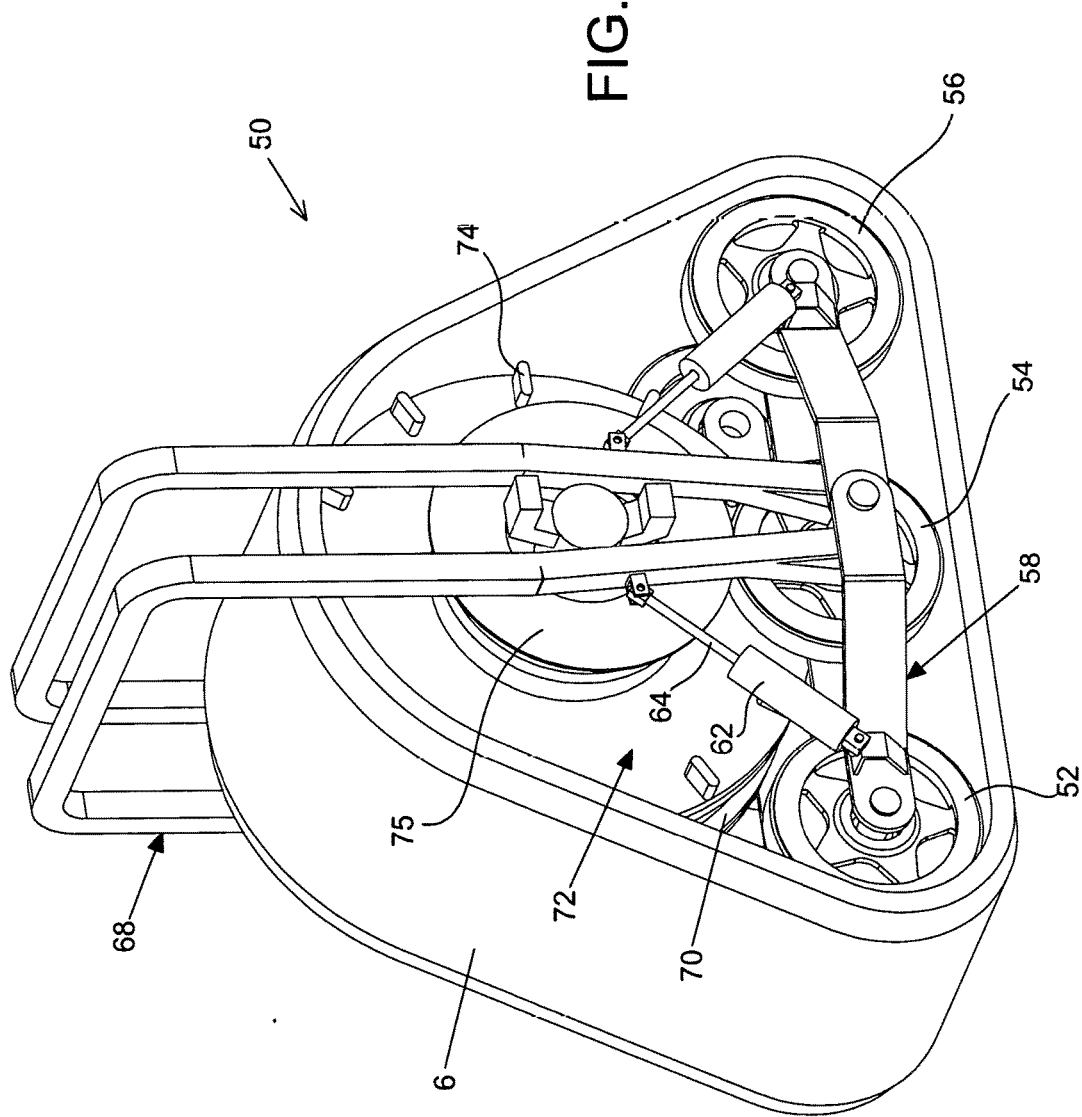
FIG. 11 is a perspective drawing of the track assembly of FIG. 5 showing the back side of the assembly with the bladder deflated and the idler wheels rotated to a horizontal track condition.
Figure 12:
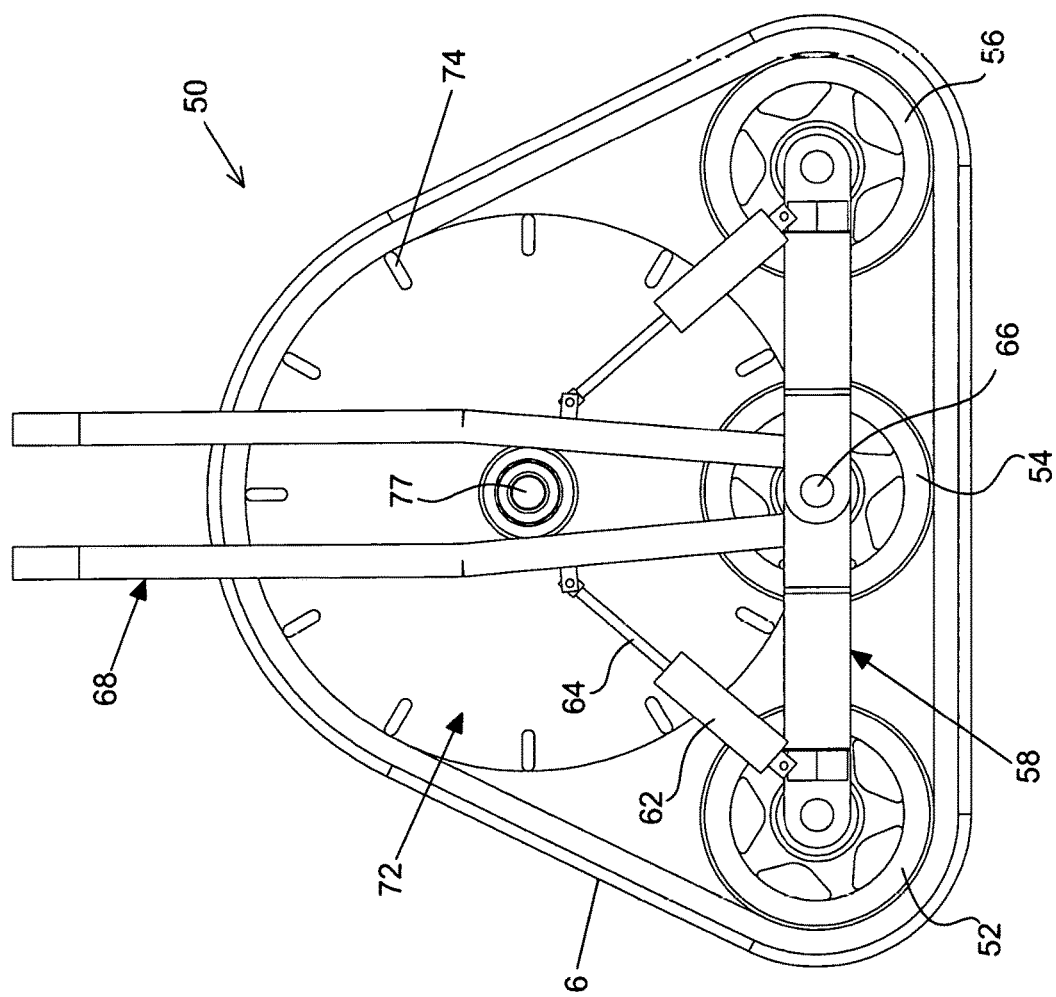
FIG. 12 is a plan view to the front side of the track assembly of FIG. 5 showing the bladder deflated and the idler wheels rotated to a horizontal track condition.
Figure 13:
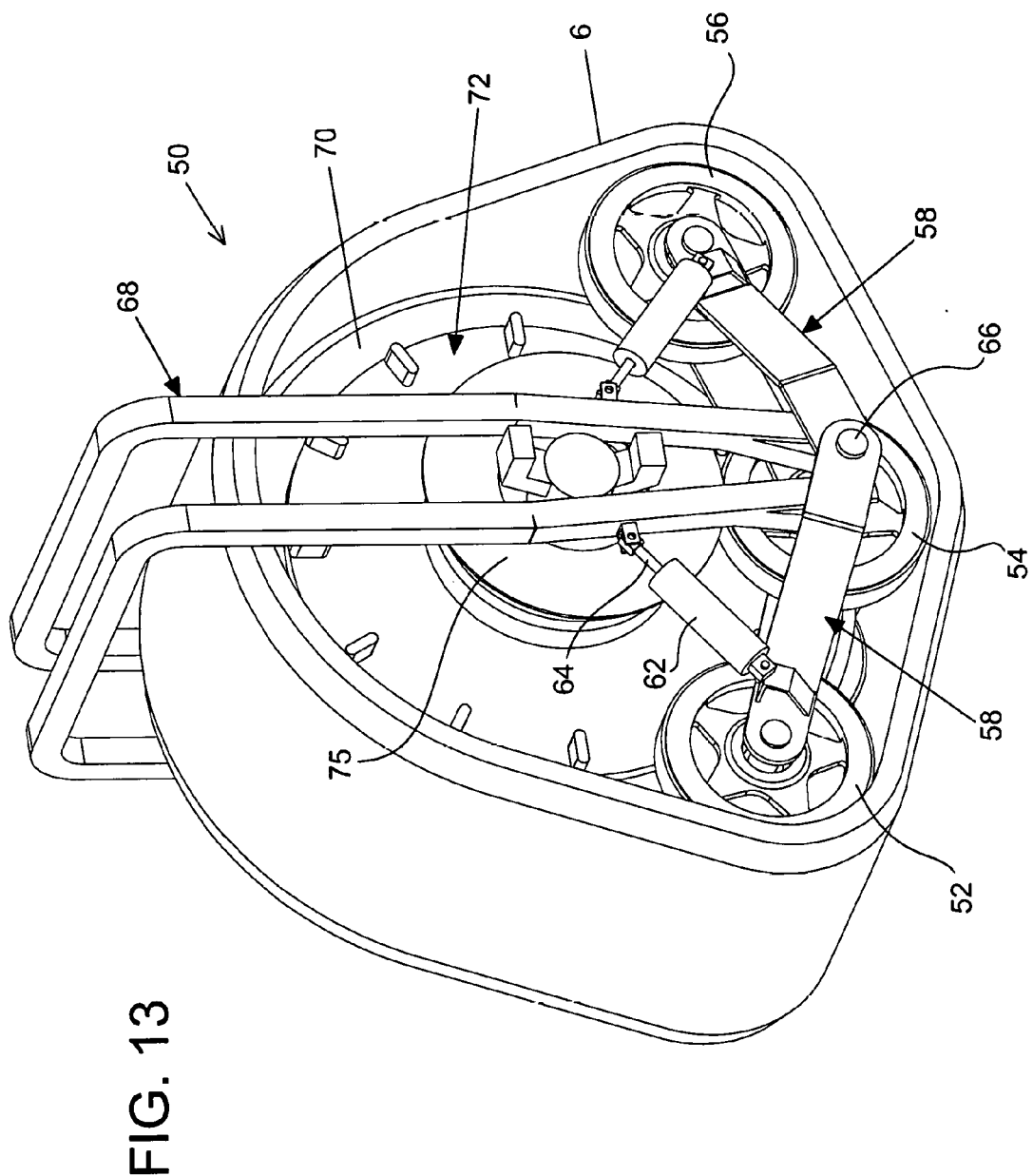
FIG. 13 is a perspective drawing of the track assembly of FIG. 7 showing the back side of the assembly with the bladder partially inflated and the idler wheels partially retracted.
Figure 14:
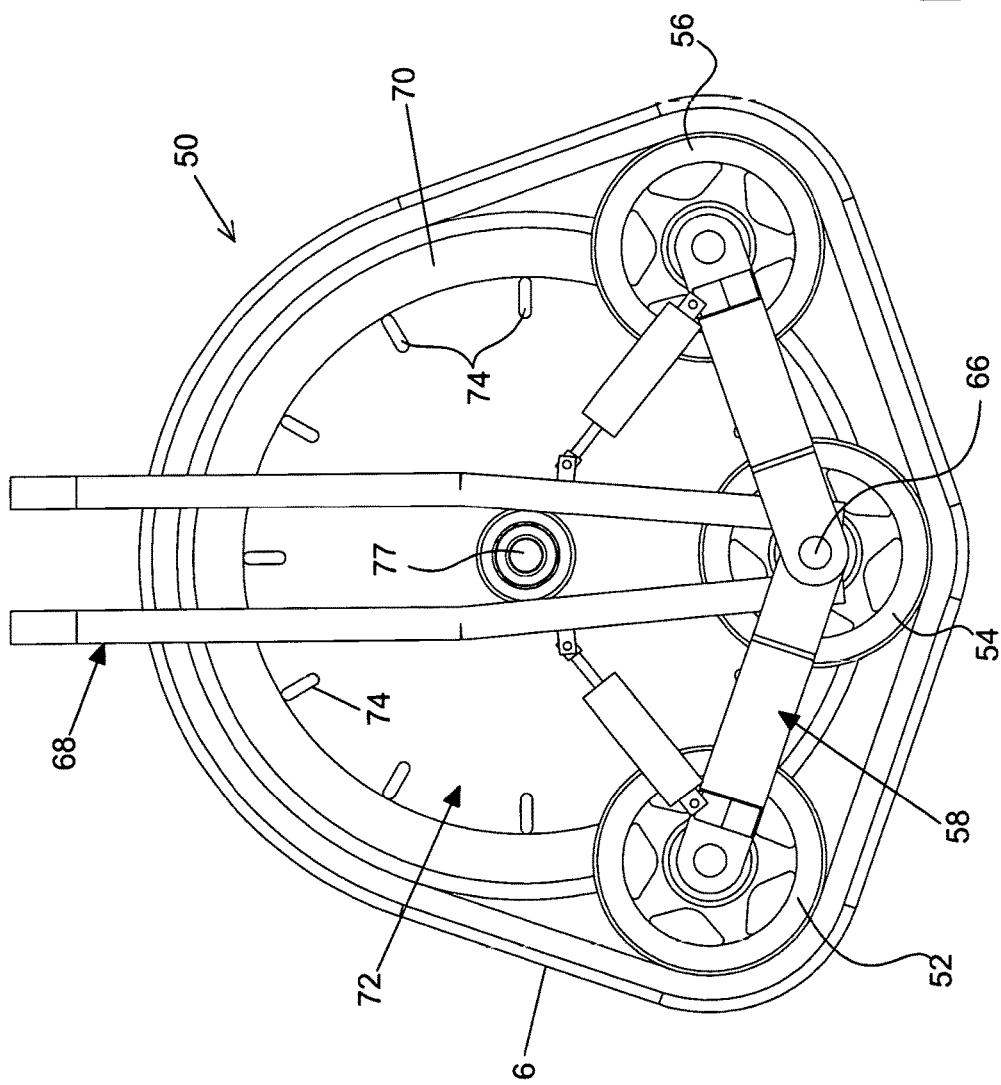
FIG. 14 is a plan view to the front side of the track assembly of FIG. 7 with the bladder partially inflated and the idler wheels partially retracted.
Figure 15:
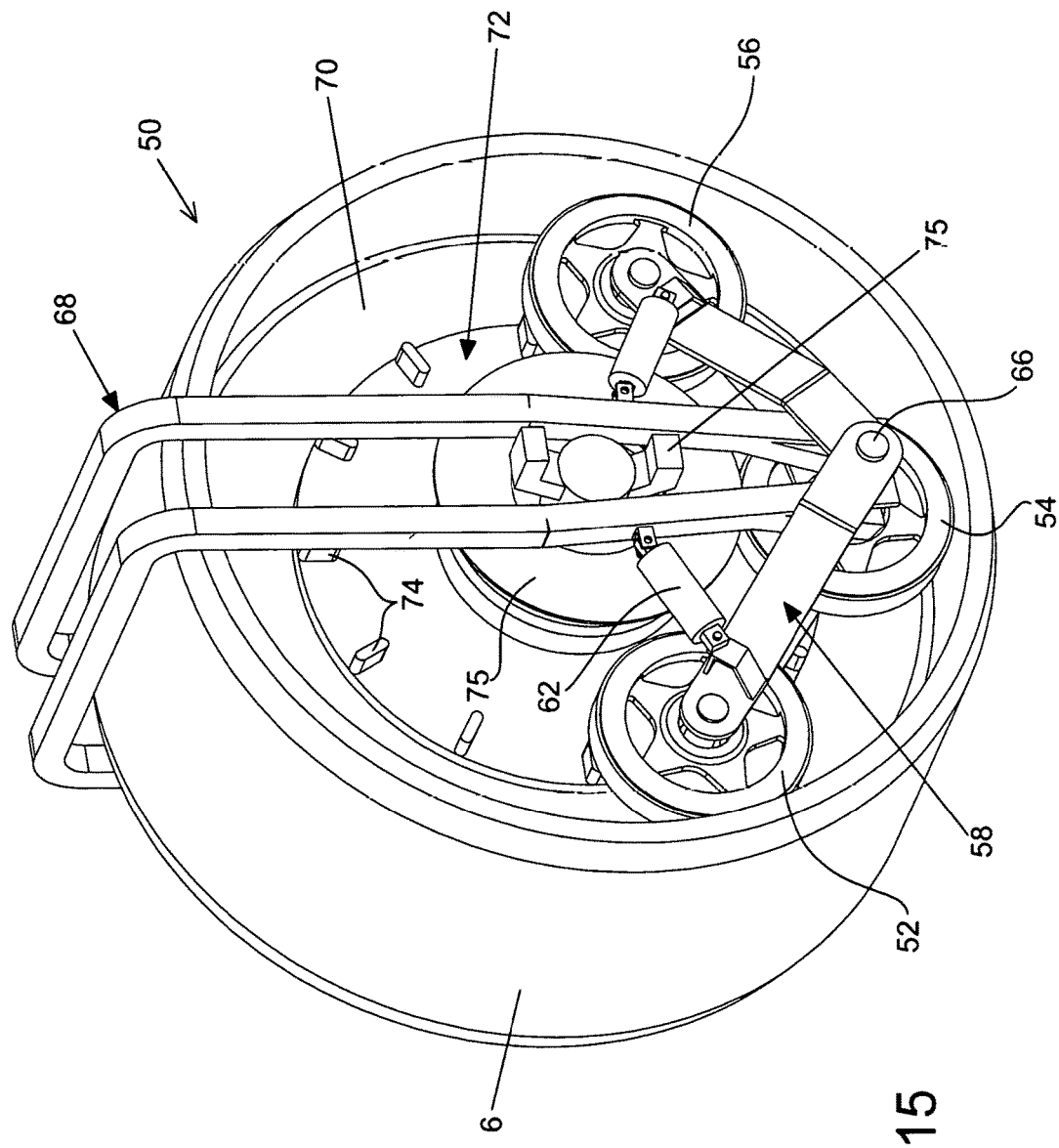
FIG. 15 is a perspective drawing of the track assembly of FIG. 9 showing the back side of the assembly with the bladder fully inflated and the idler wheels fully retracted.
Figure 16:
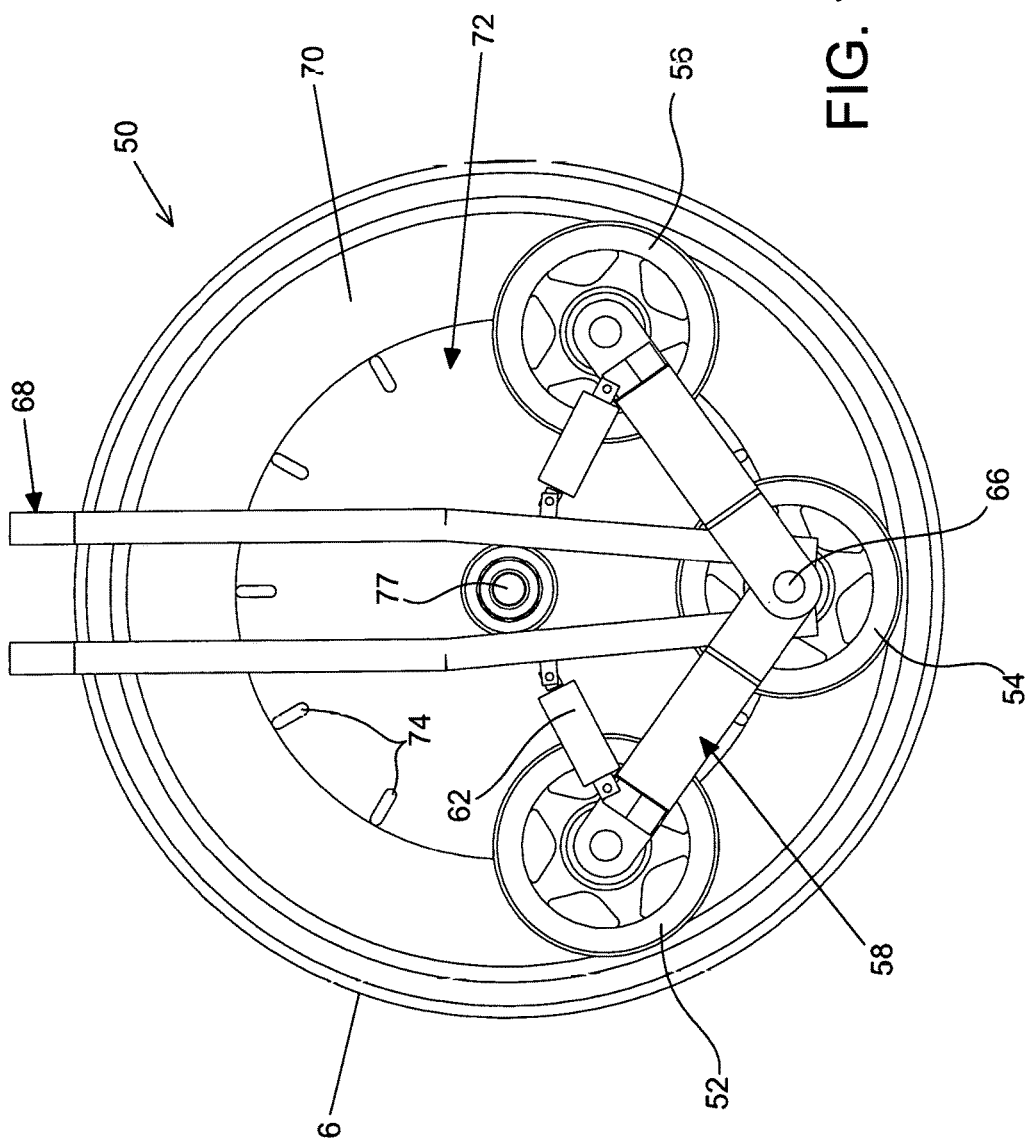
FIG. 16 is a plan view to the front side of the track assembly of FIG. 9 with bladder fully inflated and the idler wheels fully retracted.
Figure 17:
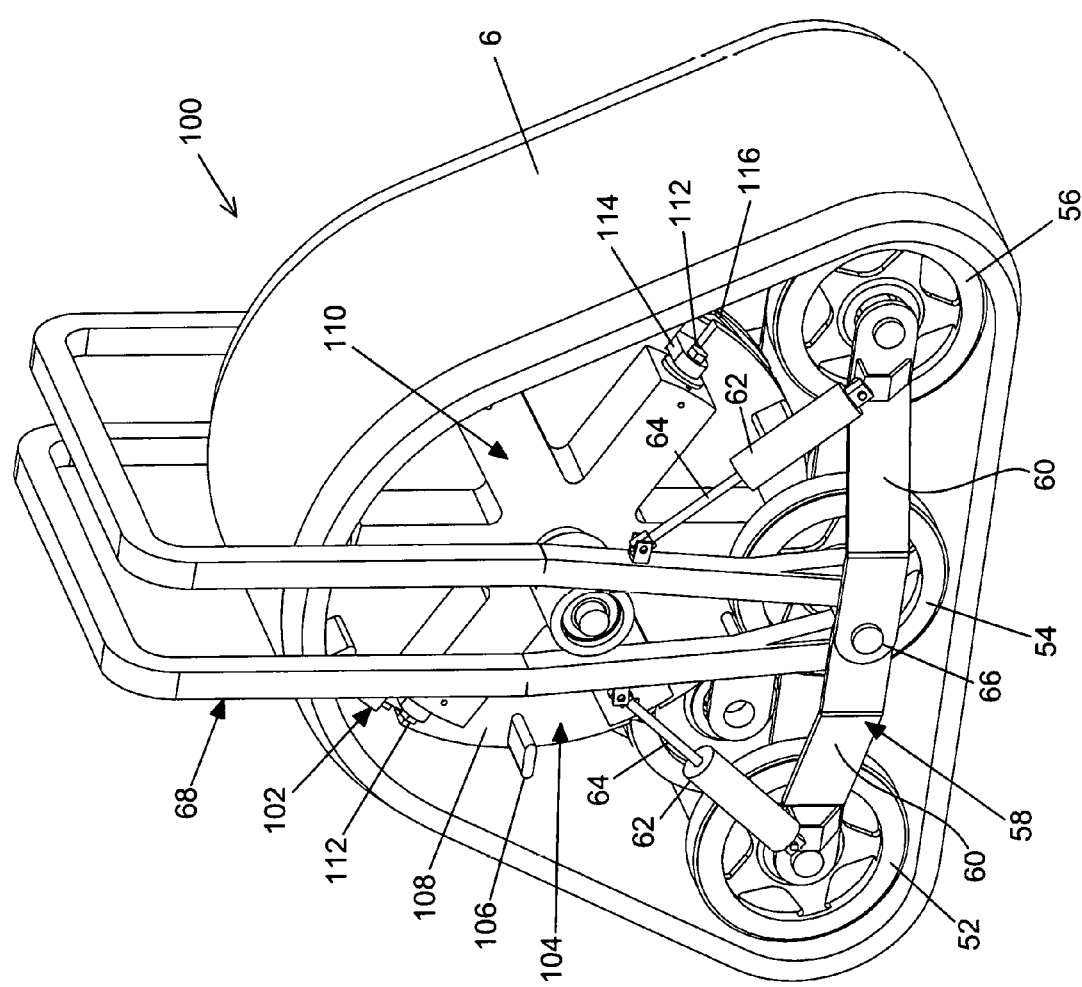
FIG. 17 is a perspective drawing of a shape changing track assembly useable with the vehicle of FIG. 1 wherein an adjustable idler wheel suspension and multiple track support segments (e.g. pie-shaped plates) extend and retract relative to a track drive sprocket to support the track and cooperate to vary the contact surface track profile with the terrain and wherein the idler wheels are rotated to a track condition.
Figure 18:
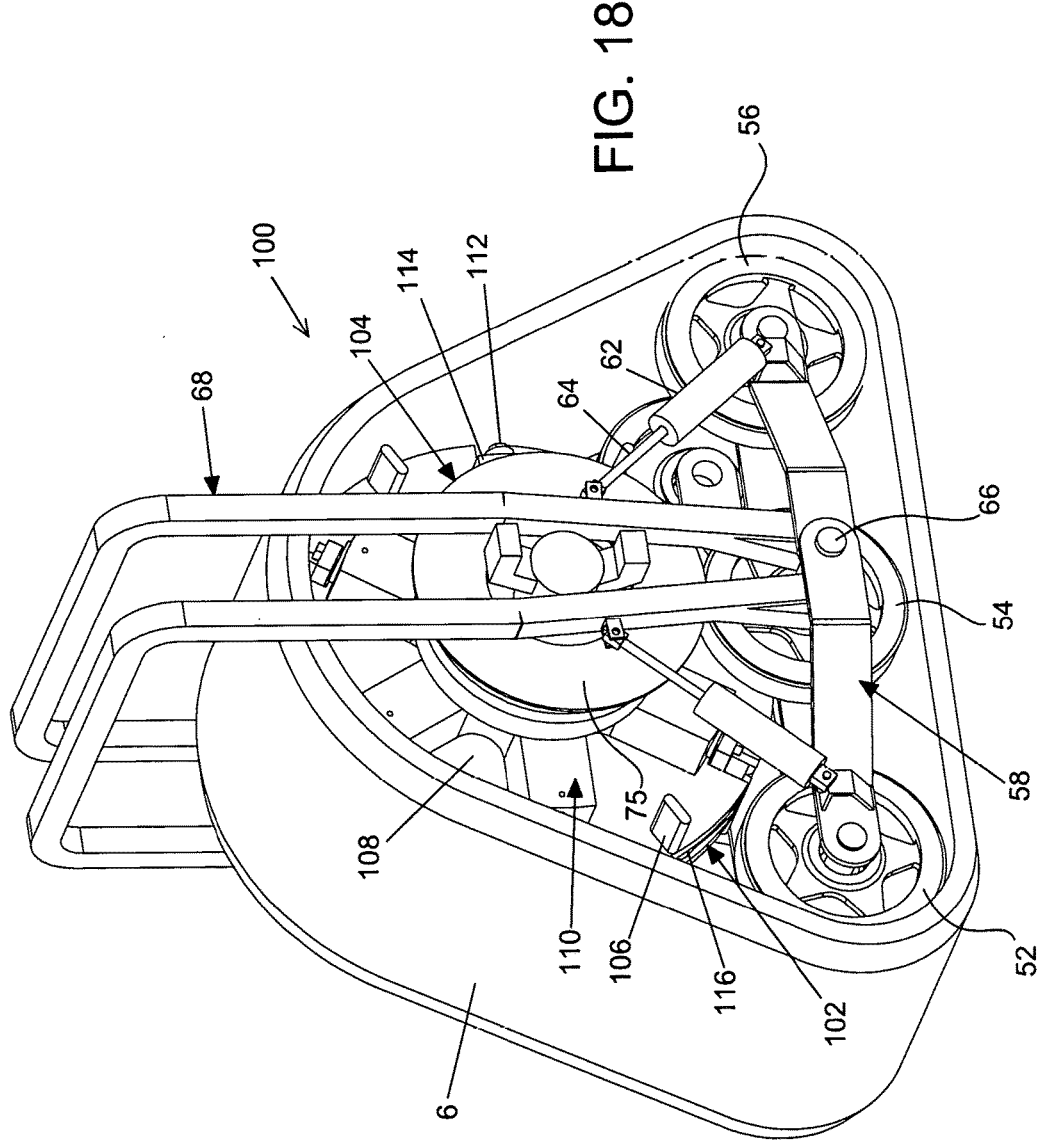
FIG. 18 is a perspective drawing showing a rear view of the track assembly of FIG. 17 with the track support segments fully retracted to a track condition.
Figure 19:
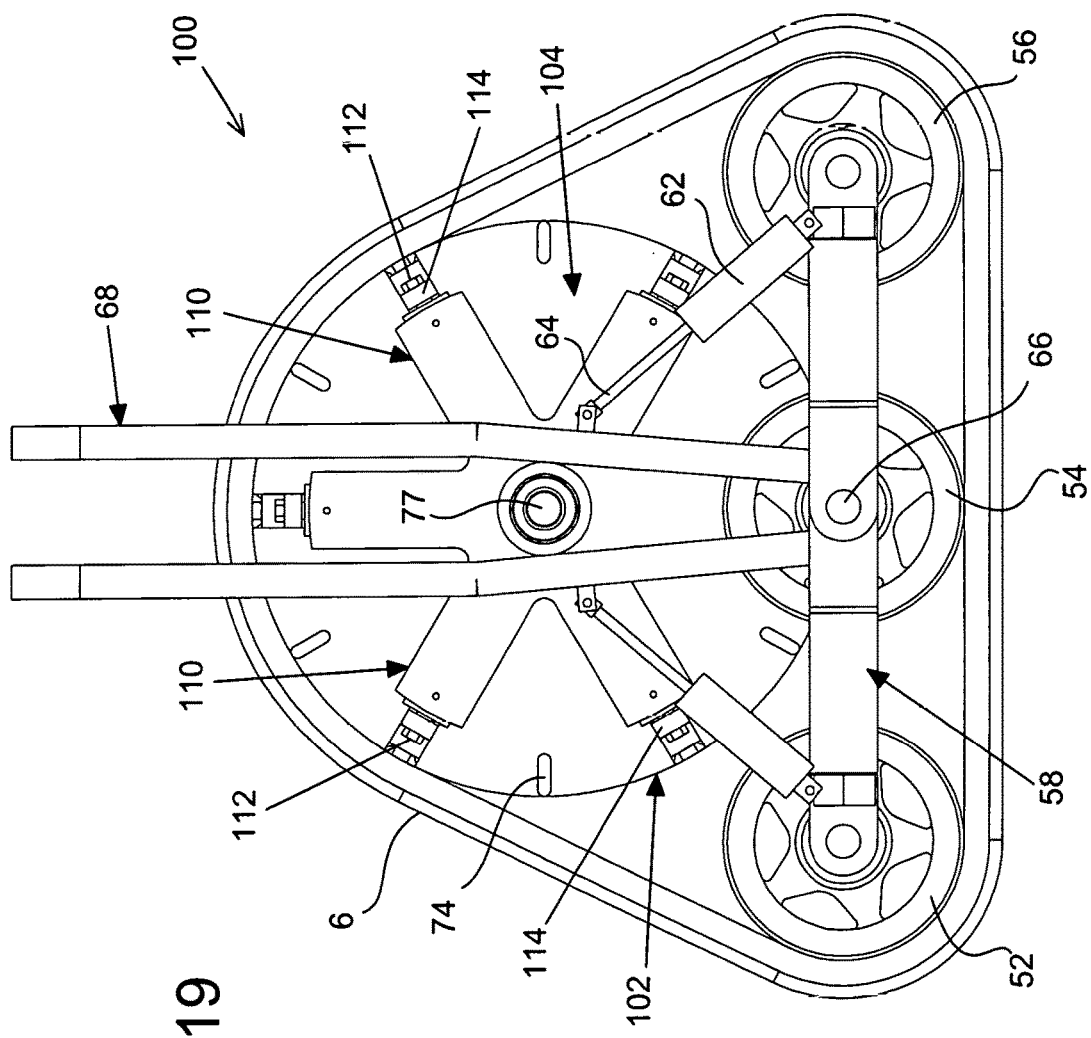
FIG. 19 is a plan view showing the front side of the track assembly of FIG. 17 with the track support segments fully retracted to a track condition.
Figure 20:
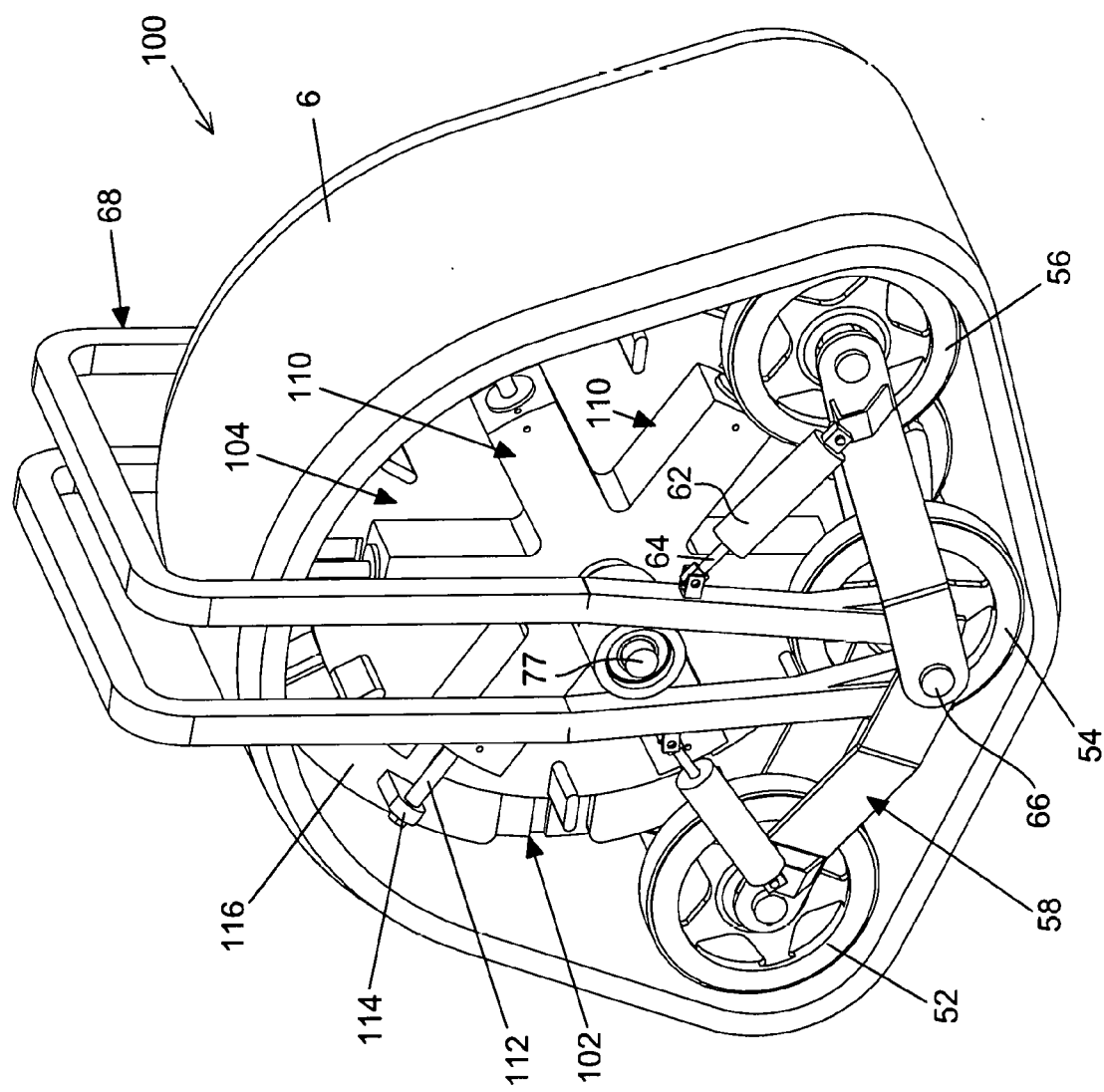
FIG. 20 is a perspective drawing of the front side of the track assembly of FIG. 17 showing the idler wheel rocker arms partially retracted and the track support segments partially extended.
Figure 21:
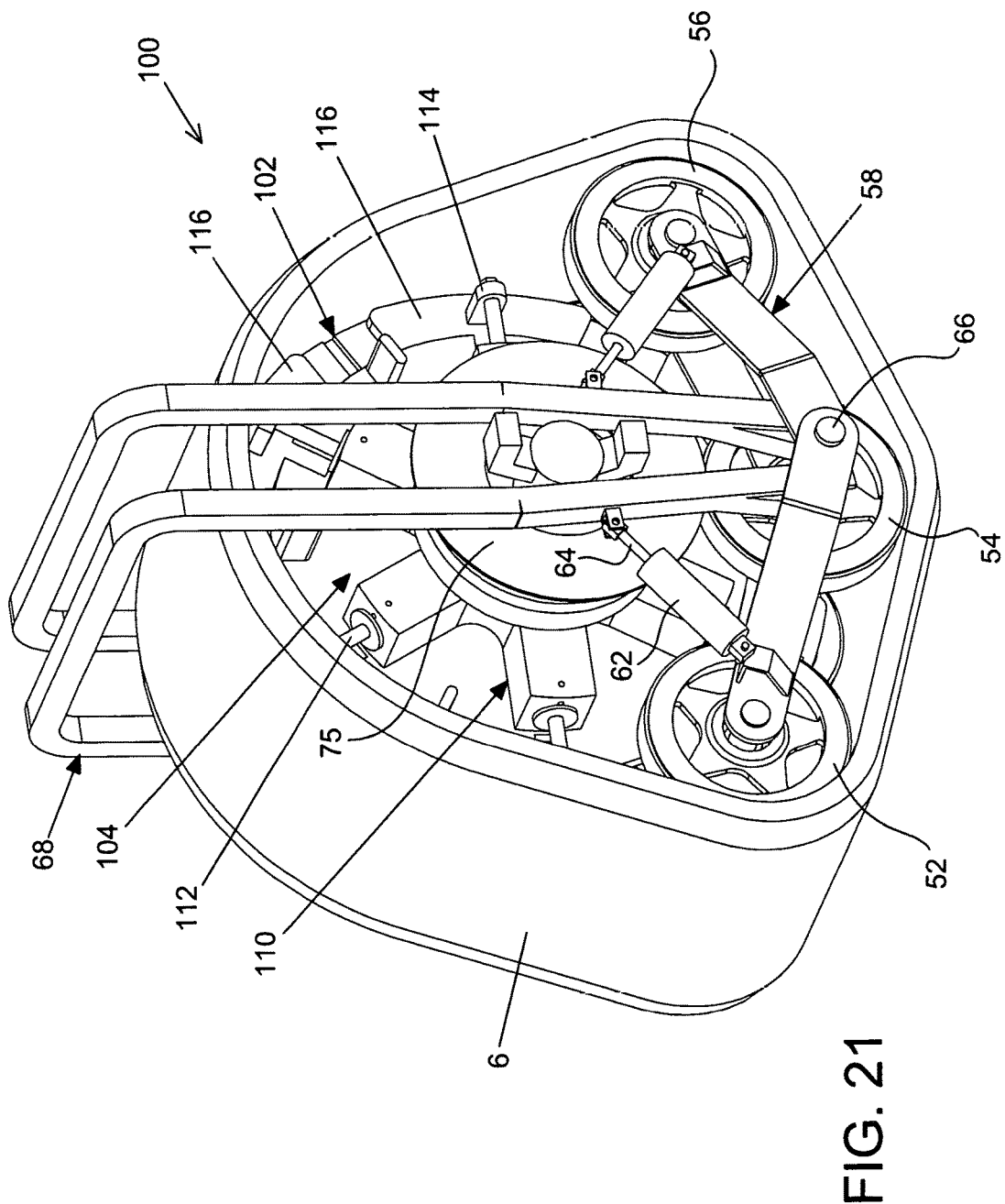
FIG. 21 is a perspective drawing showing the rear of the track assembly of FIG. 20 with the idler wheel rocker arms partially retracted and the track support segments partially extended.
Figure 22:
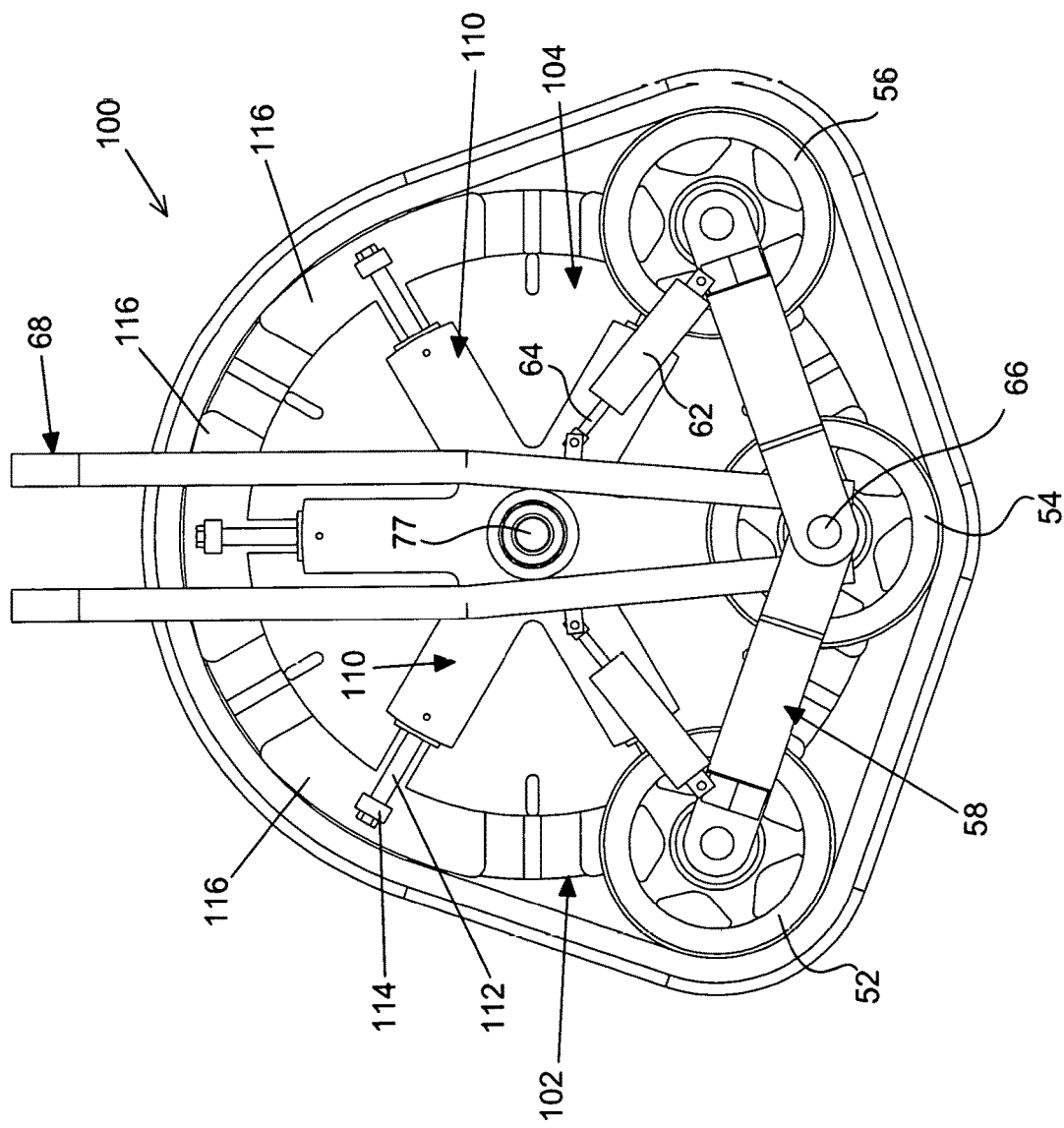
FIG. 22 is a plan view showing the front side of the track assembly of FIG. 20 with the idler wheel rocker arms partially retracted and the track support segments partially extended.
Figure 23:
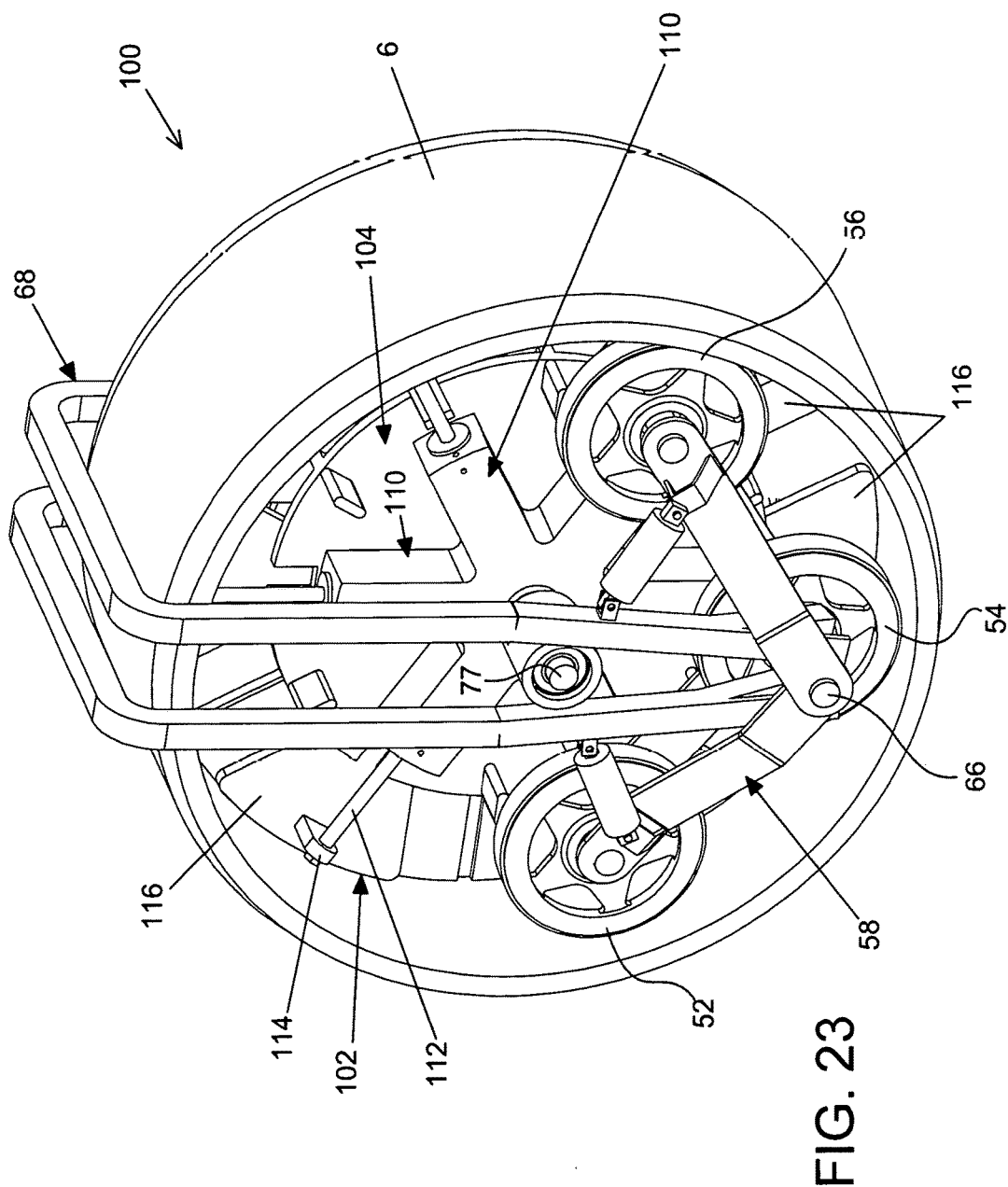
FIG. 23 is a perspective drawing of the track assembly of FIG. 17 showing the front side with the idler wheel rocker arms fully retracted and the track support segments fully extended to configure the track into a circular or wheel profile.
Figure 24:
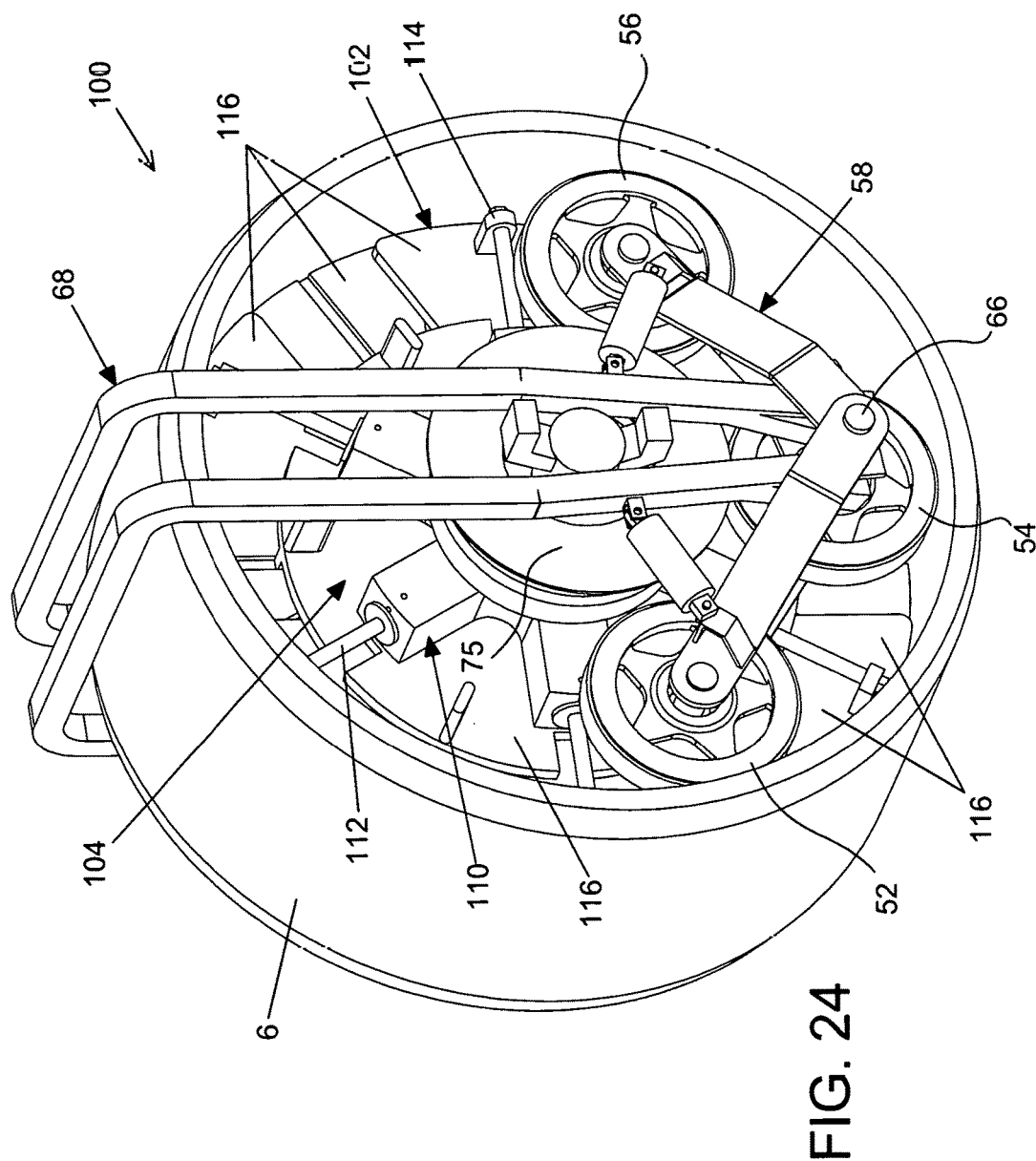
FIG. 24 is a perspective drawing showing the rear side of the track assembly of FIG. 17 with the idler wheel rocker arms fully retracted and the track support segments fully extended to configure the track into a circular or wheel profile.
Figure 25:
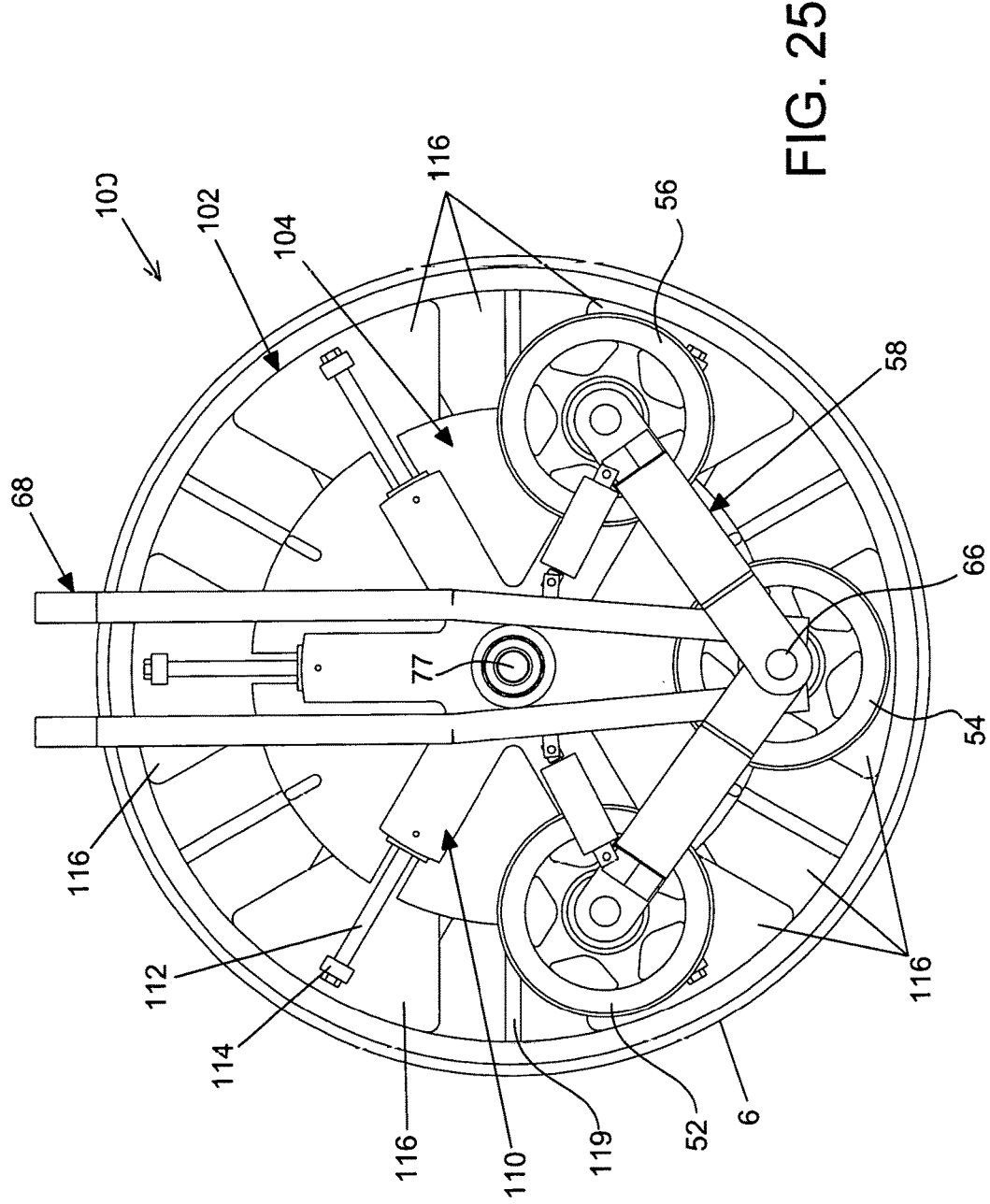
FIG. 25 is a plan view showing the front side of the track assembly of FIG. 17 with the idler wheel rocker arms fully retracted and the track support segments fully extended to configure the track into a circular or wheel profile.
Figure 26:
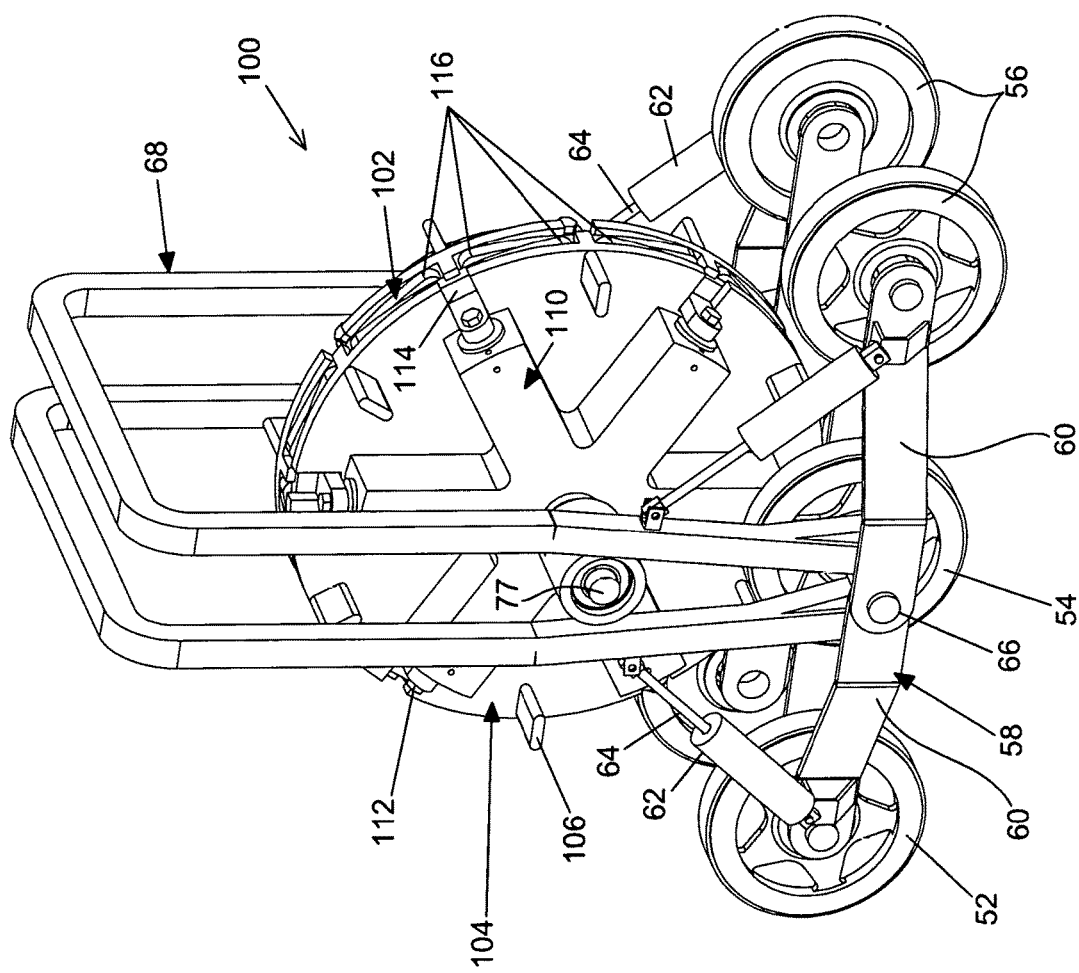
FIG. 26 is a perspective drawing of the track assembly of FIG. 17 with the track removed and showing the track support segments fully retracted and idler wheel rocker arms fully extended.
Figure 27:
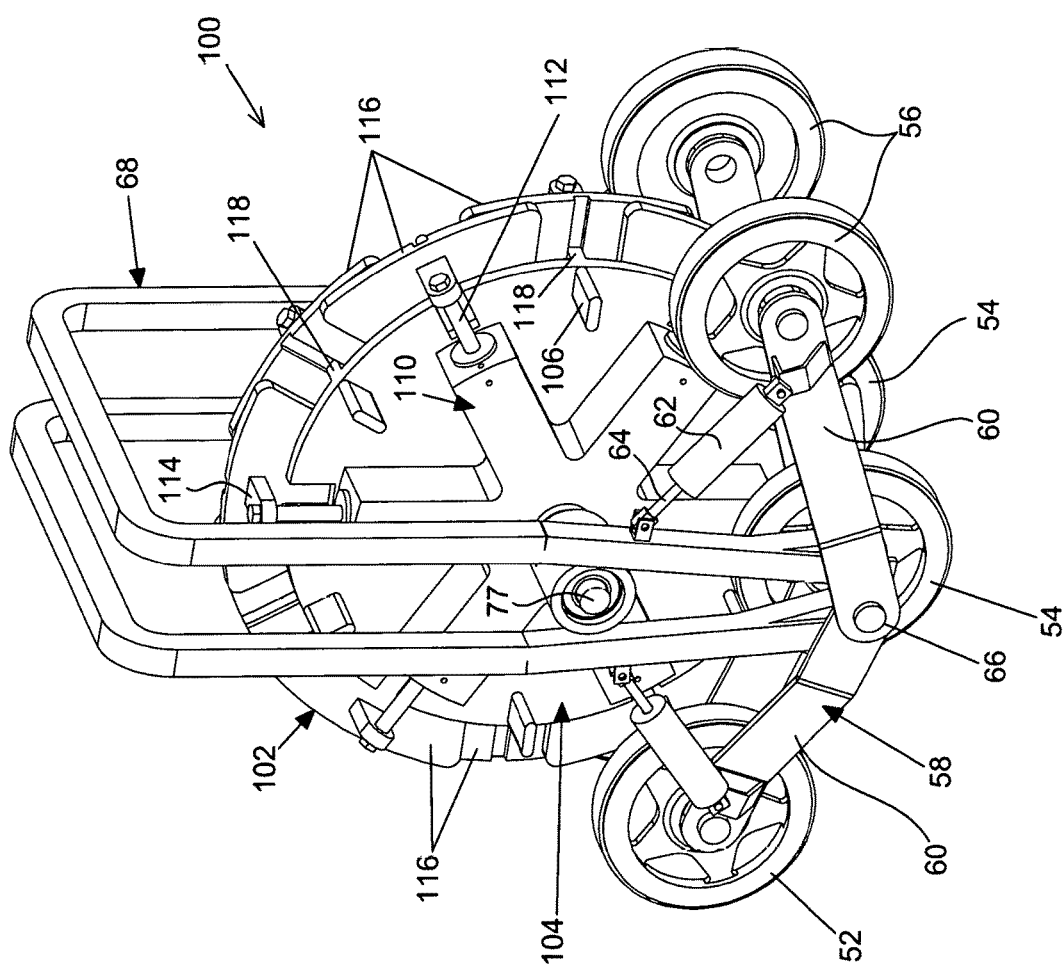
FIG. 27 is a perspective drawing of the track assembly of FIG. 17 with the track removed and showing the idler wheel rocker arms partially retracted and the track support segments partially extended.
Figure 28:
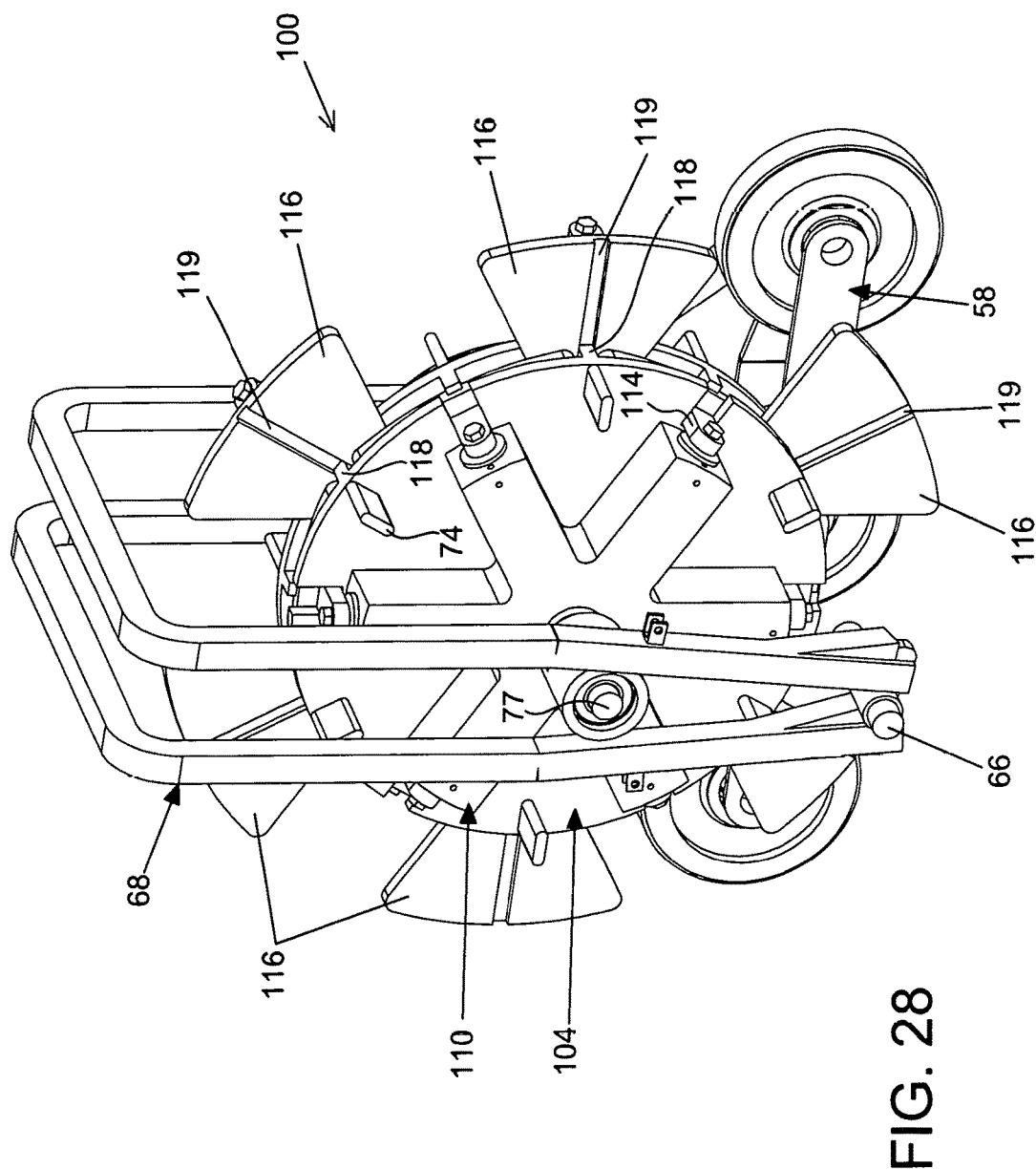
FIG. 28 is a perspective drawing of the track assembly of FIG. 17 with the track removed and showing the idler wheel rocker arms extended and further showing the track support segments fully extended.
Figure 29:
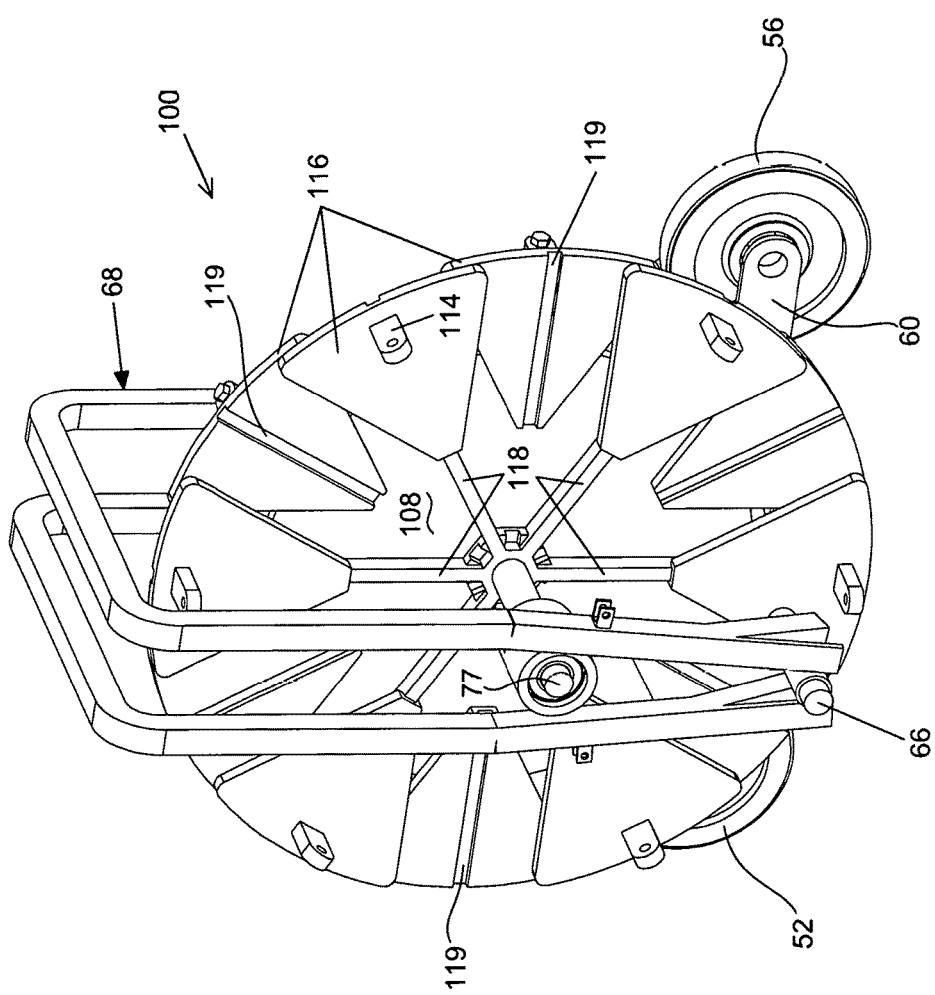
FIG. 29 is a perspective drawing of the track assembly of FIG. 17 with the track removed and showing the offset, opposed orientation of the two sets of track support segments and one of the two sets of slide rails that support the track support segments intermediate opposed drive sprocket plates.
Figure 30:
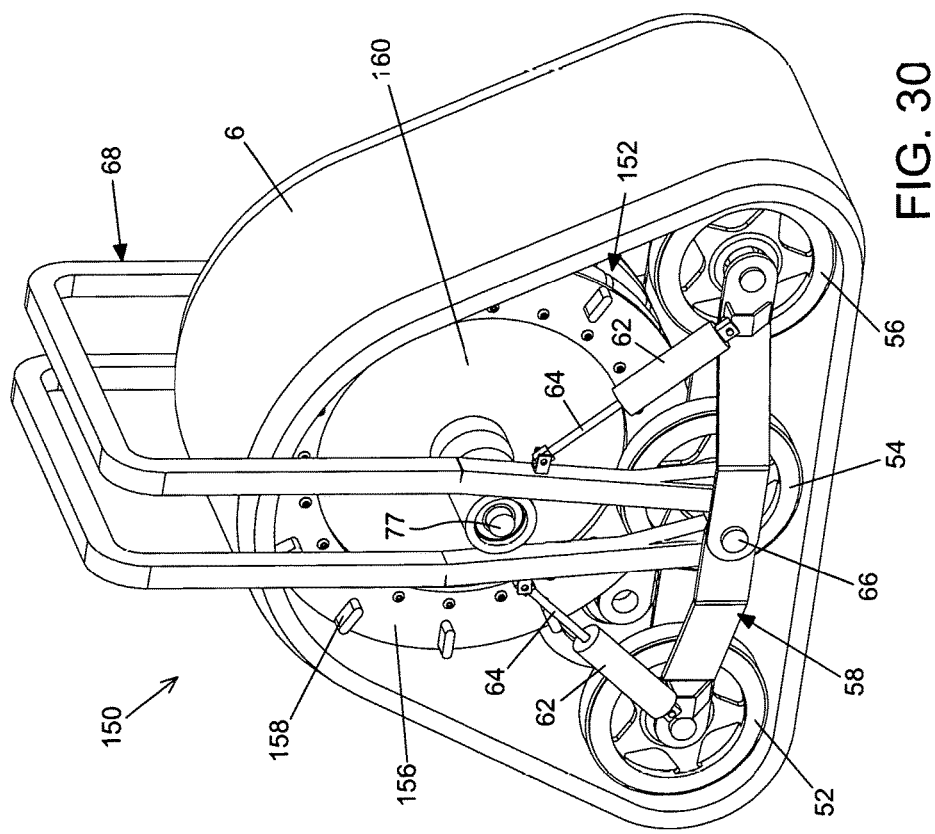
FIG. 30 is a perspective drawing of a shape changing track assembly useable with the vehicle of FIG. 1 wherein an adjustable idler wheel suspension and inflatable, bladder having segmented folds supports the track and cooperates to vary the track's contact surface profile with the terrain and wherein the idler wheels are rotated to a horizontal track condition.
Figure 31:
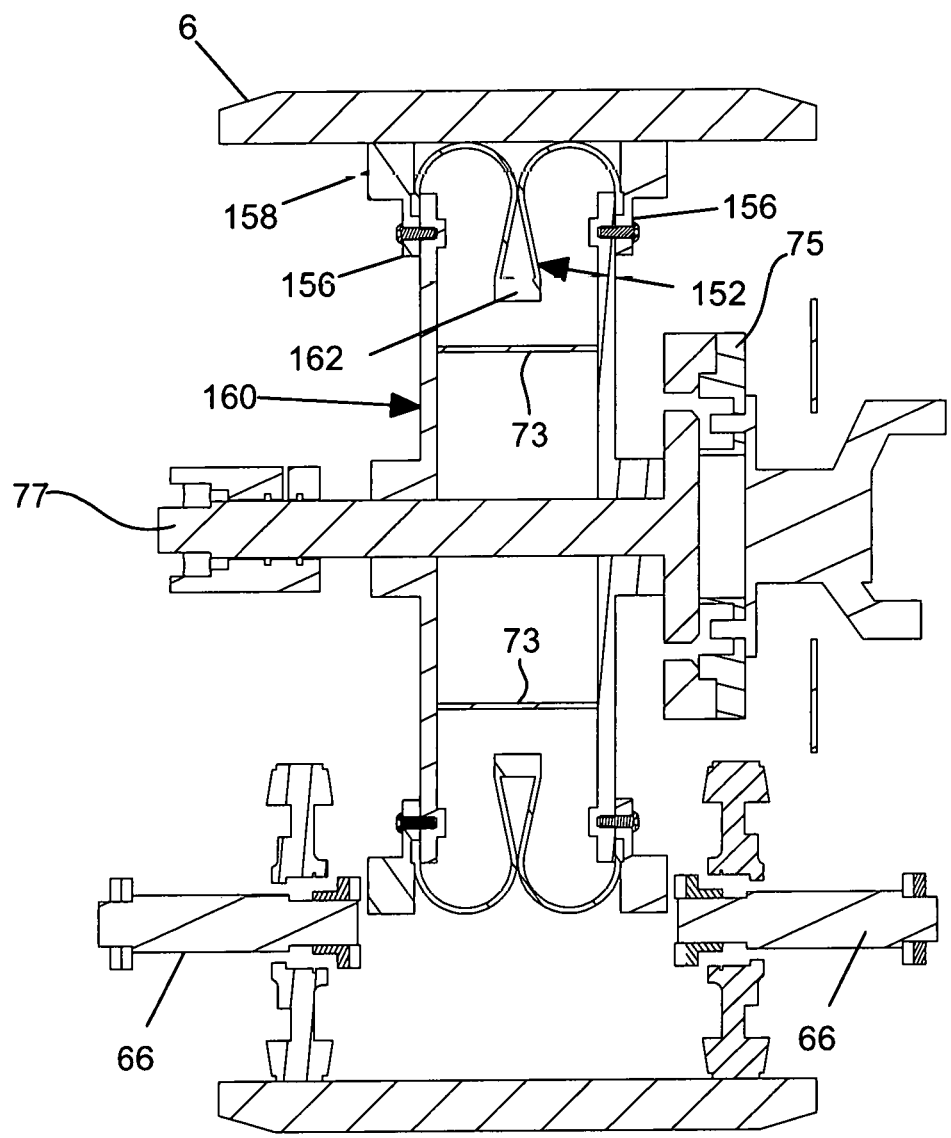
FIG. 31 is a cross section drawing of the track assembly of FIG. 30 showing the bladder deflated and the idler wheels rotated to a track condition.
Figure 32:
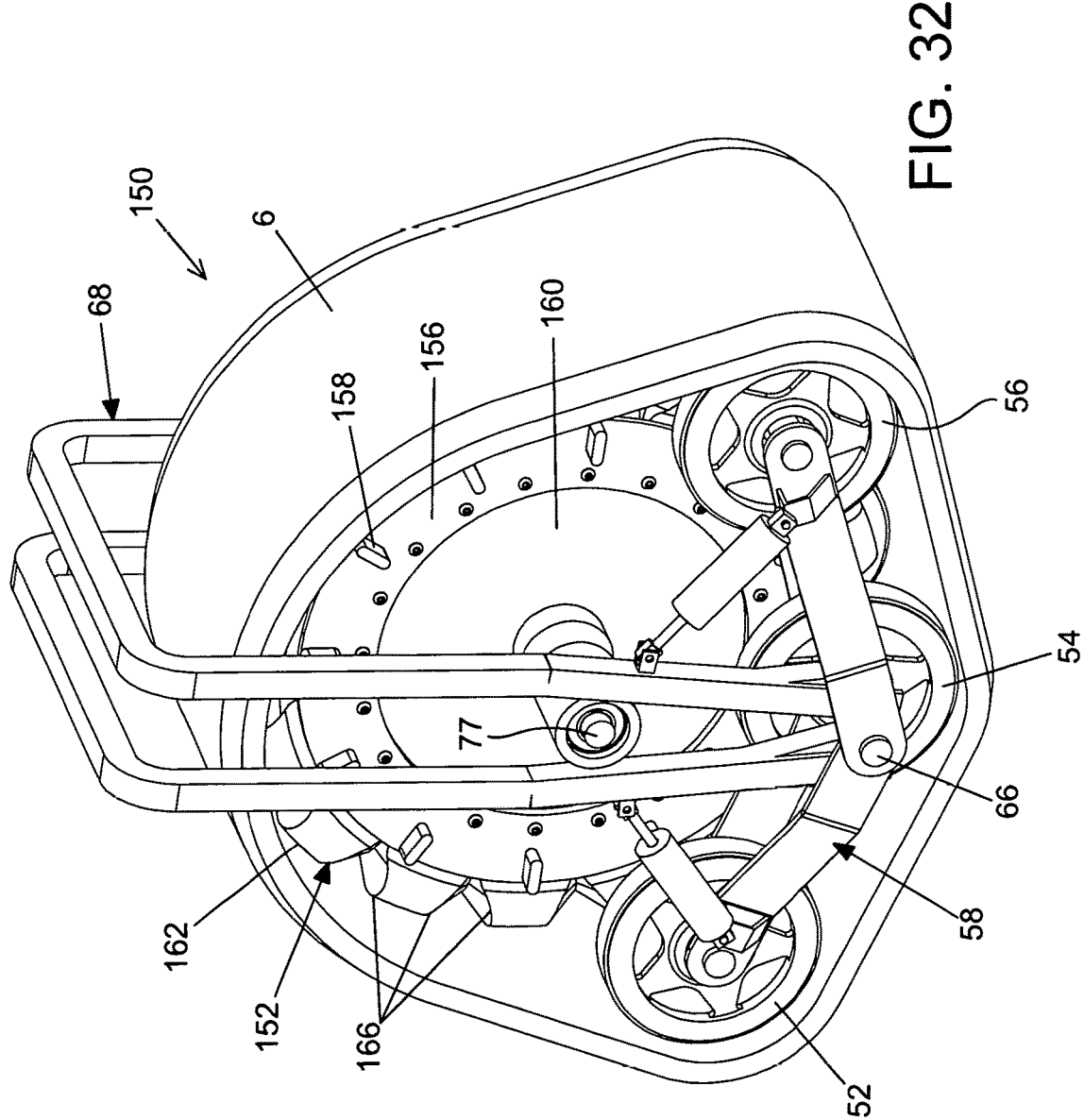
FIG. 32 is a perspective drawing of the track assembly of FIG. 30 showing the bladder partially inflated and the idler wheels partially rotated to a wheel condition.
Figure 33:
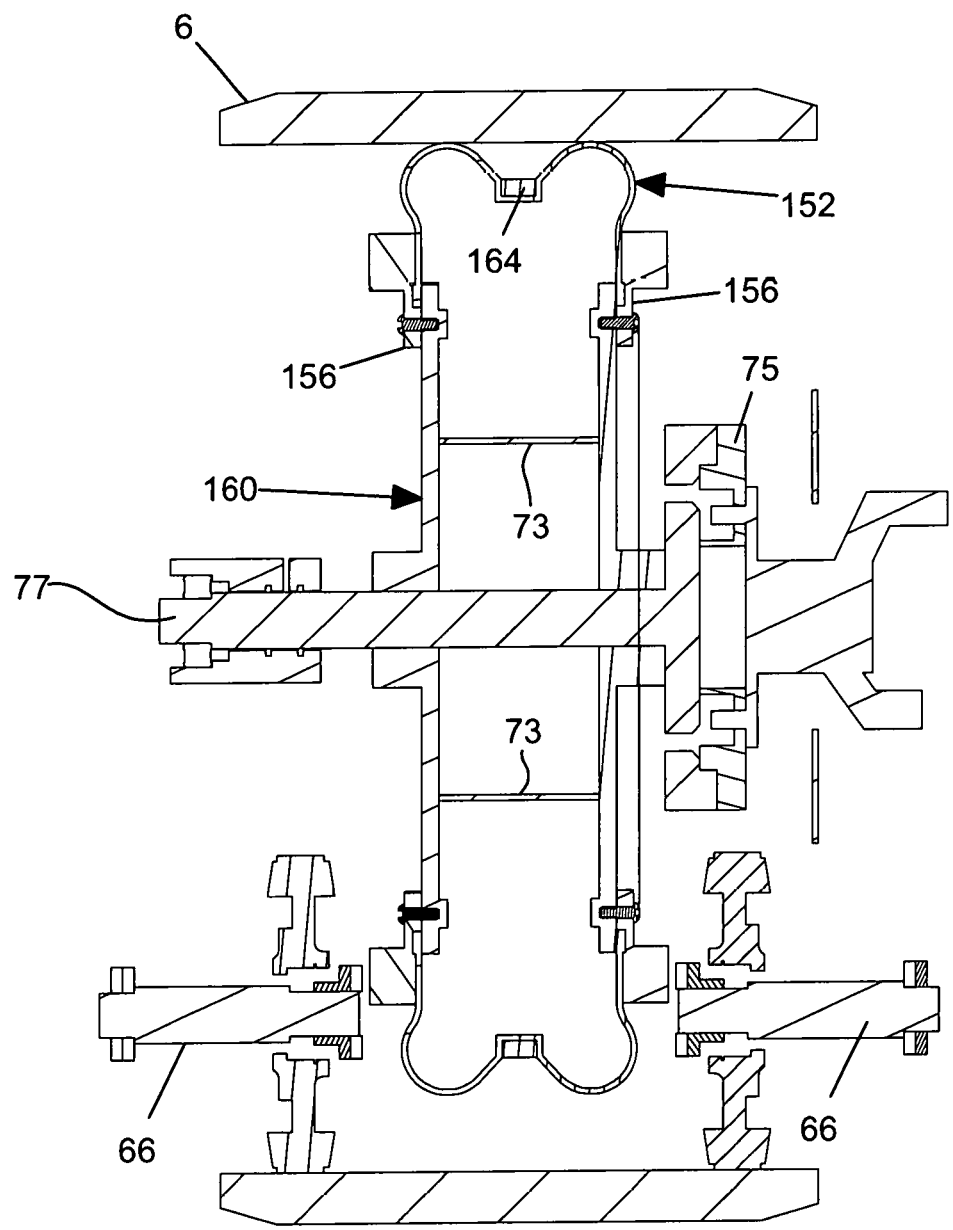
FIG. 33 is a cross section drawing of the track assembly of FIG. 30 showing the bladder partially inflated and the idler wheels rotated and partially retracted.
Figure 34:
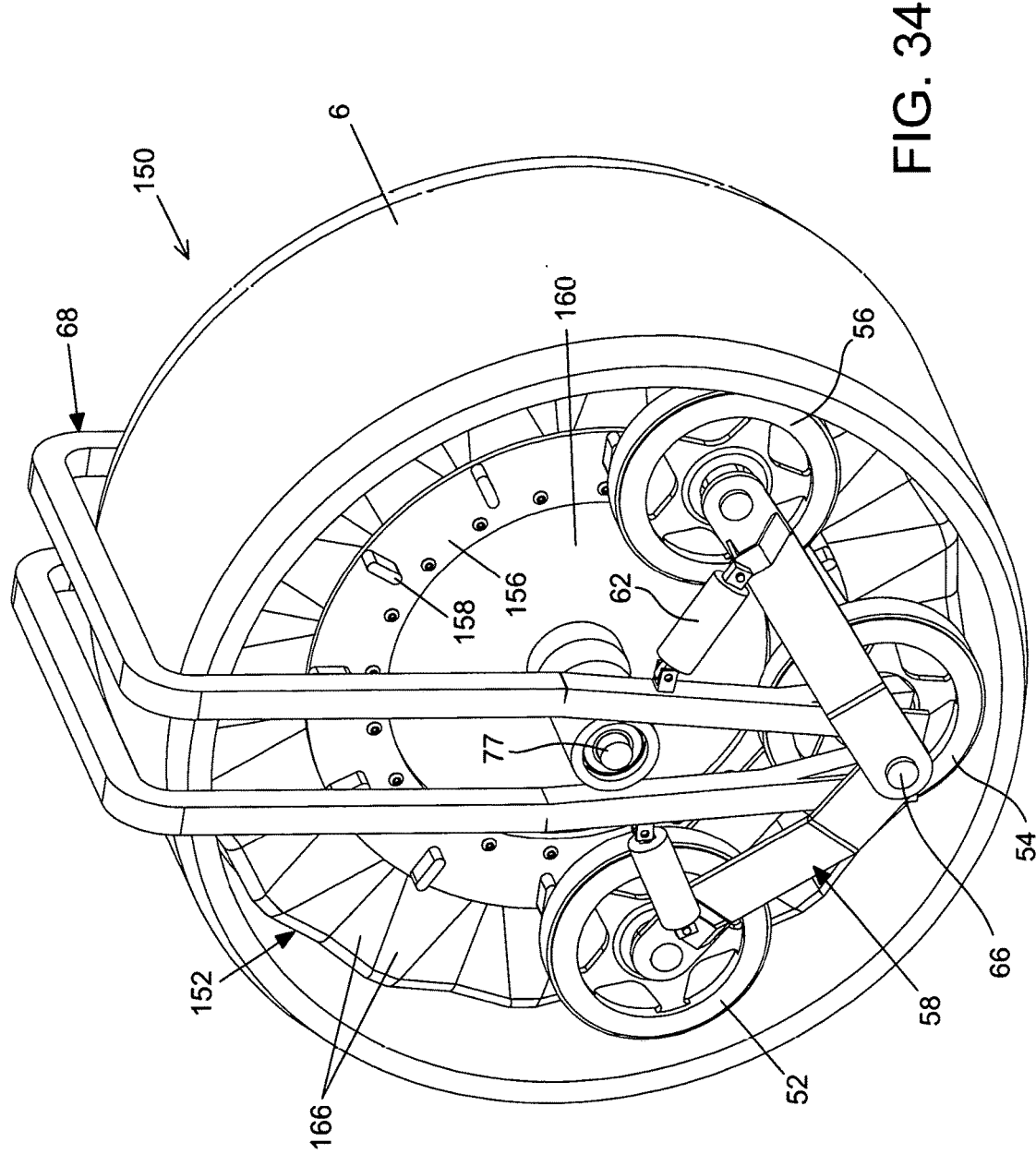
FIG. 34 is a perspective drawing of the track assembly of FIG. 30 showing the bladder fully inflated and the idler wheels fully retracted and rotated to a wheel condition.
Figure 35:
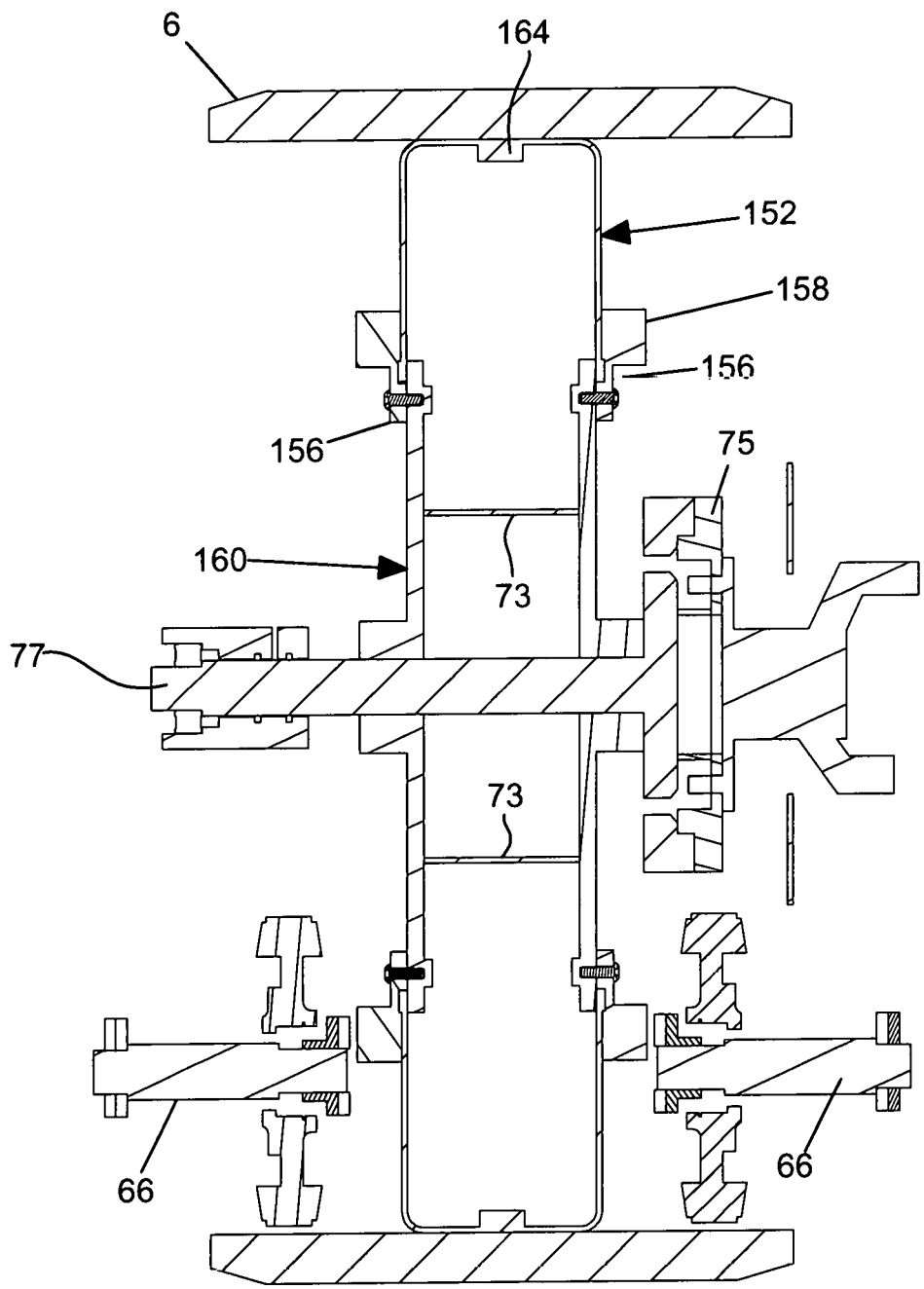
FIG. 35 is a cross section drawing of the track assembly of FIG. 30 showing the bladder fully inflated and the idler wheels fully retracted and rotated to a wheel condition.
Figure 36:
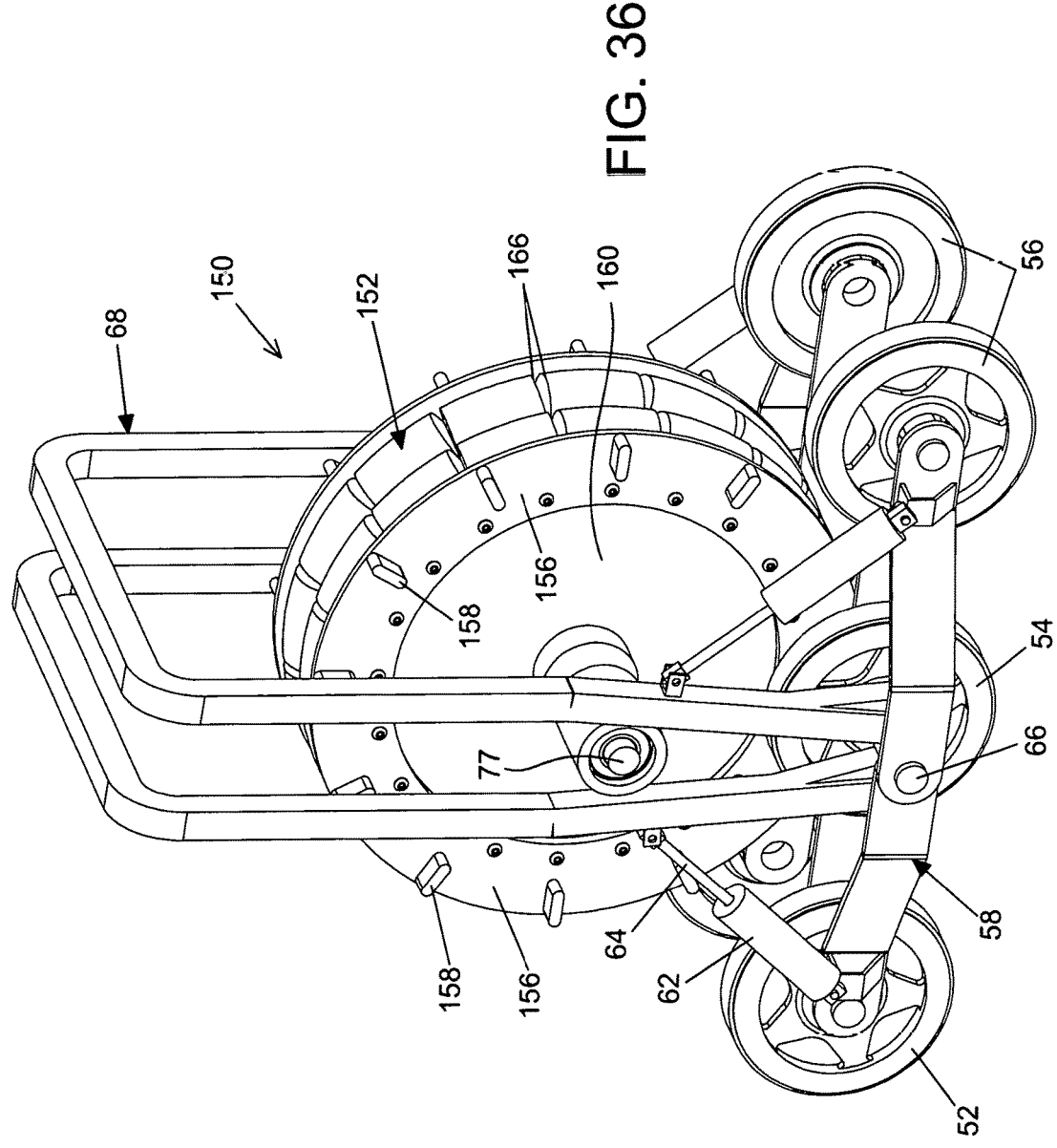
FIG. 36 is a perspective drawing of the front side of track assembly of FIG. 30 with the track removed and showing the idler wheel rocker arms fully extended and the bladder fully deflated.
Figure 37:
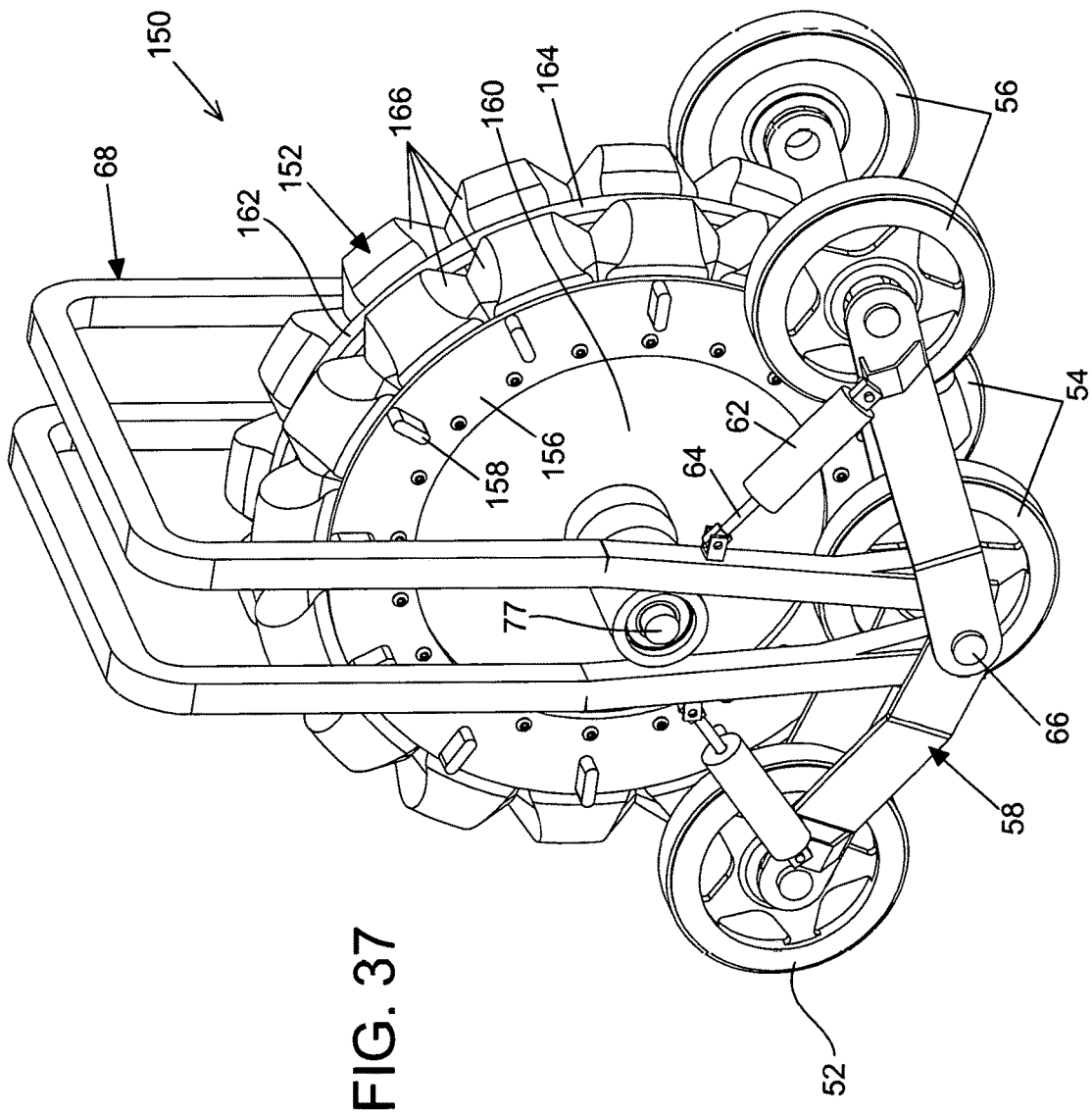
FIG. 37 is a perspective drawing of the front side of track assembly of FIG. 30 with the track removed and showing the idler wheel rocker arms partially extended and the bladder and segmented folds partially inflated.
Figure 38:
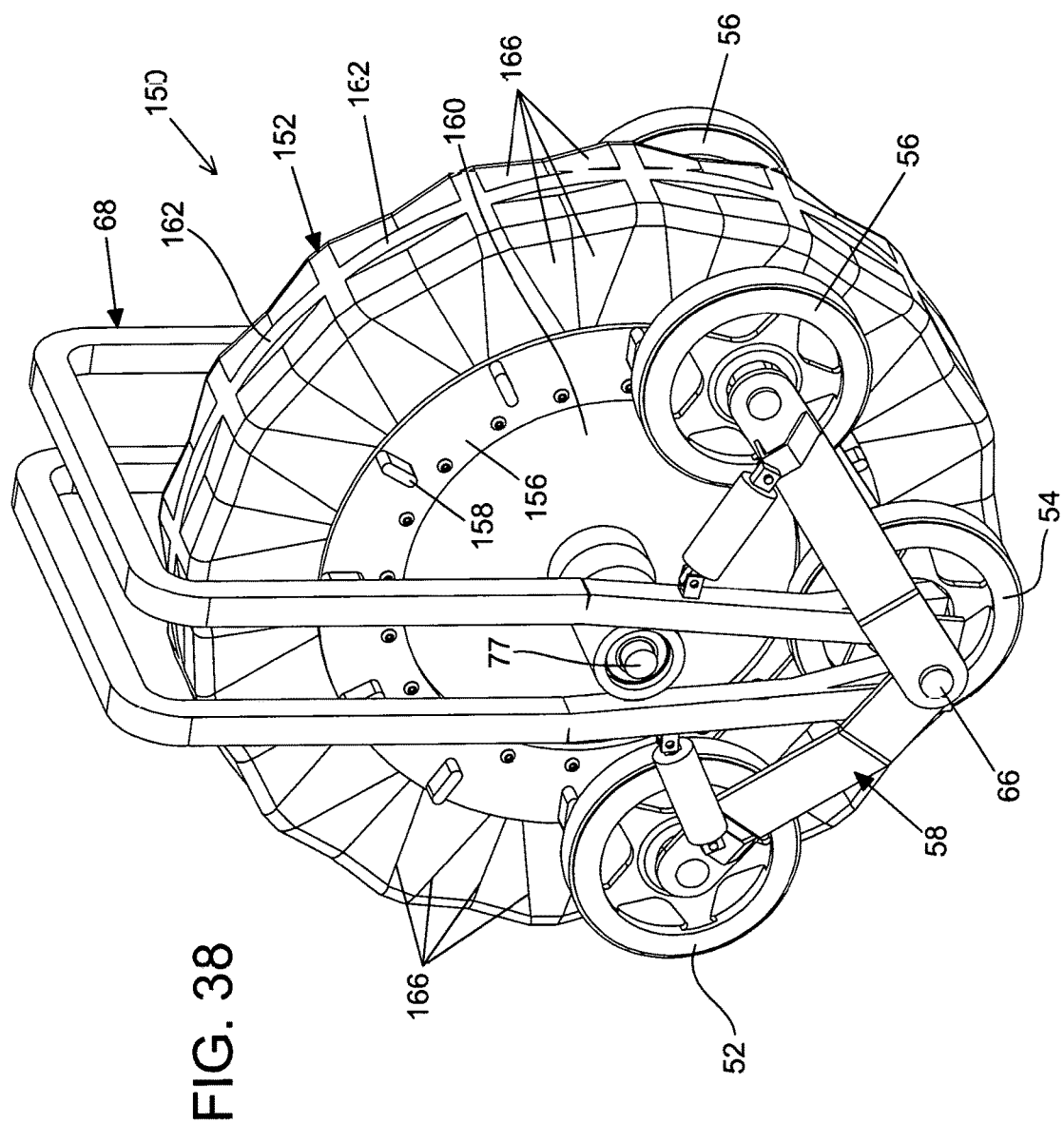
FIG. 38 is a perspective drawing of the front side of track assembly of FIG. 30 with the track removed and showing the idler wheel rocker arms fully retracted and the bladder fully inflated.
Figure 39:
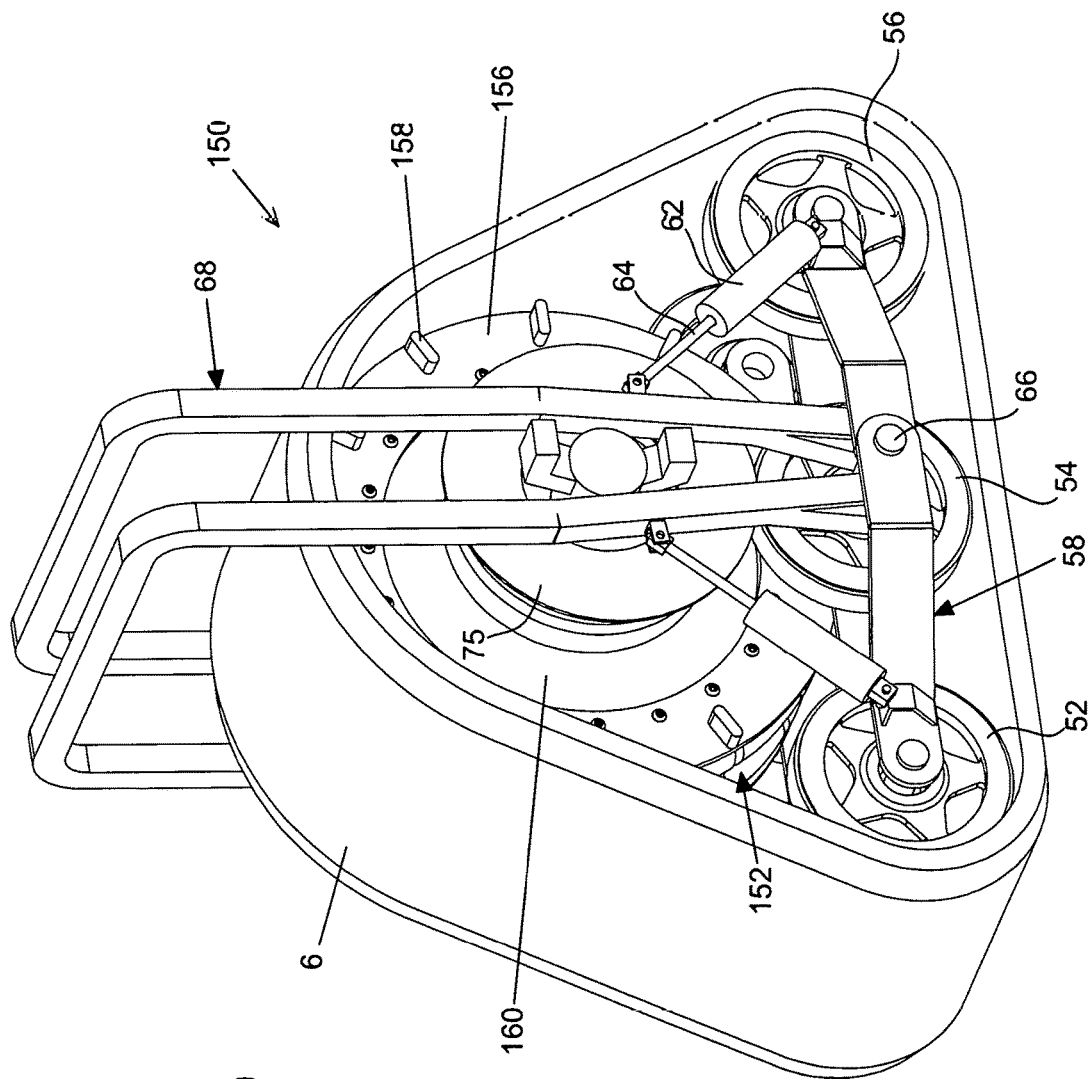
FIG. 39 is a perspective drawing of the track assembly of FIG. 30 showing the back side of the assembly with the bladder deflated and the idler wheels extended and rotated to a horizontal track condition.
Figure 40:
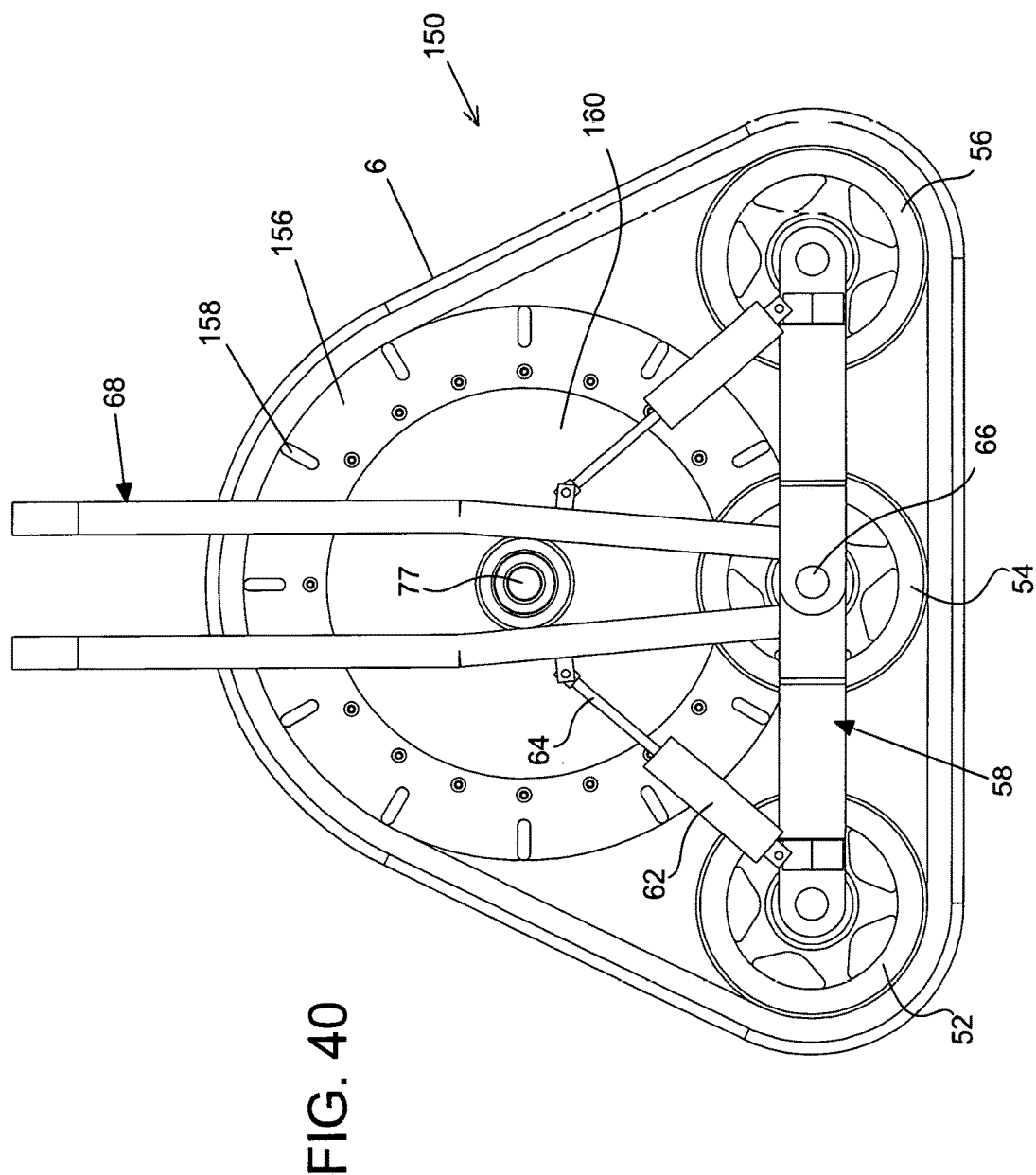
FIG. 40 is a plan view to the front side of the track assembly of FIG. 30 showing the bladder deflated and the idler wheels extended and rotated to a horizontal track condition.
Figure 41:
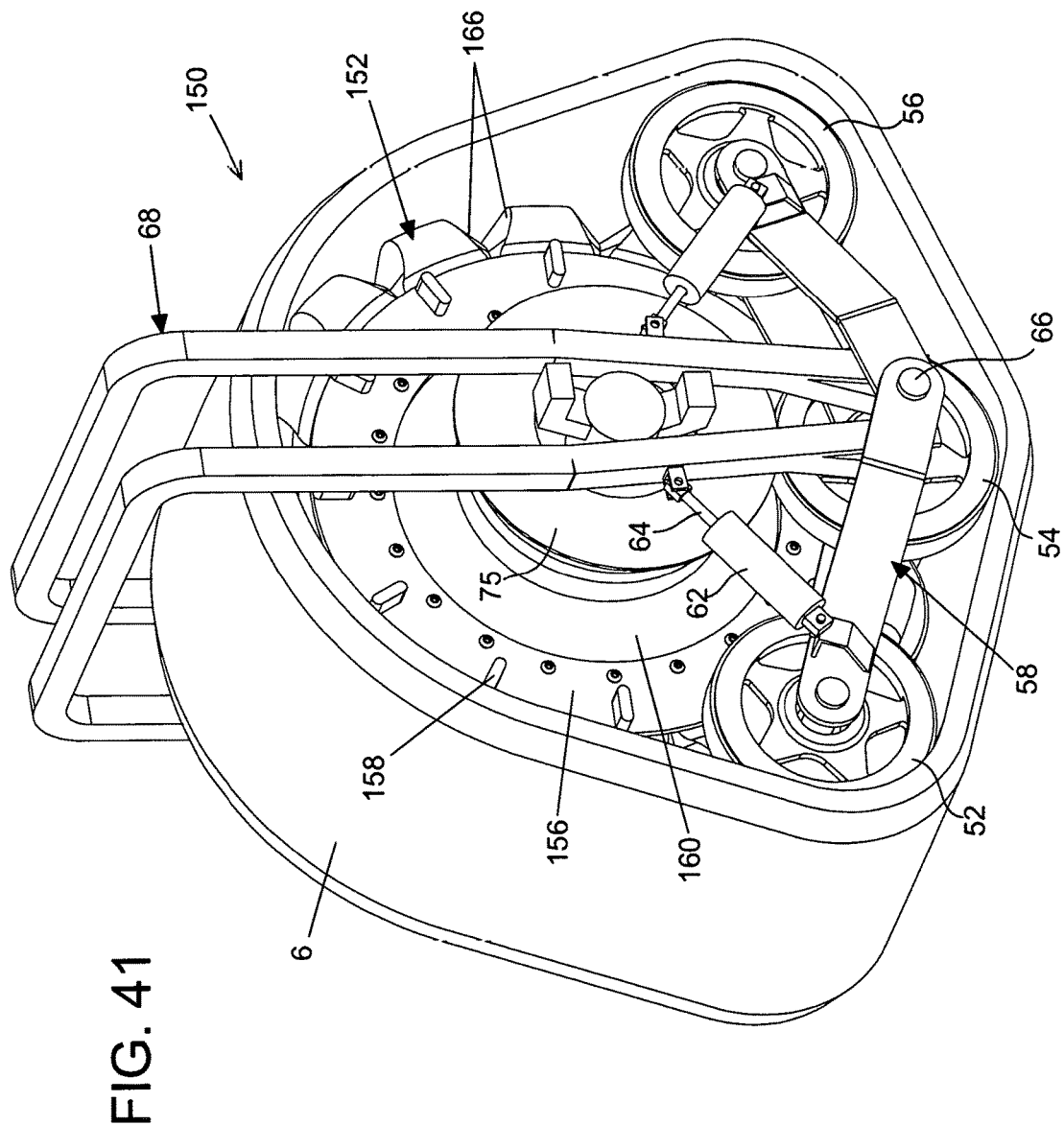
FIG. 41 is a perspective drawing of the back side of the track assembly of FIG. 30 showing the bladder partially inflated and the idler wheels partially retracted.
Figure 42:
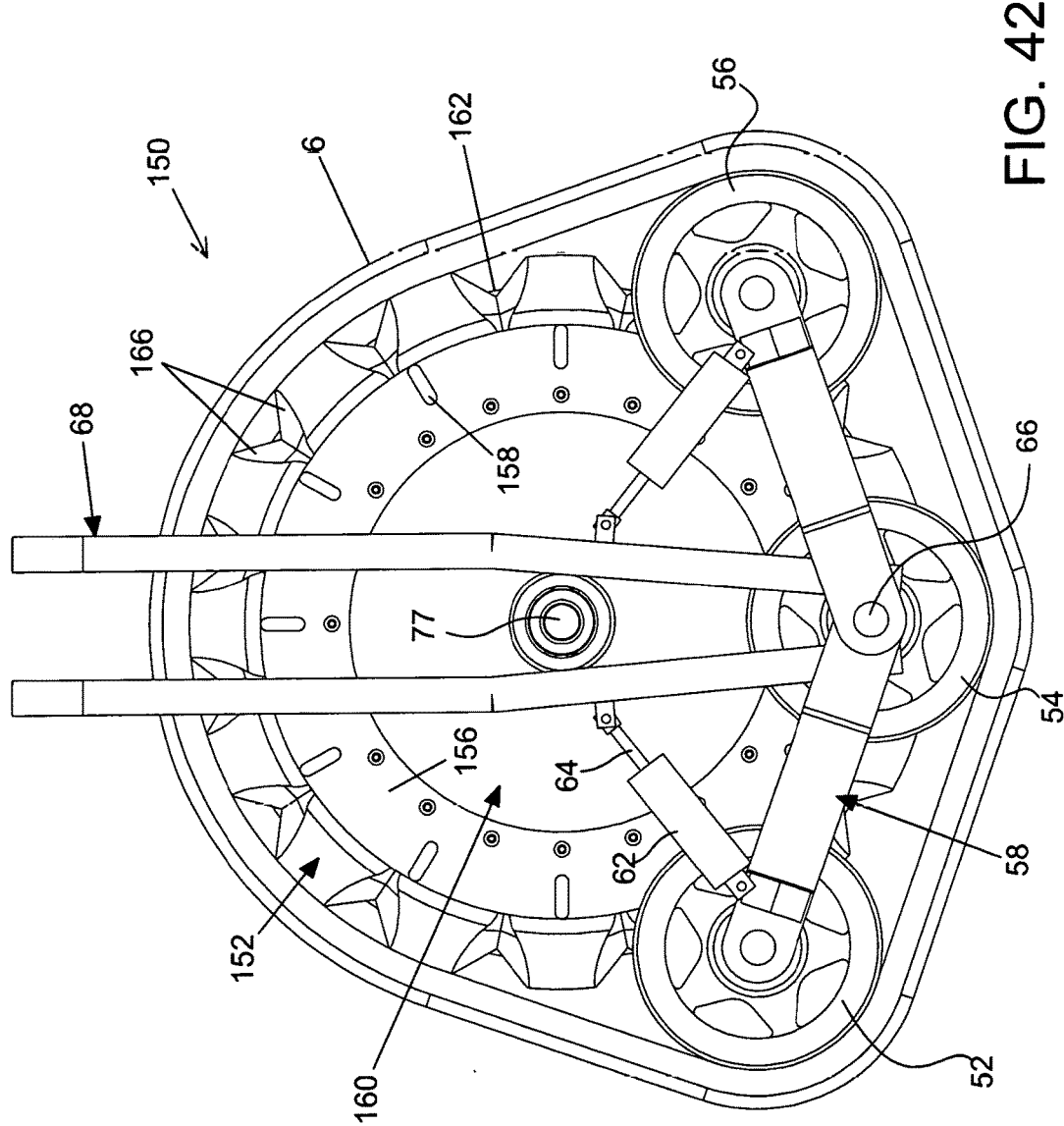
FIG. 42 is a plan view of the front side of the track assembly of FIG. 30 showing the bladder segmented folds partially inflated and the idler wheels partially retracted.
Figure 43:
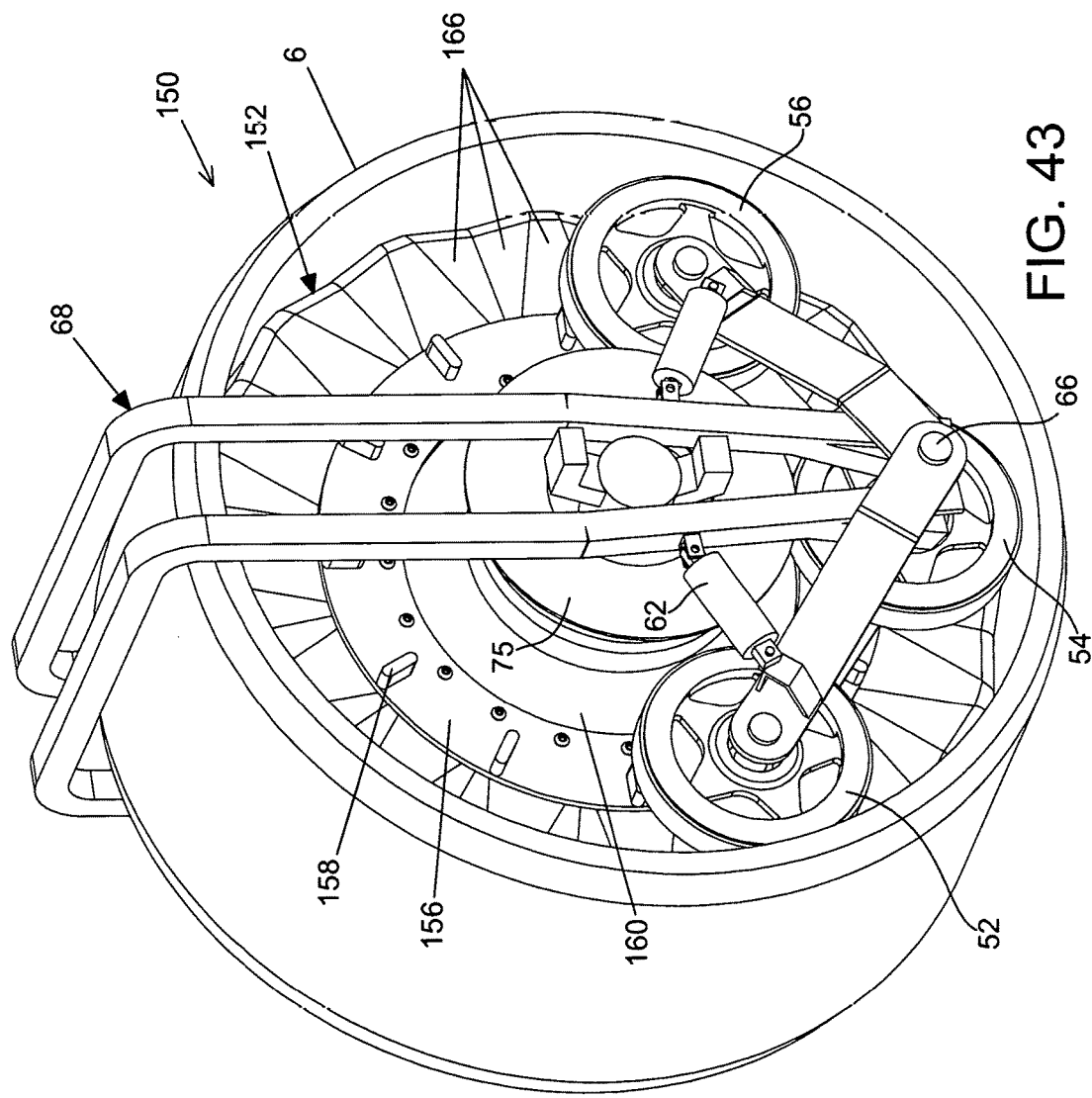
FIG. 43 is a perspective drawing of the back side of the track assembly of FIG. 30 showing the bladder fully inflated and the idler wheels fully retracted to a wheel condition.
Figure 44:
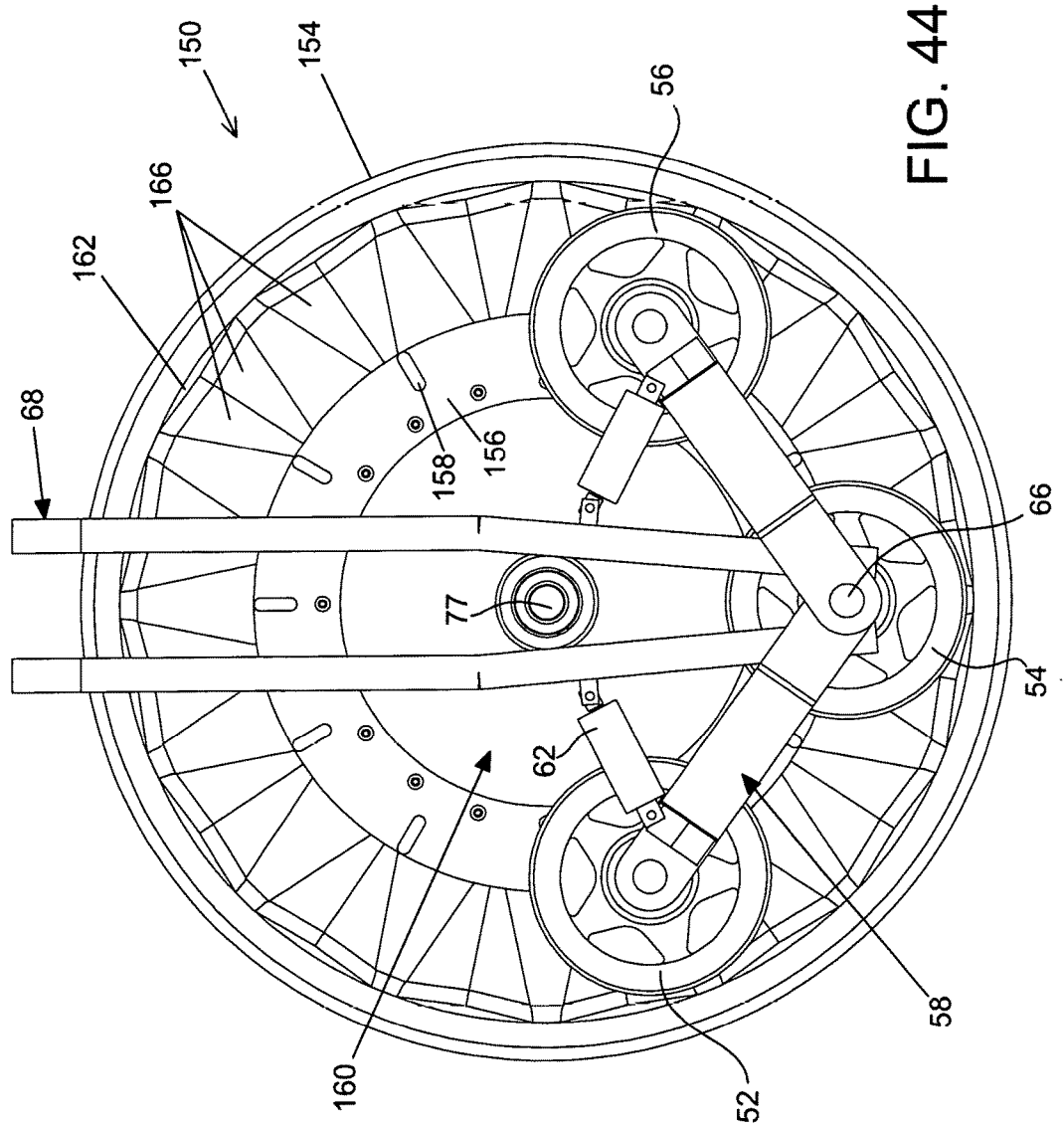
FIG. 44 is a plan view of the front side of the track assembly of FIG. 30 showing the bladder fully inflated and the idler wheels fully retracted and the track configured to a wheel condition.

The bladder 70 is mounted to the sprocket 72 and fitted to a pneumatic air source (compressor 69 and air tank 71, see FIG. 48) and (engine vacuum source 79, see FIG. 48) to appropriately expand and contract relative to the sprocket 72 to a diameter greater than the drive sprocket 72 at one extreme and approximately the same diameter as the sprocket 72 at the other extreme (see FIGS. 6, 8 and 10). When the bladder 70 is collapsed, the drive lugs 74 drive the track 6 relative to lugs 207 at the track interior, see FIG. 46. When the bladder 70 is fully expanded, the track 6 is driven via the frictional contact between the bladder 70 and track interior at an annular channel 209 defined between the track drive lugs, see FIG. 46.

The bladder 70 can be constructed from a variety of materials and composites. A variety of pneumatic and/or hydraulic materials can also be used to fill the bladder 70 (e.g. air, nitrogen, liquids, oils, gels etc.). Contemporaneous retraction or extension of the pistons 64 relative to the cylinders 62 and cross frame members 68 at the idler wheel suspensions 58 pivots the rocker arms 60 to raise and lower the associated fore and aft idler wheels 52 and 56. The cooperative movements of the bladder 70 and idler wheel suspensions 58 are synchronized to morph/transform the geometric profile and contour of the track 6 between the depicted flat-sided, non-circular and circular configurations (see FIGS. 5, 7 and 9).

FIGS. 17 through 29 depict the track assembly 100 which provides a multi-segmented, expansible, telescoping leaflet assembly 102 that expands and contracts intermediate a multi-section drive sprocket 104 to diameters greater or less than the track drive sprocket 104. An idler wheel suspension 58 similar to the track assembly 50 includes rocker arms 60, pneumatic cylinders 62 and pistons 64 fitted between the rocker arms 60 and cross frame 68 to pivot the idler wheels 52 and 56 about the center axles 66 that support the idler wheels 54. The expansion and contraction of the assembly 102 in concert with the extension and retraction of the idler wheel suspension 58 and idler wheels 52 and 56 transforms and re-shapes the profile of the track 6.

Drive lugs 106 laterally extend from opposed sprocket plates 108 of the drive sprocket 104 and engage mating drive holes or drive lug appendages that project from the interior surface of the drive track 6, see FIG. 46. The sprocket plates 108 support appropriate multi-cylinder, hydraulic or pneumatic manifolds 110 (e.g. the depicted six-cylinder manifold) from which pistons 112 extend and retract. The pistons 112 are coupled to brackets 114 that project from pie-shaped leaflet-type segments 116 mounted to radially telescope from the space between the drive sprocket plates 108. The leaflet segments 116 at each sprocket plate 108 are radially offset approximately 30° from the leaflet segments 116 on the opposed sprocket plate 108, see FIGS. 28 and 29.

The leaflet segments 116 can be constructed from a variety of materials. The segments 116 must be rigid enough to expand the track 6 and withstand the typical travel forces. The peripheral edges of the leaflets 116 must also exhibit a surface that is capable of gripping and rotating the track 6. The leaflet segments 116 can be constructed from formed or cast metal or a variety of coated or laminated fiberglass, Kevlar, polymer or UHMW materials. The mating contact surfaces at the leaflets 116 and track channel 209 can also be formed to enhance track rotation (e.g. mating projections, ribs, teeth, knurling, grooves, depressions etc.).

The leaflet segments 116 radially expand and contract in unison along slide rails 118 fitted to the interior walls of the sprocket plates 108. Grooves 119 formed in the backs of the leaflet segments 116 mate with the rails 118 to confine the relative movement. The rails 118 are interleaved between the adjacent and opposed segments 116 which are collectively trapped between the sprocket plates 108. The segments 116 are constrained by the pistons 112, sprocket plates 108, rails 118 and grooves 119 to telescope to and fro in unison in the space between the sprocket plates 108 to vary the diameter of the effective diameter of the drive sprocket 104.

Figure 48:
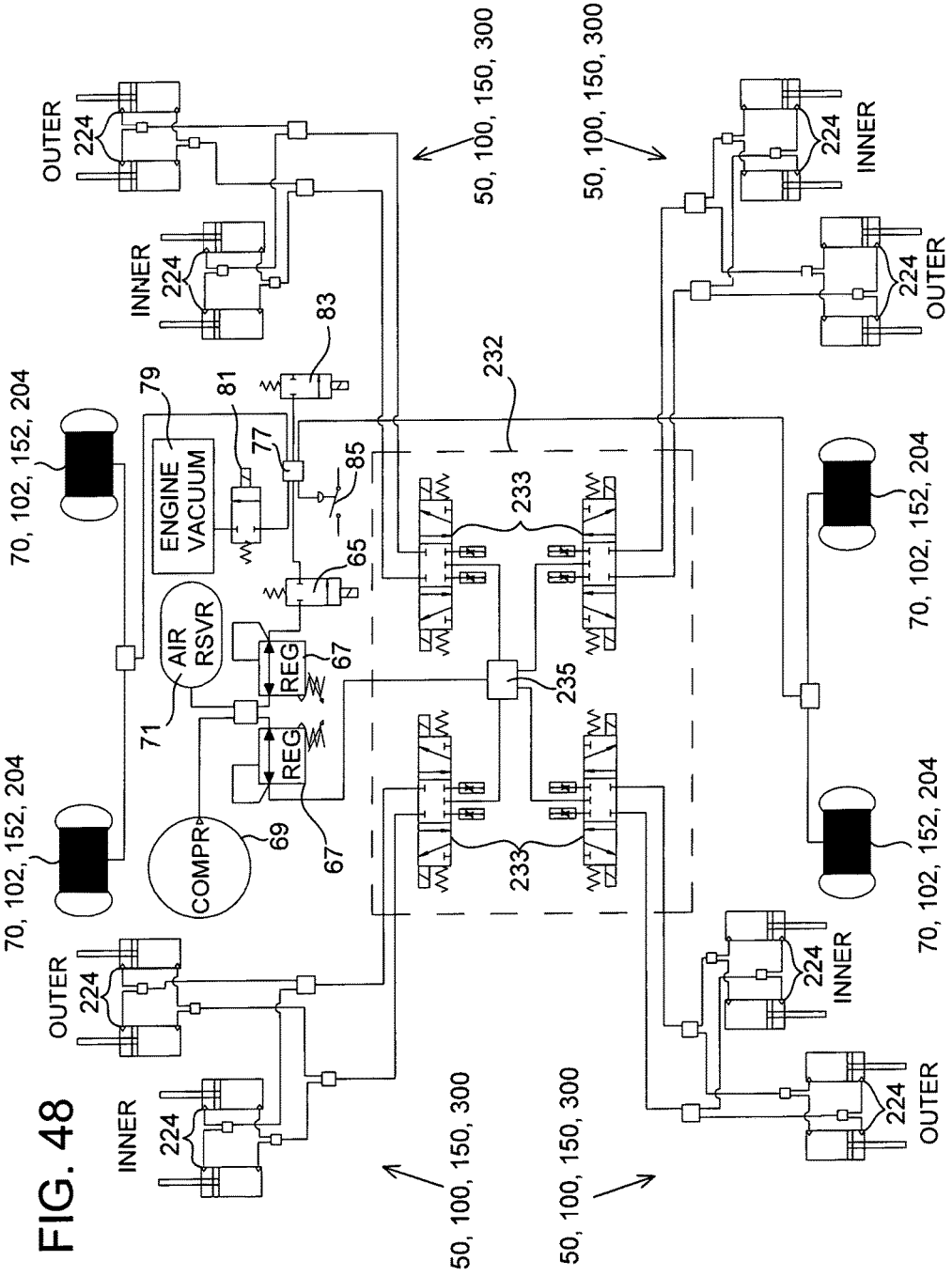
FIG. 48 depicts a schematic drawing of a pneumatic control assembly used to inflate and deflate the bladder and direct inner and outer pneumatic cylinders that rotate the idler wheels to vary the track profile between non-circular and circular conditions.
Figure 49:
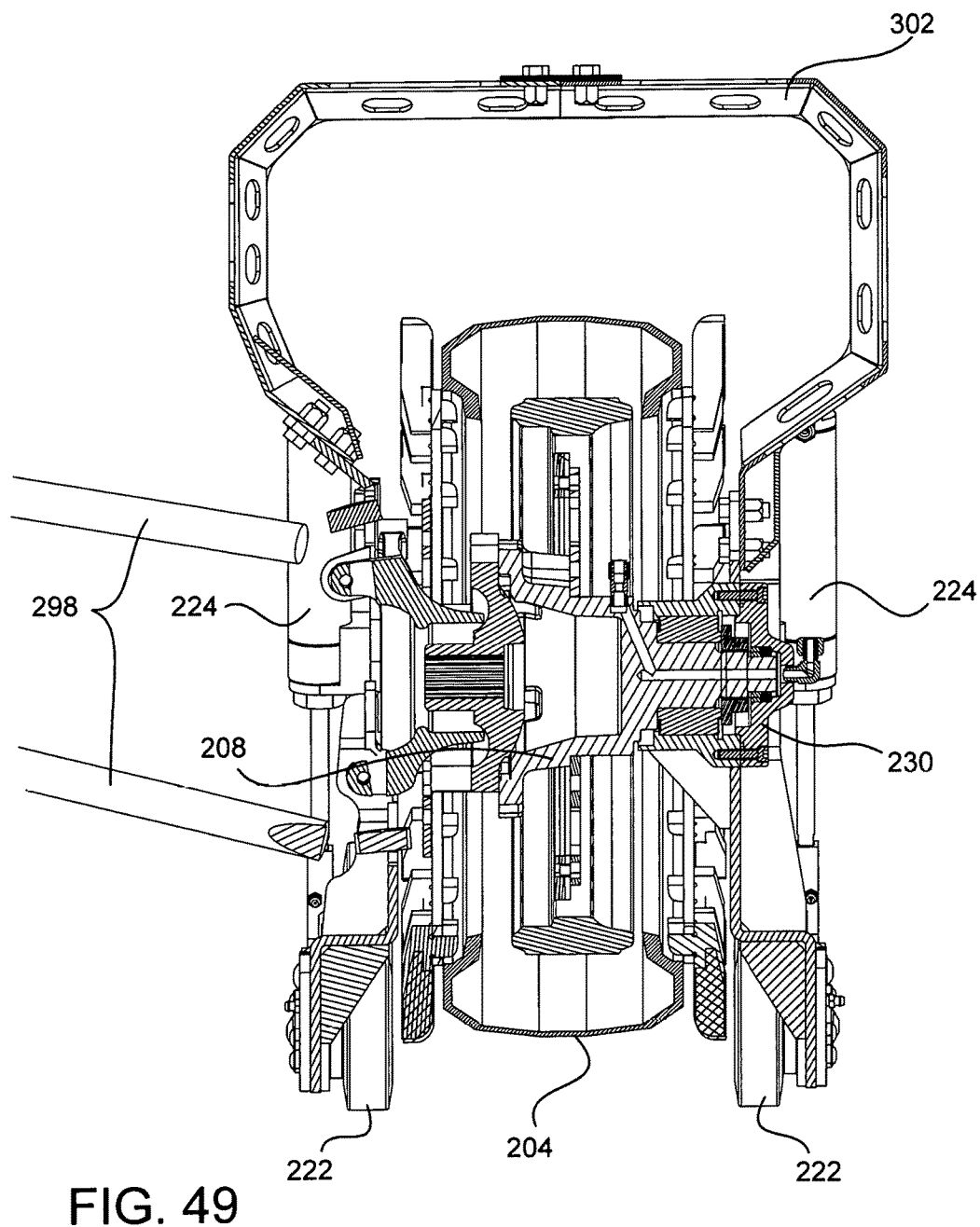
FIG. 49 is a cross section view of the track without the track and showing details to the deflated bladder of FIG. 46 relative to the supporting inner and outer frame sections, support hub/bearing assembly and bladder supporting wheel rim.
Figure 50:
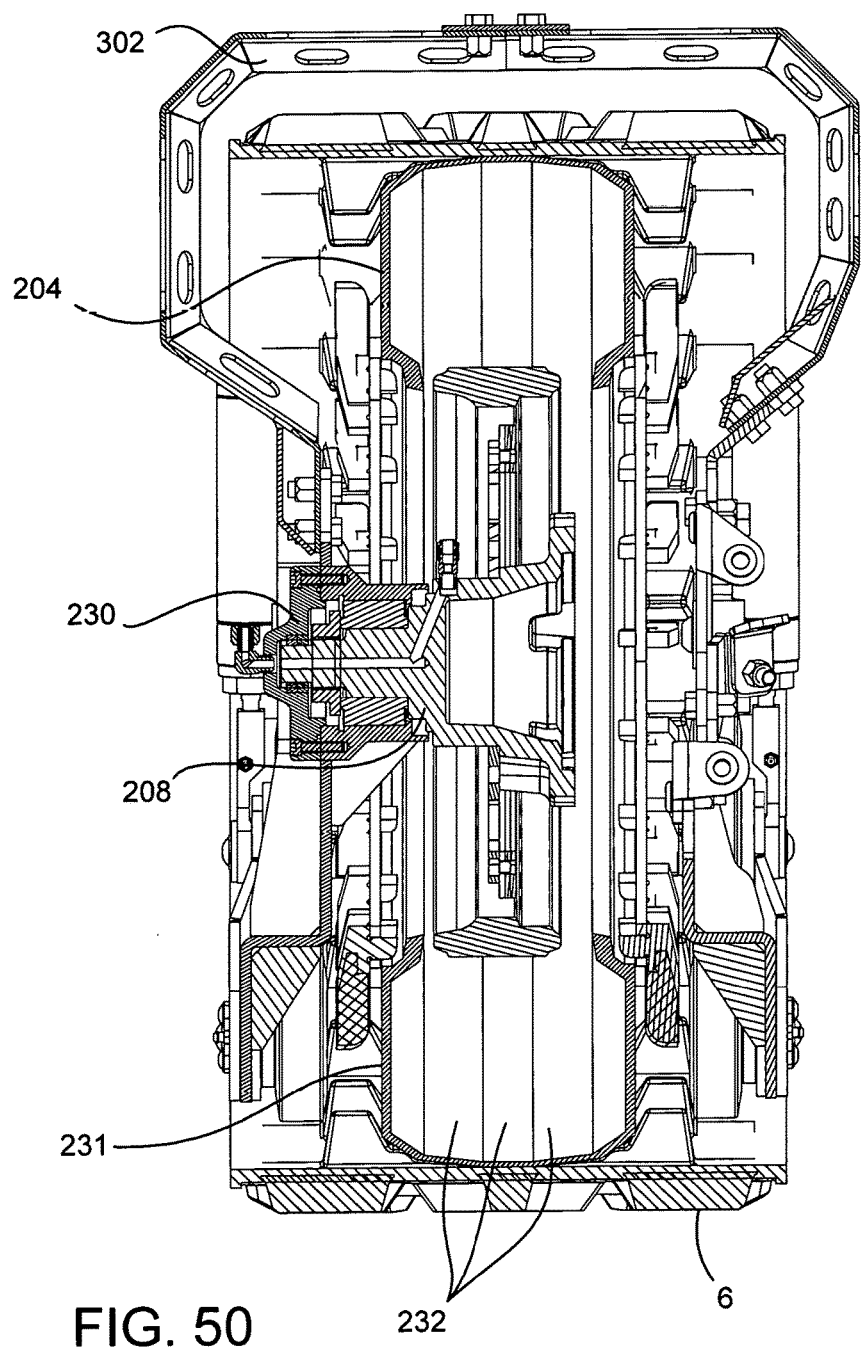
FIG. 50 is a cross section view taken along section lines 50-50 of FIG. 51 showing details to the inflated bladder relative to the supporting inner and outer frame sections and the support hub/bearing assembly and bladder supporting wheel rim.
Figure 51:
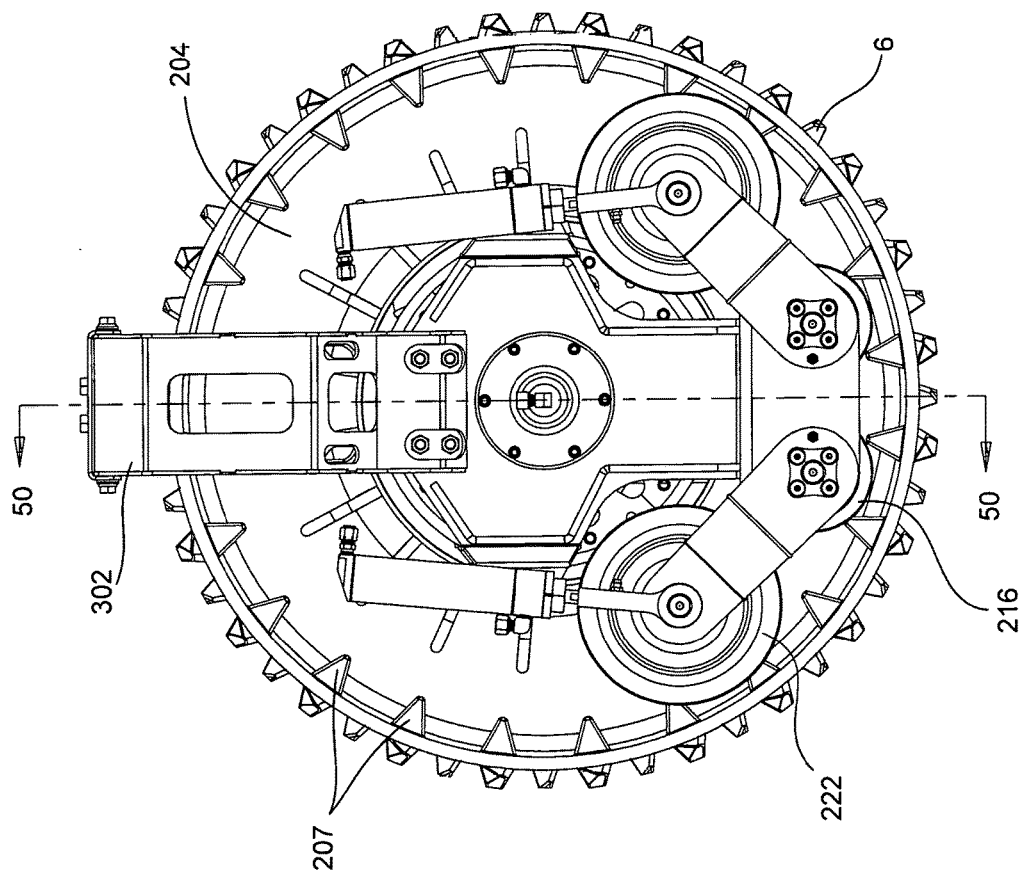
FIG. 51 is a plan view of the front side of the track assembly of FIG. 46 showing the bladder inflated and the idler wheels retracted and rotated to a circular track condition.
Figure 52:
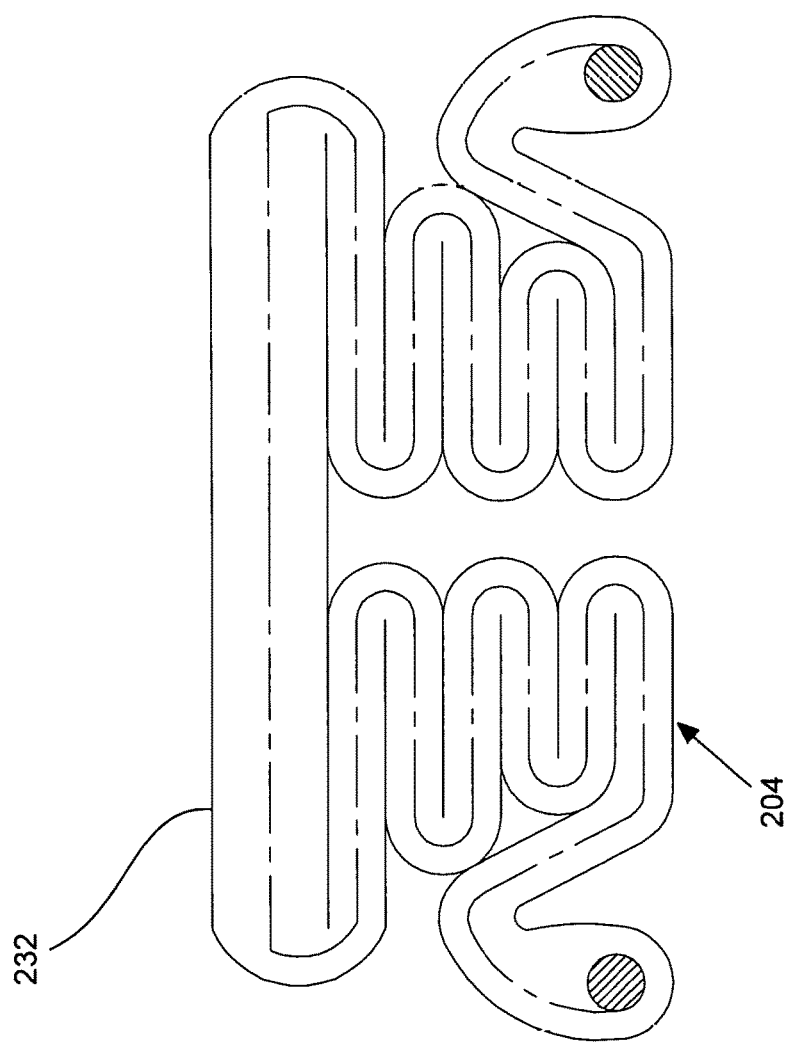
FIG. 52 is a detailed cross-section view showing the collapsed bladder of the track assembly of FIG. 46.

The pneumatic control of the leaflet segments is determined in essentially the same fashion as for the bladder 70 using the pneumatic controls shown at FIG. 48. The bladder is replaced with the leaflet assembly 102 and the pistons 62 and 112 at the track assembly 100 are directed with suitably applied air and vacuum. The pneumatic air source comprises a compressor 69 and air tank 71 and interconnects with an engine vacuum source 79 to appropriately expand and contract the idler wheels 52 and 56 and leaflets 116 relative to the drive sprocket 104.

The expansion and contraction of the segments 116 against the interior surface of the track 6 re-shapes the track geometry between non-circular and circular configurations. When the leaflet segments 16 are retracted, the drive lugs 74 drive the track 6 relative to lugs 207 at the track interior, see FIG. 46. When leaflet segments 116 are extended, the track 6 is driven via the frictional contact between the leaflet segments 116 and a center channel 209 at the track interior.

FIGS. 30 through 44 depict the track assembly 150 which provides another expanding/contracting assembly and, in particular, an inflatable membrane 152 that is secured to the walls of the drive sprocket 160. The membrane 152 is supported or pinched between the track 6 and an annular band 156 that contains radially projecting sprocket drive teeth 158. The band 156 bolts to the sidewalls of the sprocket 160 and pinches the peripheral edges of the membrane 152 to seal the edges of the membrane 152 to sidewalls of the sprocket 160. A seal is formed such that an airtight space is created between the sprocket sidewalls 160 and the interior cross hub wall 73.

The membrane 152 can be inflated with a suitable material (e.g. air, liquid, oil, gel etc.). Presently, a pneumatic air supply is coupled to the drive sprocket 160 to inflate/deflate the membrane 152 via air channels in the sprocket support hub 75 and or axle 77 and support bearings. The membrane 152 is mounted to the sprocket 72 and coupled via the to a pneumatic air source (compressor 69 and air tank 71, see FIG. 48) and (engine vacuum source 79, see FIG. 48) to appropriately expand and contract relative to the sprocket 160 to a diameter greater than the drive sprocket 160 at one extreme, FIG. 35, and approximately the same diameter as the sprocket 160 at the other extreme, FIG. 31.

An annular center band piece 162 exhibiting a thickness greater than the side wall thickness of the membrane 152 circumscribes the circumferential center of the membrane 152. The band piece 162 is configured to bias the membrane 152 to directionally collapse inward in a circular fashion. The band piece 162 can be formed as a part of the membrane 152 (see FIGS. 31, 35 and 38) or as a separate annular band that circumscribes the membrane 152 and compresses the center of the membrane 152. The walls of the membrane 152 are also shaped to include radially directed notches or pleats 166 (see FIGS. 34, 36, 37 and 38) that cooperate with the band 162 to facilitate a defined directional collapsing of the membrane 152.

As with the track assemblies 50 and 100, the idler wheel suspension 58 retracts and elevates the fore and aft idler wheels 52 and 56. The expansion of the idler wheels 56 and simultaneous deflation of the membrane 152 to the diameter of the sprocket 160 morphs the track 154 to a flat-sided, non-circular shape, see FIG. 30. The elevation of the idler wheels 56 and simultaneous inflation and expansion of the membrane 152 beyond the diameter of the sprocket 160 morphs the track 154 to a circular shape, see FIG. 34. As noted above, the geometric shape of the track 6 can also be set to a geometry somewhere between the presently preferred non-circular (e.g. flat-sided, triangular) and circular configurations.

Figure 45:
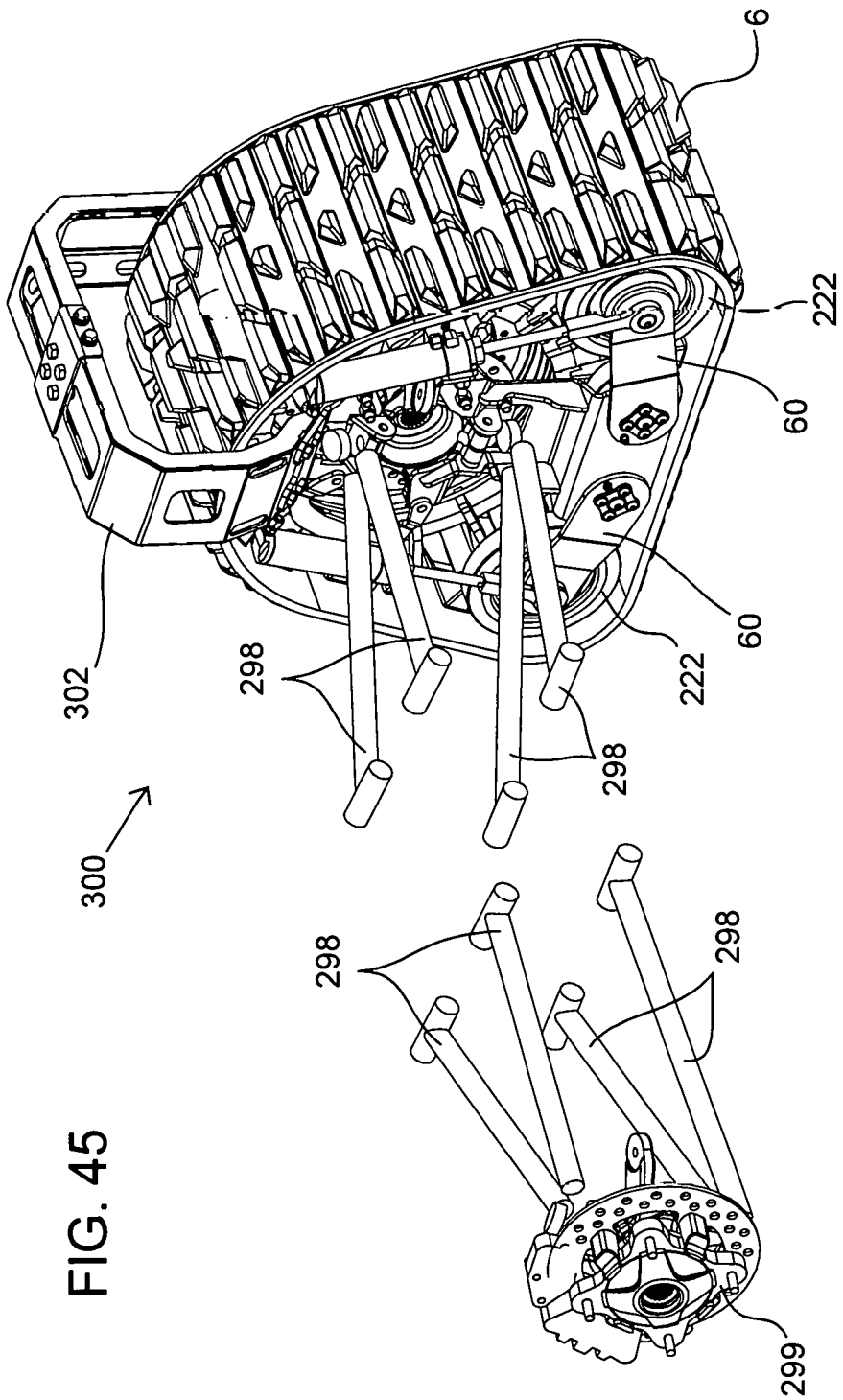
FIG. 45 is a perspective drawing showing the track assembly of the invention in relation to supporting suspension arms that secure the track assembly to a drive vehicle and an active or passive drive hub at the vehicle.
Figure 47:
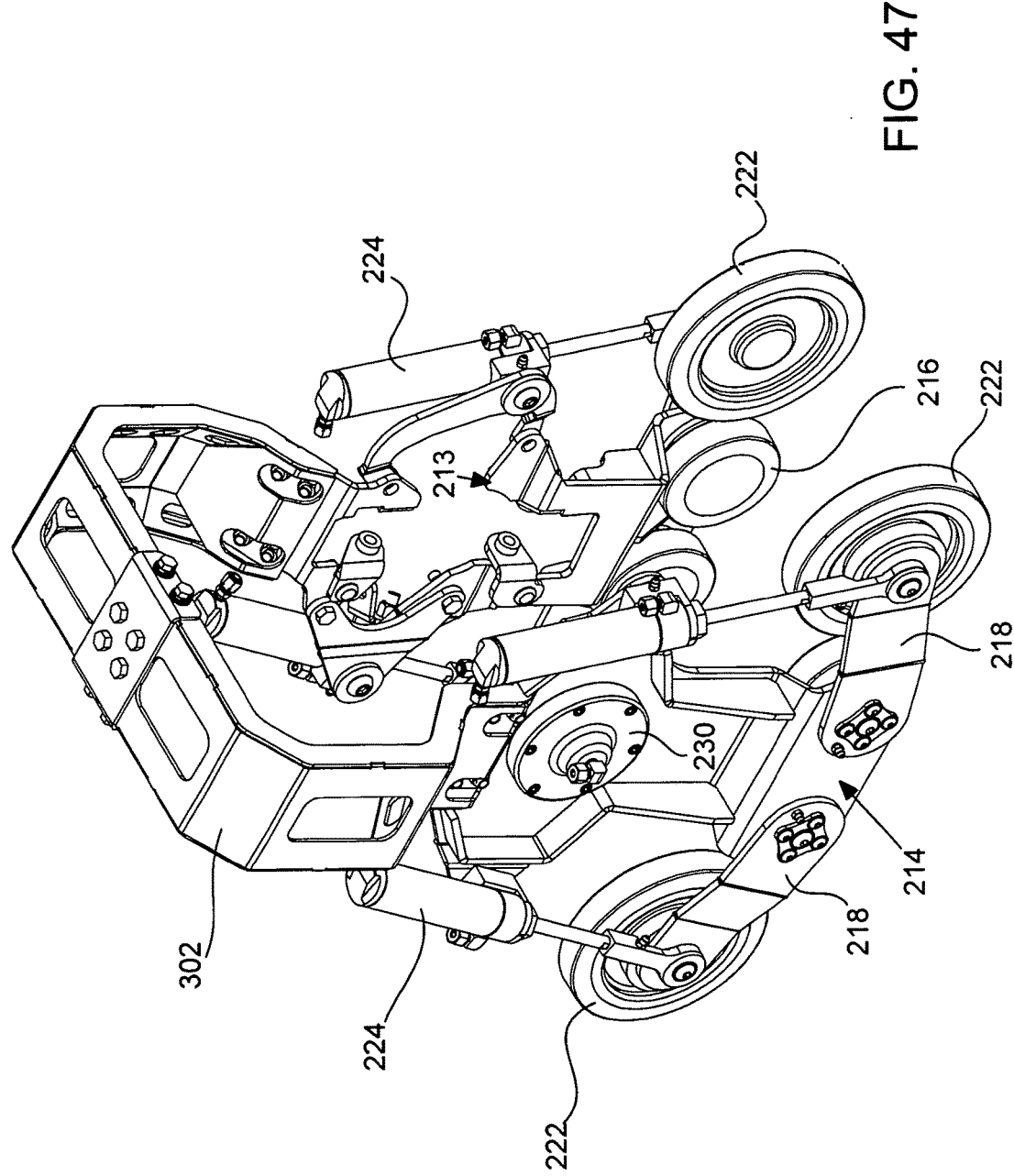
FIG. 47 is a perspective drawing showing the inner and outer idler wheel control frame sections of the track assembly of FIG. 46 with the pneumatic pistons extended and the idler wheels rotated to a horizontal condition and sans the bladder, bladder support rim and track.

FIGS. 45-52 depict yet another track assembly 300 having a collapsible bladder 204. FIG. 45 depicts linkage arms 298 and a hub 299 that couple the assembly 300 to a vehicle 2. Similar linkage arms 298 and hubs 299 are used to couple the track assemblies 50, 100 and 150 to a vehicle 2. The assembly 300 is shown in exploded assembly at FIG. 46. FIG. 47 shows the idler wheel suspension 302 removed from the assembly 300. FIG. 48 shows a schematic diagram of the pneumatic controls used to collapse and expand the bladder 204. Similar controls are used to expand and contract the above described membrane 152 and bladders 70 and 162 at the track assemblies 50, 100 and 150. Alternative plan and cross section views of the drive track 6 are lastly depicted in transformed "flat-sided, off-road" and "wheel" conditions at FIGS. 49-51.

The assembly 300 provides a wheel-like track drive sprocket 202 that serves as a mounting rim for a toroidal collapsible bladder 204. A number of sprocket teeth 206 radially project from inner and outer circumferential edges of the track drive sprocket 202. The teeth 206 engage drive lugs 207 that project from the interior surface of the drive track 6, see FIG. 46. The drive sprocket 202 is supported to a spindle assembly 208 that extends between inner and outer idler wheel support frames 213 and 214, see FIGS. 46, 49 and 50. The spindle assembly 28 like the hub 75 and sprocket axle 77 discussed above supports the sprocket 202 to the frames 213 and 214 and directs air/vacuum to the bladder 204 via air channels shown at the cross section views of FIGS. 49 and 50.

The idler wheel support frames 213 and 214 are coupled together via cross frame members 302. The centers of the idler wheel support frames 213 and 214 are adapted to accommodate mounting the drive sprocket 202 to the vehicle linkage arms 298 and the spindle assembly 208 to the drive sprocket 202. The inner frame piece 213 includes flanges that accept the linkage arms 298 and a center open space is located to not obstruct rotation of the spindle 208. The outer frame piece 214 includes a bearing support and a cooperating cover 230 located to support an outer end of the spindle 208.

Cross bracket arms 302 mount between the support frames 213 and 214 and shelter associated air delivery and return control air lines from and to the bearing support cover 230. The bearing support 230 couples to the air/vacuum lines and includes internal air channels and in addition to supporting the outer end of the spindle assembly 208 operates in the fashion of an air swivel. That is, necessary air or vacuum flows are appropriately directed via channels in the bearing support cover 230 and spindle 208 to the bladder 204.

A pair of idler wheels 216 mount to the inner ends of rocker arms 218 at the inner and outer frames 213 and 214. Relatively larger idler wheels 222 mount to the opposite ends of the rocker arms 218 that radiate from bottom of the frames 213 and 214.

Pneumatic cylinders 224 are supported to the support frames 213 and 214 and couple to the outer ends of the rocker arms 218. As with the idler wheels 52 and 56, the rocker arms 218 are controlled to pivot and either elevate or lower the idler wheels 222 relative to the interior surfaces of the track 6.

With attention to FIG. 48, a schematic is shown of an idler wheel controller or pneumatic controller 232 includes appropriate DC powered, solenoid driven air switches 233 and manifold 235 at the vehicle 2 that direct air flow to control the operation of the inner and outer cylinders 224 at each of the track assemblies. A compressor 69, air tank 71 and air pressure regulators 67 direct supply air to the manifold 235 and switches 233. A separate solenoid driven air switch 65, pressure sensor 85 and manifold 77 couple air to inflate the membrane 152 and bladders 70 and 204.

An engine vacuum source 79 and solenoid switches 81 and 83 via the manifold 77 supply vacuum pressures to rapidly collapse the membrane 152 and bladders 70 and 204 and discharge the expelled air via the switch 83 to the environment. The various solenoid air switches 65, 81, 83 and 233 are timed to synchronize the inflation and deflation of the membrane 152 and bladders 70 and 204 and operation of the cylinders 62 and 224 to induce the transformation of the track profile between the "flat-sided/non-circular, off-road" and "circular, wheel" conditions.

The construction of the bladder 204 as shown at FIGS. 44, 46, 49 and 50 is similar to a bladder 70. The bladder 204 provides relatively stiff sidewalls 231 and a softer tread contacting cross-wall having several annular bands 232 that directionally collapse and expand to define a number of layered convolutions, see FIG. 52. The bladder 204 is thereby able to expand and contract in a controlled fashion relative to the sprocket 202 to a diameter greater than the sprocket 202. When fully While the invention is shown and described with respect to several presently considered shape morphing or track deforming assemblies and several considered improvements, modifications and/or alternatives thereto, still other assemblies and arrangements may be suggested to those skilled in the art. It is to be appreciated also that the features of the foregoing vehicle and track assemblies can be arranged in different combinations.

For example, the vehicle chassis can be constructed in different configurations of pivoting and non-pivoting vehicle frameworks; the track frames can provide slide bearing supports or be supported from torsion supports; the rocker arm suspensions, linkages to the rocker arm pivot points and/or idler wheels can be varied to vary the track geometries at the terrain depending upon terrain conditions; and/or tracks of different lug configurations can be fitted to the track frame assemblies, among many other different combinations. The inflatable and telescoping sprocket pieces that engage and reshape the track can also be configured in other arrangements with other components. The foregoing description should therefore be construed to include all those embodiments within the spirit and scope of the following claims.

What is claimed is:
1. A track assembly comprising:
   a) a track mounted to circumscribe a sprocket and a plurality of idler wheels mounted to contact interior surfaces of said track, a framework, and a plurality of rocker arms mounted to pivot relative to said frame- work and wherein said sprocket includes a plurality of sprocket teeth radially projecting from said sprocket and mounted to contact the interior surface of said track;
b) a reciprocating suspension coupled to said framework and mounted to pivot first and second rocker arms supporting first and second idler wheels;
c) an expansible member mounted in concentric relation to said sprocket and said sprocket teeth; and
d) expansion and contraction means for directing said expansible member to a collapsed state wherein the expansible member exhibits a diameter equal to or less than a diameter exhibited by said sprocket teeth and a condition wherein said sprocket teeth contact the interior surface of said track and rotate said track and an expanded state wherein the expansible member exhibits a diameter greater than said sprocket teeth and a condition wherein the expansible member contacts the interior surface of said track and rotates said track, wherein said track exhibits a flat-side that contacts the terrain when said first and second idler wheels are pivoted to a first position and said expansible member is collapsed to the condition wherein the sprocket teeth contact and rotate the track, and wherein said track exhibits a circular profile when said first and second idler wheels are pivoted to a second position and said expansible member is expanded to the condition wherein the expansible member contacts and rotates the track.

2. A track assembly as set forth in claim 1 wherein said expansible member comprises an inflatable member concentrically mounted to said sprocket and having a plurality of surfaces shaped to radially collapse and fold onto one another relative to said sprocket to engage the interior surface of said track when expanded and disengage from contact with the interior surface of said track when collapsed.

3. A track assembly as set forth in claim 2 wherein said inflatable member comprises an annular membrane mounted to define an airtight cavity at the circumferential periphery of said sprocket.

4. A track assembly as set forth in claim 1 wherein said expansible member comprises a toroidal member mounted to the circumferential periphery of said sprocket and wherein said expansion and contraction means directs a media into and from said expansible member to expand and contract said expansible member.

5. A track assembly as set forth in claim 1 wherein said expansible member comprises a plurality of surfaces shaped to radially collapse and fold onto one another in a circumferential recess of said sprocket.

6. A track assembly as set forth in claim 1 wherein said reciprocating suspension comprises a plurality of telescoping cylinders and pistons coupled to said first and second rocker arms.

7. A track assembly as set forth in claim 1 wherein said expansion and contraction means comprises a pneumatic air source, a vacuum source and air delivery and return lines coupled to said reciprocating suspension and expansible member.

8. A track assembly as set forth in claim 1 including a plurality of linkage members coupling said framework to a vehicle.

9. A track assembly comprising:
a) a track mounted to circumscribe a sprocket and a plurality of idler wheels mounted to contact interior surfaces of said track, a framework, and a plurality of rocker arms mounted to pivot relative to said framework and wherein said sprocket includes a plurality of sprocket teeth radially projecting from said sprocket and mounted to contact the interior surface of said track;
b) a suspension coupled to said framework and mounted to pivot first and second rocker arms supporting first and second idler wheels;
c) an expansible member mounted to circumscribe said sprocket in concentric relation to said sprocket teeth; and
d) expansion and contraction means for directing said expansible member to a collapsed state wherein the expansible member exhibits a diameter equal to or less than a diameter exhibited by said sprocket teeth and a condition wherein said sprocket teeth contact the interior surface of said track and rotate said track and an expanded state wherein the expansible member exhibits a diameter greater than said sprocket teeth and a condition wherein the expansible member contacts the interior surface of said track and rotates said track, wherein said track exhibits a flat-side that contacts the terrain when said expansible member is collapsed to the condition wherein the sprocket teeth contact and rotate the track, and wherein said track exhibits a circular profile when said expansible member is expanded to the condition wherein the expansible member contacts and rotates the track.

10. A track assembly as set forth in claim 9
a) wherein said first and second idler wheels are mounted to a reciprocating suspension coupled to said framework and mounted to pivot first and second rocker arms supporting said first and second idler wheels;
b) wherein said track exhibits said flat-side when said reciprocating suspension pivots said first and second idler wheels to a first position and the condition when said sprocket teeth contact the interior surface of the track; and
c) wherein said track exhibits a circular profile when said reciprocating suspension pivots said first and second idler wheels to a second position and said expansible member is expanded to the condition when said expansible member contacts the interior surface of the track and rotates the track.

11. A track assembly as set forth in claim 9 wherein said expansible member comprises a plurality of surfaces shaped to radially collapse and fold onto one another in a circumferential recess of said sprocket.

12. A track assembly comprising:
a) a track mounted to circumscribe a sprocket, a plurality of sprocket teeth projecting from said sprocket, an expansible member, and a plurality of idler wheels mounted to contact interior surfaces of said track;
b) a framework supporting a plurality of rocker arms and a reciprocating suspension mounted to said rocker arms, wherein said idler wheels are mounted to said rocker arms, and wherein said reciprocating suspension pivots said rocker arms and idler wheels relative to said framework;
c) idler control means coupled to said reciprocating suspension for pivoting said idler wheels relative to the track and for inflating and deflating said expansible member for cooperatively deforming the track to vary the profile exhibited by the track and the contact of the track with a supporting terrain.

13. A track assembly as set forth in claim 12 including means for expanding and contracting said expansible member in cooperation with said idler control means, wherein when said expansible member is collapsed said idler wheels are pivoted such that said track exhibits a non-circular profile, and wherein when said expansible member is expanded said idler wheels are pivoted such that said track exhibits a circular profile, whereby the sprocket teeth rotate the track when said track exhibits a non-circular profile and said expansible member rotates said track when said track exhibits a circular profile and said expansible member is expanded.

14. A track assembly as set forth in claim 13 wherein said expansible member comprises a toroidal bladder.

15. A track assembly as set forth in claim 12 wherein said expansible member comprises a plurality of surfaces shaped to radially collapse and fold onto one another in a circumferential recess of said sprocket.

16. A track assembly as set forth in claim 12 wherein said idler control means comprises a pneumatic air source, a vacuum source and air delivery and return lines coupled to said reciprocating suspension and expansible member.

17. A track assembly as set forth in claim 12 wherein said reciprocating suspension comprises a plurality of telescoping cylinders and pistons coupled to said rocker arms.

18. A track assembly as set forth in claim 12 wherein said expansible member comprises a plurality of layered convolutions that radially expand and collapse in a circumferential space between said sprocket teeth.

\* \* \* \* \*